United States Patent [19]

Demjanenko et al.

[11] Patent Number: 5,251,151
[45] Date of Patent: Oct. 5, 1993

[54] METHOD AND APPARATUS FOR DIAGNOSING THE STATE OF A MACHINE

[75] Inventors: Victor Demjanenko, North Tonawanda; David M. Benenson, Williamsville, both of N.Y.; Soon Y. Park, Chonnam, Rep. of Korea; Selwyn Wright, Palo Alto, Calif.; Andres Soom, Williamsville, N.Y.; Raj S. Acharya, East Amherst, N.Y.; Mehrdad Soumekh, Snyder, N.Y.

[73] Assignee: Research Foundation of State Univ. of N.Y., Buffalo, N.Y.

[21] Appl. No.: 634,091

[22] Filed: Dec. 24, 1990

Related U.S. Application Data

[63] Continuation-in-part of Ser. No. 591,825, Oct. 2, 1990, abandoned, which is a continuation of Ser. No. 200,116, May 27, 1988, Pat. No. 4,980,844.

[51] Int. Cl.⁵ .................... G01H 11/00; G10M 7/00
[52] U.S. Cl. .................... 364/550; 364/508; 364/551.02
[58] Field of Search .......... 364/550, 576, 474.17, 364/508, 551.02; 73/654; 381/43; 395/2

[56] References Cited

U.S. PATENT DOCUMENTS

| | | | |
|---|---|---|---|
| Re. 31,750 | 11/1984 | Morrow | 364/508 |
| 4,023,044 | 5/1977 | Miller et al. | 307/116 |
| 4,184,205 | 1/1980 | Morrow | 364/508 |
| 4,336,421 | 6/1982 | Welch et al. | 381/43 |
| 4,366,544 | 12/1982 | Shima et al. | 364/550 |
| 4,383,135 | 5/1983 | Scott et al. | 395/2 |
| 4,388,495 | 6/1983 | Hitchcock | 381/43 |
| 4,410,764 | 10/1983 | Werth et al. | 395/2 |
| 4,425,798 | 1/1984 | Nagai et al. | 73/659 |
| 4,437,163 | 3/1984 | Kurihara et al. | 364/508 |
| 4,510,572 | 4/1985 | Reece et al. | 364/489 |
| 4,559,600 | 12/1985 | Rao | 364/474 |
| 4,607,529 | 8/1986 | Morey | 73/660 |
| 4,614,117 | 9/1986 | Taniguti | 73/659 |
| 4,642,617 | 2/1987 | Thomas et al. | 340/680 |
| 4,724,524 | 2/1988 | Thomas et al. | 364/474 |
| 4,758,964 | 7/1988 | Bittner et al. | 364/508 |
| 4,782,452 | 11/1988 | Thomas | 364/550 |
| 4,783,998 | 11/1988 | Sander | 73/660 |
| 4,806,914 | 2/1989 | Thomas et al. | 340/680 |
| 4,849,741 | 7/1989 | Thomas | 340/683 |
| 4,894,644 | 1/1990 | Thomas | 340/680 |
| 4,918,616 | 4/1990 | Yoshimura et al. | 364/507 |

*Primary Examiner*—Jack B. Harvey
*Assistant Examiner*—Jae H. Choi
*Attorney, Agent, or Firm*—Martin Lukacher

[57] ABSTRACT

A method and apparatus for diagnosing the mechanical condition of a machine. The method of the invention includes the following steps: sensing a reference vibrational signal of the machine; creating a reference set of events from the reference vibrational signal of the machine; saving the reference set of events; sensing a test vibrational signal of the machine; creating a test set of events from the test vibrational signal of the machine; and, comparing the test set of events with the reference set of events to determine the mechanical condition of the machine. The invention further includes a method of extracting a set of events from a vibrational signal of a machine wherein a subset of the events corresponds to a physical action of the machine. The invention also includes a method of determining a set of clustered events for a machine from a plurality of sets of events, wherein each of the sets has a number of events therein. An apparatus is also disclosed for implementing the method of the invention

25 Claims, 13 Drawing Sheets

0-8 Cycles 16-24 Cycles

OVERALL

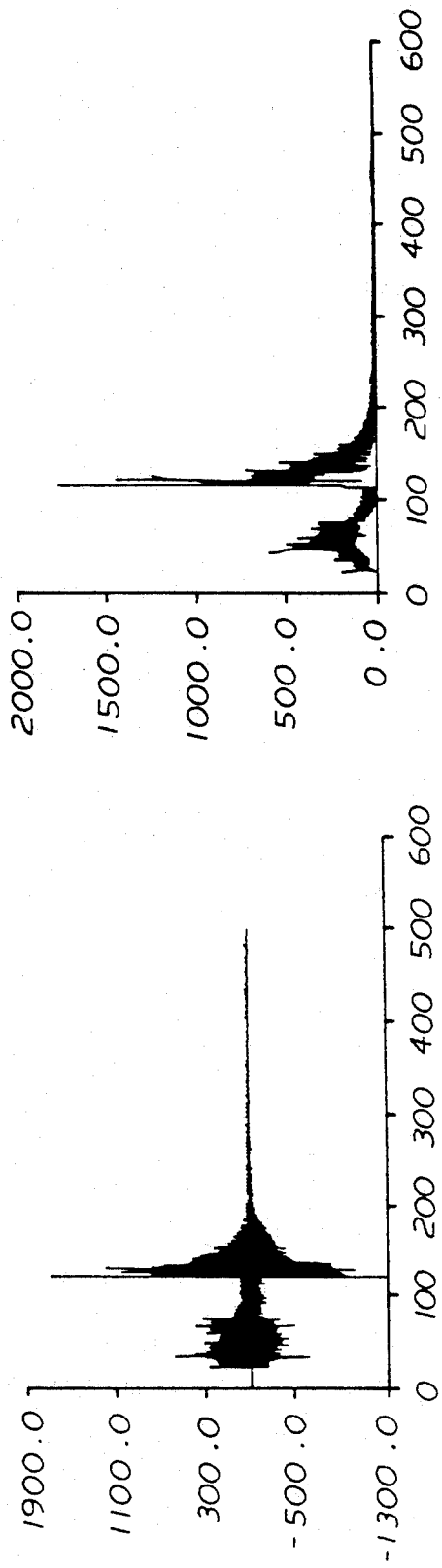
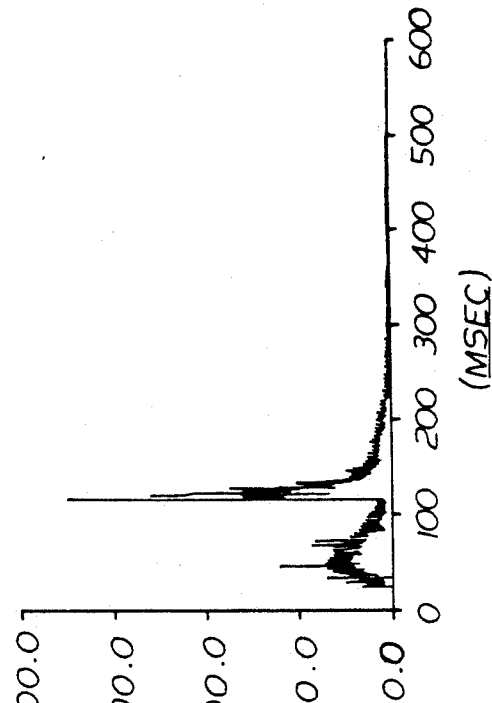
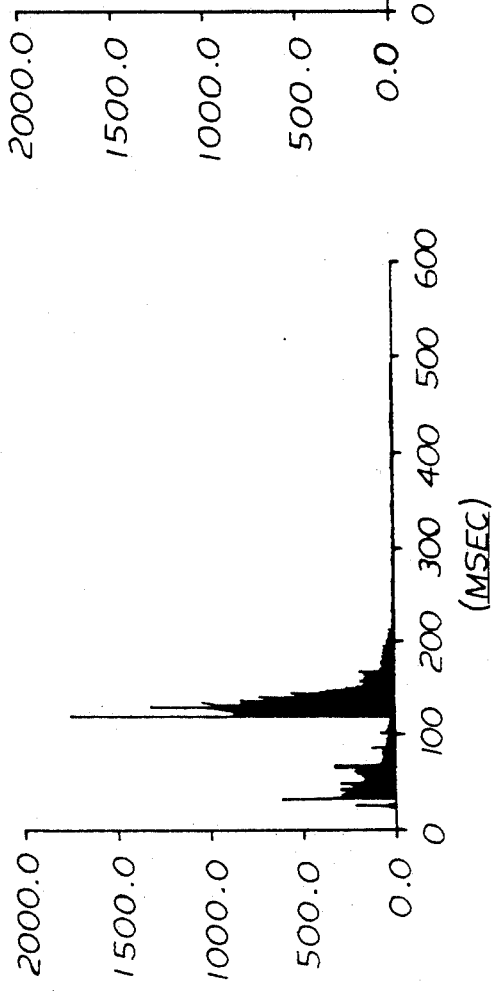

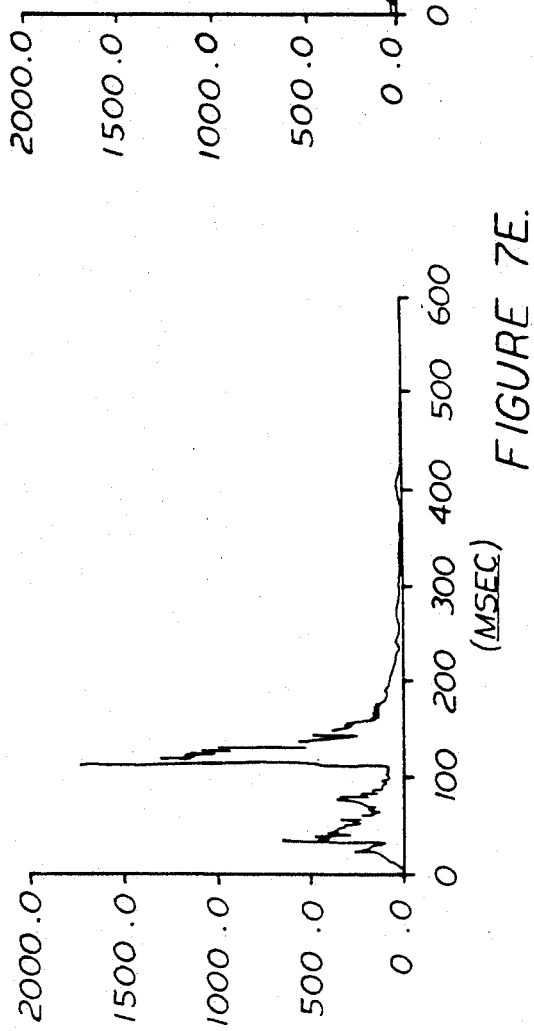
FIGURE 7G.
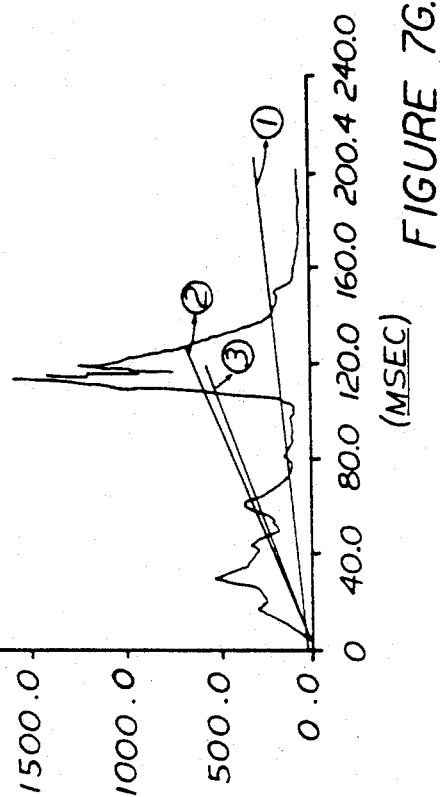
PEAKS AND VALLEYS FROM ENVELOPE
| Peaks (P) Valleys (V) | Time in Milliseconds |
|---|---|
| V | 3.12 |
| P | 15.96 |
| V | 18.06 |
| P | 24.75 |
| V | 101.68 |
| P | 117.97 |
| V | 151.91 |
FIGURE 7H.
FIGURE 7E.
FIGURE 7F.

|  | NORMAL (CYCLES) | | TAIL SPR. OVERCOMP. (CYCLES) | |
|---|---|---|---|---|
|  | MEAN* | STD** | MEAN* | STD** |
| $T_1$ | 0.98 | 0.05 | 0.83 | 0.09 |
| $T_2$ | 19.47 | 0.05 | 18.22 | 0.08 |
| $T_2 - T_1$ | 18.49 | 0.02 | 17.33 | 0.02 |

\* MEAN: IS THE AVERAGE OF A PLURALITY OF EVENT TIMING ANALYSIS RESULTS

\*\* STD: IS THE STANDARD DEVIATION OF A PLURALITY OF EVENT TIMING ANALYSIS RESULTS

FIGURE 9C.

METHOD AND APPARATUS FOR DIAGNOSING THE STATE OF A MACHINE

This is a continuation-in-part of U.S. patent application Ser. No. 07/591,825, filed Oct. 2, 1990, now abandoned, which in turn is a continuation of U.S. patent application Ser. No. 07/200,116, filed May 27, 1988, now U.S. Pat. No. 4,980,844, issued Dec. 25, 1990.

In accordance with 37 C.F.R. 1.96, a microfiche appendix is to be considered a portion of the entire "written description" of this invention in conformance with 35 U.S.C. 112. The appendix includes one microfiche having 94 frames. A printed appendix, Appendix A, is also to be considered a portion of the written description of this invention.

BACKGROUND OF THE INVENTION

Measurement and analysis of vibration data is a well known method of monitoring the condition of machines. In an ideal machine, no vibration would be produced since all input energy would be used to perform useful work. In practice, however, vibration occurs as a normal by-product of the interaction of mechanical forces within the machine. A good machine design is one which produces low levels of inherent vibration. Subsequent increases in vibration level indicate a change in the dynamic characteristics of the machine, often caused by a defect or deterioration of moving parts.

Perhaps the earliest analyzer of vibration was the power plant attendant who made periodic inspections of plant equipment. This attendant, sometimes called a "runner" because he traveled throughout the entire plant, typically inspected vibration levels by placing his hand upon the machine or by simply listening for sounds produced by abnormal vibrations.

Modern technology has greatly simplified and improved upon vibration monitoring techniques. Sensitive accelerometers have replaced human hands in sensing vibration, and complex electronics have evolved to process the vibration data.

The prior art reveals several methods and apparatus for monitoring vibration. Some devices continuously monitor overall vibration in the time or frequency domain, and provide an indication of an alarm condition when preset vibration levels have been exceeded, (e.g., Shima et al., Judging System For Detecting Failure of Machine, U.S. Pat. No. 4,366,544, Dec. 28, 1982).

Another method of vibration analysis is "Vibration Signature Analysis", which is most often accomplished in the frequency domain. Under this method, time-domain vibration data are converted to the frequency domain using a Fourier Transform. The unique frequency spectrum obtained is often termed the "signature" of the machine. A signature of a machine under test may be analyzed and compared to a signature for a normal machine. Differences in the two spectra may indicate an abnormal condition. Prior art devices capable of providing a frequency spectra are known. One such device includes a handheld probe for collecting vibration data, and the capability of executing a Fast Fourier Transform to provide a frequency spectrum, (e.g., Microlog IMS, available from Palomar Technology International, Carlsbad, Calif.). Morrow also discloses a data acquisition system which performs an automatic frequency spectrum analysis whenever a probable or actual malfunction is detected (Morrow, Data Acquisition System, U.S. Pat. No. 4,184,205, Jan. 15, 1980).

A common problem associated with most of the prior art monitoring equipment is that they usually require a human operator to analyze and compare the signatures. Prior art inventions lack the sophisticated electronic circuitry and data processing necessary for automatic comparison of the spectra and for rendering a decision regarding the condition of the machine under test, with only minimal human interface. Prior art inventions are also generally incapable of analyzing machines under transient conditions, and thus find applications restricted to steady state operation. Still other prior art devices are incapable of extracting events, or specific sections of interest in a typical vibration signal. Also, many prior art devices are large and bulky, or require interfacing with a mainframe computer. Finally, most prior art devices require the sensing element (e.g., accelerometer) to be located proximate the machine element to be analyzed. For example, bearings on electric motors are typically monitored by placing sensing devices on the bearing housings themselves.

SUMMARY OF THE INVENTION

The invention provides a method and apparatus for diagnosing the mechanical condition of a machine. The method of the invention includes the following steps: sensing a reference vibrational signal of the machine; creating a reference set of events from the reference vibrational signal of the machine; saving the reference set of events; sensing a test vibrational signal of the machine; creating a test set of events from the test vibrational signal of the machine; and, comparing the test set of events with the reference set of events to determine the mechanical condition of the machine.

The invention further includes a method of extracting a set of events from a vibrational signal of a machine wherein a subset of the events corresponds to a physical action of the machine, including the steps of sensing a vibrational signal of the machine; creating a time domain signature from the vibrational signal; and, processing the signature to obtain a set of possible events wherein a subset of the set corresponds to a physical action of the machine.

The invention further includes a method of determining a set of clustered events for a machine from a plurality of sets of events, wherein each of the sets has a number of events therein, from the machine including: acquiring a set of vibrational signals where each vibrational signal comprises a plurality of events of the machine; processing each vibrational signal to obtain a set of events for each vibrational signal and a plurality of sets of events for the machine; and, clustering similar events from each of the plurality of sets to determine a set of clustered events for the machine.

The apparatus aspect of the invention provides means for accomplishing each step of the above described method. Such selected means, for accomplishing such steps are described in detail in the following description. The disclosure of such means herein will enable one skilled in the art to envision other suitable means for accomplishing such steps. Other alternate means will become apparent to one skilled in the art from the means described herein.

An overall object of the invention is to provide a novel method and apparatus for diagnosing the mechanical condition of a machine.

A more particular object of the invention is to provide a method and apparatus for diagnosing the mechanical condition of a machine by automatically creating, saving, and comparing reference and test signatures with no need for human intervention in the comparison or decision-making process.

Yet another object of the invention is to provide a method and apparatus for diagnosing the mechanical condition of a machine which is capable of analyzing vibration signals in either the time domain or frequency domain.

Yet still another object of the invention is to provide a method and apparatus for extracting events within a vibration signal.

Yet a further object of the invention is to provide a method and apparatus for determining a set of clustered events for a machine from a plurality of sets of events.

Still a further object of the invention is to provide a method and apparatus capable of non-intrusive testing and diagnosis of the mechanical condition of a machine.

These and further features, objects and advantages of the invention will become apparent to those skilled in the art from the following detailed description and appended drawings.

BRIEF DESCRIPTION OF THE DRAWINGS

FIG. 7A represents a time-domain acceleration signal obtained from a circuit breaker.

FIG. 7B represents the rectified time-domain acceleration signal of FIG. 7A.

FIG. 7C represents the resultant signal after the signal of FIG. 7B has been processed by the first localized maximum determination pass.

FIG. 7D represents the resultant signal after the resultant signal of FIG. 7C has been processed by the second localized maximum determination pass.

FIG. 7E represents the resultant signal after the resultant signal of FIG. 7D has been processed by the third localized maximum determination pass.

FIG. 7F represents the resultant signal after the resultant signal of FIG. 7E has been processed by the fourth and final localized maximum determination pass.

FIG. 7G illustrates the least-square error linear fit method of the invention by showing the resultant signal of FIG. 7F but with an expanded time abscissa.

FIG. 7H is a Table of peaks and valleys obtained for the least-square error linear fit method as applied to the envelope shown in FIG. 7G.

FIG. 9C is a Table which shows the timing information that was extracted from the peaks of the envelopes shown in FIGS. 9A and 9B.

DETAILED DESCRIPTION OF THE INVENTION

Figure 1A:
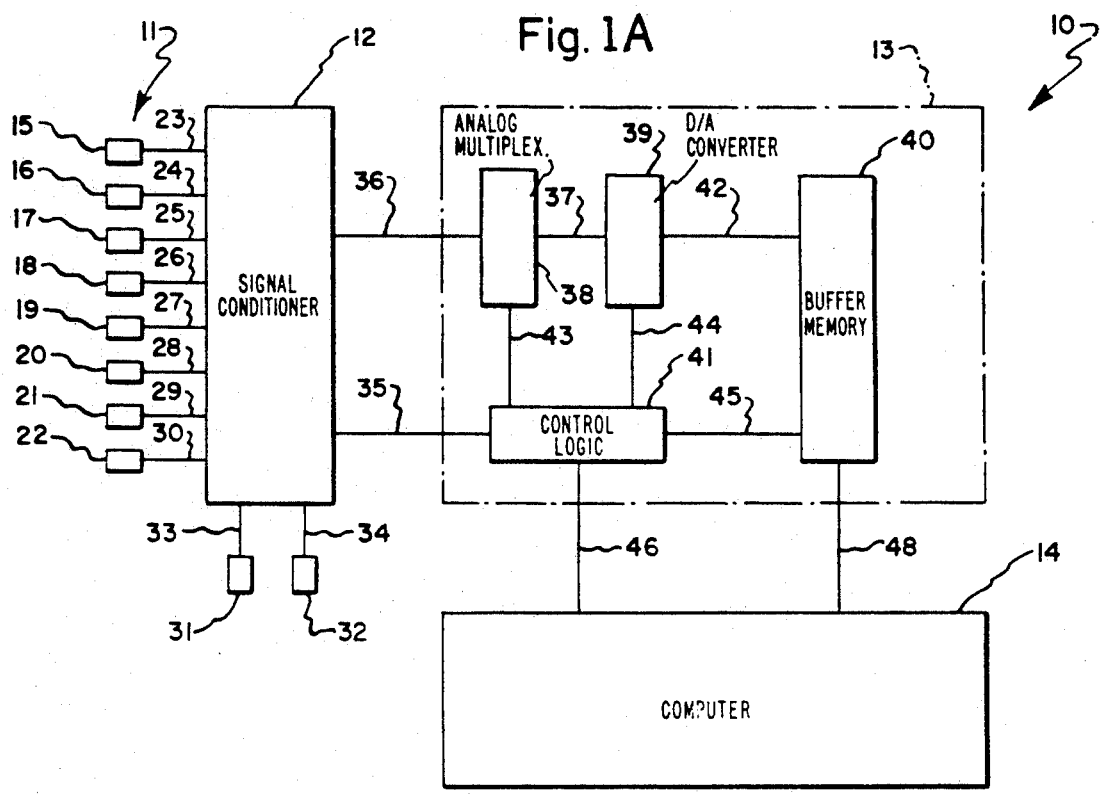
FIG. 1A shows a block diagram of the apparatus aspect of the invention.

At the outset, it should be clearly understood that the drawings are to be read together with the specification, and are to be considered a portion of the entire "written description" of this invention, as required by 35 U.S.C. 112. Also, like reference numerals on different drawing figures refer to identical elements of the invention. The following definitions apply throughout the written description which follows:

"Vibrational signal"—refers to vibrational energy produced by a machine; also referred to in the written description as vibrational characteristics, vibrational data, acceleration signals, or acoustical signals; this energy is sensed and processed by the invention.

"Portable"—capable of being handheld and carried from place to place.

"Reference"—indicates a defect-free condition of a machine.

"Normal"—indicates a machine is operating free from defects.

"Abnormal"—indicates a machine is operating with defects or maladjustments.

"Test"—indicates condition or state of a machine is unknown. A machine under "test condition" is one being analyzed or diagnosed to determine whether it is operating normally or abnormally (defect-free or with defects).

"Signature"—is a time-domain or frequency-domain signal obtained by sensing and processing vibrational characteristics of a machine.

"Reference signature"—is a signature of a machine under reference (defect-free) operating conditions.

"Test signature"—is a signature of a machine under test operating conditions.

"Localized maximum"—is a maximum amplitude within a particular region of a signal.

"Envelope"—is an outline of an amplitude-modulated wave, and may also be defined as the curve passing through the extremes of a waveform.

"Significant local maximum"—is a maximum amplitude within a particular region of an envelope.

"Significant local minimum"—is a minimum amplitude within a particular region of an envelope.

"Peak"—is a significant local maximum of a waveform.

"Valley"—is a significant local minimum of a waveform.

"Event"—is a region of time of a vibration signal during which significant, (i.e., significantly more than background noise), vibrational energy is present.

"Similar Event"—are events having similar characteristics, e.g., time of occurrence or amplitude.

"Clustered Events"—a set of similar events from two or more operations of a machine under similar conditions (e.g., two reference signals or two test signals).

"Window"—is a region of a time-domain signal. In the present invention, windows may be automatically selected so as to include one or more events.

"Segment"—is a region of a reference or test signature, and may be either in the time domain or the frequency domain.

"Maximum, minimum, and intermediate amplitude"—refers to a maximum, minimum, and intermediate amplitudes within segments of the test and reference signature.

"Resolution ratio"—is a measure of the decision-making reliability. More specifically, it is the ratio of the Mean Test Distance (MTD) to the Mean Reference Distance (MRD). (See Step 10 under The Method infra for a definition of MTD and MRD.)

"Remote"—refers to a significant distance from the machine element being diagnosed.

The Apparatus

FIG. 1A shows a block diagram of the apparatus aspect of the invention. Hardware system 10, which implements the method of the invention, comprises vibrational sensor bank 11, signal conditioner system 12, data acquisition system 13, and computer 14. At the outset, it should be understood that lines 35, 36, 37, 42, 43, 44, 45, 46 and 48 are single-line schematic representations of a plurality of lines. Vibrational sensor bank 11 comprises accelerometers 15-22 which are secured to the machine being monitored. The accelerometers may be any device capable of sensing vibrational energy, such as Kistler Model Nos. 8642A or 8624. Moreover, although sensor bank 11 is depicted here as comprising accelerometers, it is understood that any device capable of sensing vibrational energy will suffice. For example, sensitive microphones which detect acoustic energy can also be used successfully.

Acceleration signals from accelerometers 15-22 are transmitted to signal conditioner system 12 via coaxial cables 23-30. Signal conditioner system 12 bandlimits the sensor signals to approximately 0-10 KHz to prevent aliasing of the sampled signal. Signal conditioner system 12 also includes an adjustable gain amplifier and supplies the bias current for the sensors. Signal conditioner system 12 may be any circuit capable of bandlimiting the sensor signals to prevent aliasing and also capable of powering the transducers and providing adjustable gain to the transducer signals. System 12 preferably interfaces via an expansion circuit board which plugs into an IBM-PC ® compatible computer. This feature enhances the overall portability of the invention. In a preferred embodiment, signal conditioner system 12 comprises Programmable Filter, model PF-1, and Vibration Power Supply and Amplifier, model VPA-1, available from Tree Data Products Corporation, Buffalo, N.Y.

Figure 1B:
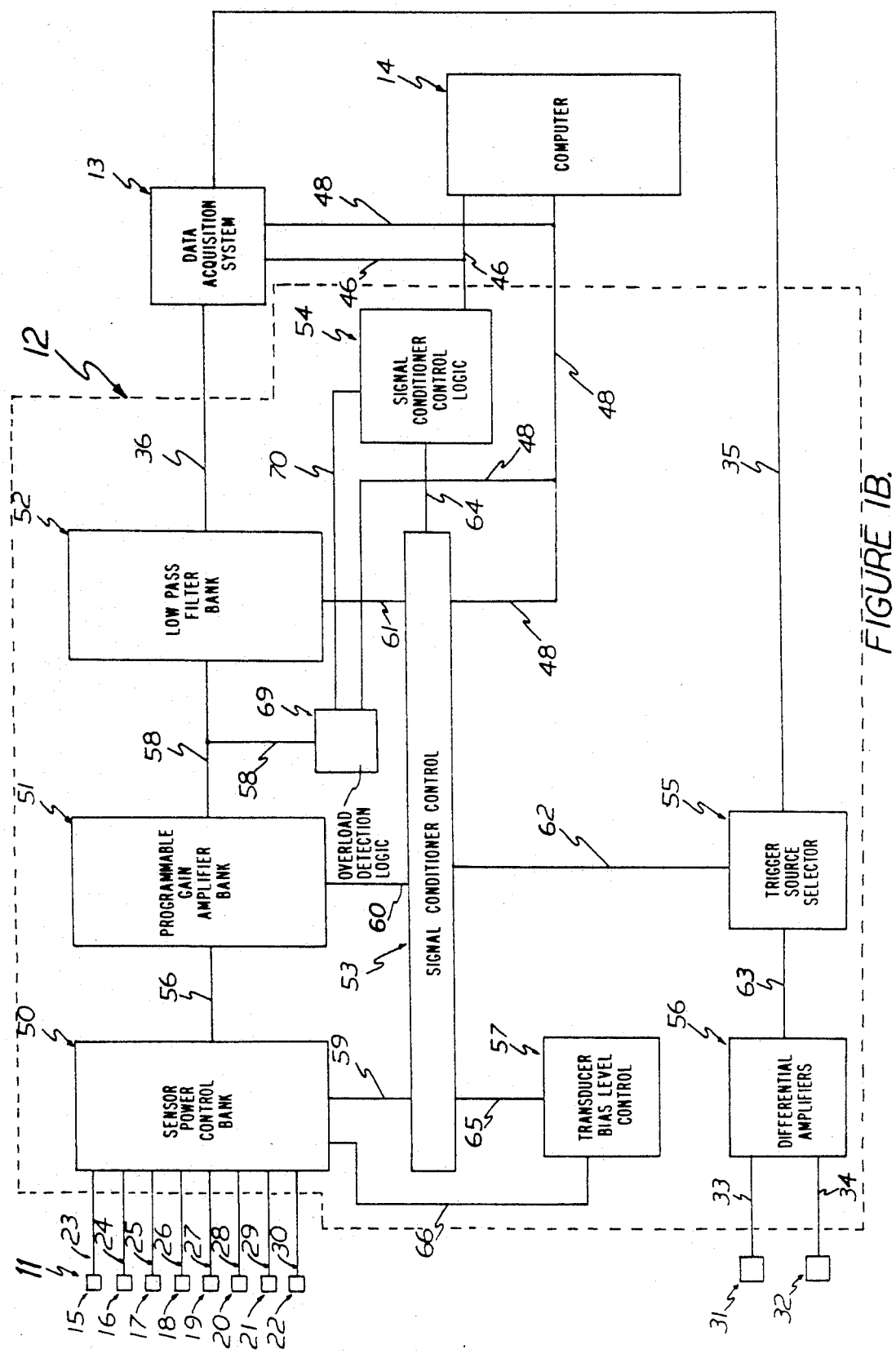
FIG. 1B shows a block diagram of the signal conditioner system of the apparatus aspect of the invention.

Referring now to FIG. 1B, signal conditioner system 12 is shown to include sensor power control bank 50, programmable gain amplifier bank 51, low pass filter bank 52, signal conditioner control 53, signal conditioner control logic 54, transducer bias level control 57, trigger source selector 55, overload detection logic 69, and differential amplifiers 56. At the outset, it should be understood that lines 56, 58, 59, 60, 61, 62, 63, 64, 65, 66, and 70 are single-line schematic representations of a plurality of lines.

Sensor power control bank 50 provides proper bias current to each transducer 15-22 via lines 23-30, as determined by signal conditioner control 53 and communicated via line 59. Control 53 selectively enables or disables the bias current for each transducer independently so that transducers which do not need the bias current can be used as vibration signal sources. For example, an external microphone which senses acoustical vibrational energy would not necessarily require a bias current. Transducer bias level control 57 selectively adjusts the bias current level, via line 66, provided to transducers 15-22, to accommodate a wide variety of transducers from various manufacturers. Signal conditioner control 53 communicates the bias level to be used via line 65 to transducer bias level control 57.

Acceleration signals from sensor bank 50 are communicated via line 56 to programmable gain amplifier bank 51. Amplifier bank 51 provides variable amplification of the acceleration signals, independently selectable for each signal, as controlled by signal conditioner control 53 via line 60. In a preferred embodiment, control 53 selects one of eight possible gain settings depending upon the expected amplitude of the acceleration signal being processed.

Amplified signals from amplifier bank 51 are communicated via line 58 to overload detection logic 69. Overload detection logic 69 determines if a signal has an amplitude that is too high (absolute value is too high) such that data acquisition system 13 would not be able to properly digitize the signal. In a preferred embodiment, the signal range must be limited to 10 volts in order to accurately represent the data in digital form. An indication of overload is saved for each signal individually and is communicated to computer 14 via data line 48 under the control of signal conditioner control logic 54 via line 70.

Amplified signals from amplifier bank 51 are also communicated via line 58 to low pass filter bank 52. Filter bank 52 bandlimits the acceleration signals to approximately 0-10 KHz to prevent aliasing of the sampled signals. In a preferred embodiment, filter bank 52 may be designed to provide a plurality of bandpass filter frequencies. In an embodiment shown in FIG. 1B, filter bank 52 provides two bandpass frequencies. For example, for a sampling rate of 32 KHz, a bandpass frequency of 10 KHz is provided, whereas for a sampling rate of 16 KHz, a bandpass frequency of 5 KHz is provided. The appropriate bandpass frequency is selected independently for each signal by signal conditioner control 53 and communicated to filter bank 52 via line 61. The amplified and filtered acceleration signals are communicated to data acquisition system 13 via line 36.

As shown in FIGS. 1A and 1B, inputs 31 and 32 are used to synchronize data acquisition system 13 to external events. For example, input 31 may sense the "trip" of a circuit breaker and input 32 may sense the "close" of a circuit breaker. This data is communicated to signal conditioner system 12 via data lines 33 and 34, respectively, and is processed by system 12 and then used to trigger the data acquisition system 13 via line 35.

Referring to FIG. 1B, synchronizing event signals are received at inputs 31 and 32 via lines 33 and 34, respectively. Differential amplifier 56 receives the synchronizing event signals and adjusts (amplifies) and references (isolates) the signals to internal system voltage levels. The adjusted and referenced synchronization signals are communicated to trigger source selector 55 via line 63. Trigger source selector 55 selects the appropriate synchronizing signal for initiating the data acquisition in response to a control signal from signal conditioner control 53 communicated via line 62. The trigger information is communicated to data acquisition system 13 via line 35.

Signal conditioner control logic 54 communicates with computer 14 via control line 46 and provides appropriate operation signals for signal conditioner control 53 via line 64 and to overload detection logic 69 via line 70. Computer 14 communicates with signal conditioner control 53 via data line 48 to store the desired control settings for the signal conditioning system. Signal conditioner control 53 controls the operation of sensor power control bank 50, programmable gain amplifier bank 51, low pass filter bank 52, transducer bias level control 57, and trigger source selector 55 via lines 59, 60, 61, 65, and 62, respectively. Overload detection logic 69 communicates with computer 14 via data line 48 to indicate which signals (if any) have amplitudes which cannot be properly digitized (because the amplitudes are too large) by data acquisition system 13.

Referring to FIG. 1A, data acquisition system 13 comprises analog multiplexer 38, analog to digital converter 39, buffer memory 40, and data acquisition control logic 41. Analog vibration signals which have been filtered and amplified by system 12 are transmitted via multiple data lines to analog multiplexer 38. After multiplexing, the signals are transmitted to analog to digital converter 39 via data line 37. The digitized data is then transmitted to buffer memory 40 via data line 42 for later processing by computer 14. Data acquisition control logic 41 controls the timing of the data processing of multiplexer 38, analog to digital converter 39, and buffer memory 40, via control lines 43, 44, and 45, respectively. Data acquisition control logic 41 also communicates with computer 14 via control line 46 and receives trigger information from signal conditioner system 12 via line 35. Digitized data is communicated from buffer memory 40 to computer 14 via data line 48.

In practice, data acquisition system 13 may be any circuit capable of multiplexing analog input signals, converting these signals to digital data and storing the data in memory for later processing. Once again, it is preferable that system 13 be arranged on a circuit board which fits into a standard IBM-PC expansion slot. In a preferred embodiment, it was found that Model ISC-16 Computer Scope, available from R & C Electronics, functions satisfactorily for this purpose. Model ISC-16 permits sampling of up to sixteen channels at a 1 MHz aggregate throughput. The data is deposited in a 128 kilobyte memory buffer which stores 65,536 samples total or 8192 samples per channel with 8 total channels. At a sampling rate of 32 KHz, this permits acquiring approximately 0.25 seconds, or 15 cycles, of vibrational data per operation of a momentarily operating machine. This is more than adequate for diagnosing momentarily operating machines such as circuit breakers, and continuously operating machines such as motors and turbines.

Similarly, computer 14 may be any computer, but preferably a portable or personal computer which is IBM-PC compatible. In a preferred embodiment, a Compaq ® III portable computer was found to operate satisfactorily. Computer 14 processes all of the digitized vibration data, including performing the Fast Fourier Transforms necessary to create the power spectra, selecting appropriate time-domain windows and frequency-domain segments, comparing the reference and test signatures, and implementing the decision-making aspect of the method of the invention. A listing of the source program (in C language and also in 8088 assembly language) is included in this specification just prior to the claims and constitutes part of the written description of the invention in accordance with 35 U.S.C. 112. Computer 14 also provides an indication on its display as to the mechanical condition of the machine being monitored.

The Method

At the outset, it should be understood that the method described herebelow is a preferred embodiment of the method of the invention. As such, several steps are described as "optional". Optional steps are those steps which are not absolutely necessary to implement the method of the invention, i.e., the method achieves the stated objects of the invention even without these steps. Hence, optional steps are not critical limitations of the claimed invention. The method of the invention comprises several steps as follows:

1. Sense and monitor one or more sets of time-domain vibrational characteristics of machine in reference (defect-free) condition.
2. Select quantity, size, and location of windows in time-domain vibrational data. (Optional step)
3. Process time-domain vibrational data obtained in Step 1 by a linear or non-linear transformation to create one or more sets of reference signatures. If windows were selected under Step 2, process time-domain vibrational data using window configuration selected in Step 2.
4. Isolate preselected segments of the reference signature. (Optional step)
5. Store representations of one or more sets of reference signatures from Step 3 in memory.
6. Sense and monitor one or more sets of time-domain vibrational characteristics of machine under test condition.
7. Process time-domain vibrational data obtained in Step 6 by a linear or non-linear transformation to create one or more sets of test signatures. If windows were selected under Step 2, process time-domain vibrational data using same window configuration selected in Step 2.
8. Compute one or more average sets of reference and test signatures from sets of reference signatures previously stored in Step 5 and sets of test signatures computed in Step 7. (Optional step)
9. Compare test and reference signatures. If averaging was performed in Step 8, compare test and reference signature averages. If segments were selected in Step 4, process comparison on data corresponding to the selected segments.
10. Render decision based upon comparison in Step 9 as to mechanical condition of machine, (normal, abnormal, etc.).
11. Indicate decision (condition of machine).

Step 1—Sense and Monitor One or More Sets of Time Domain Vibrational Characteristics of Machine in Reference (Defect-Free) Condition.

The first step in diagnosing a machine is to sense and monitor the vibrational characteristics of a machine known to be operating defect-free. One or more sensing transducers are used simultaneously to acquire vibrational data during operation of the machine. This normal operating condition is defined as the reference condition. For momentarily operating machines, the vibration should obviously be monitored while the machine is in operation. Circuit breakers, for example, should be monitored during open (trip) and close operations. It may be necessary, due to slight variations in machine vibration characteristics, to collect multiple sets of vibration data, followed by an averaging process, as described in Step 8, to obtain an average machine reference signature. In the decision-making process of a preferred embodiment, it is necessary to have multiple sets of data, as discussed infra.

Continuously operating machines may yield pertinent vibration data both during transient (start-up or braking) or steady-state operation. Induction motors, for example, produce very high torque at start-up and certain mechanical elements may be subject to failure during this time. Some motor elements, however, may demonstrate abnormal vibration under steady-state load conditions. The method of the invention is capable of diagnosing machine elements under all operating conditions.

Figure 2A:
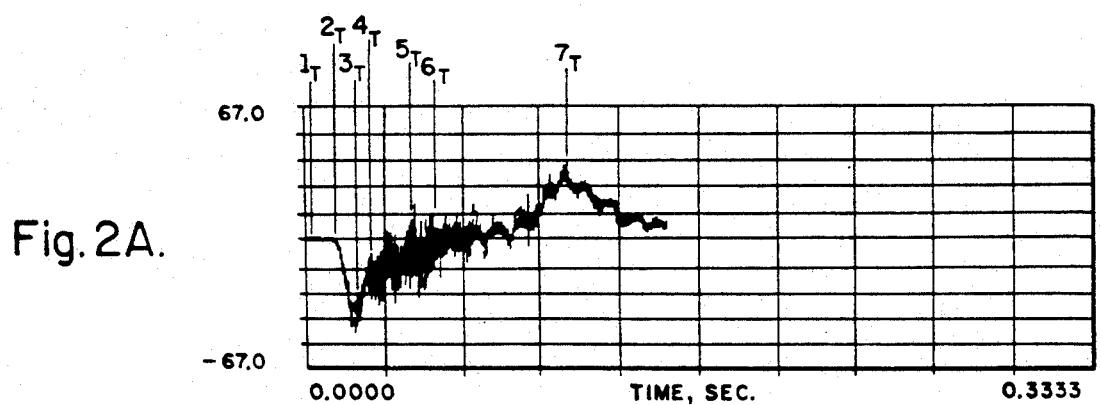
FIG. 2A is a plot of an actual vibration acceleration signal obtained from a circuit breaker during a trip operation.
Figure 2B:
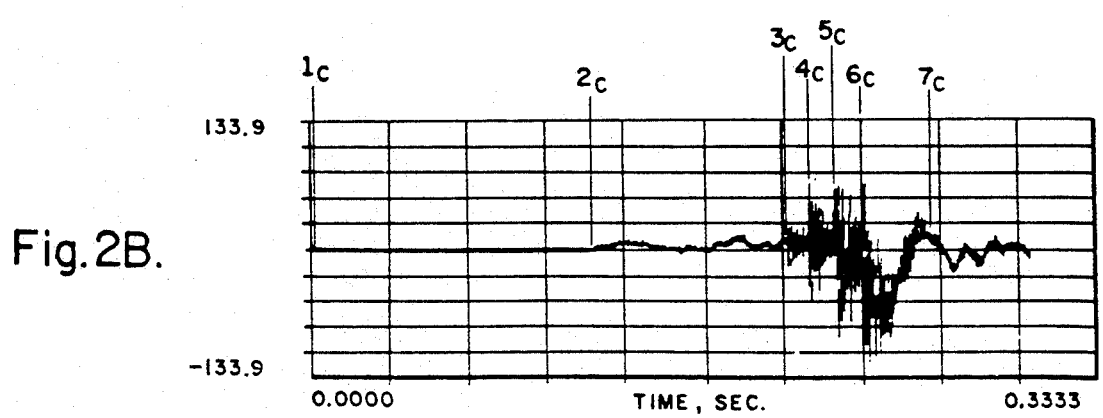
FIG. 2B is a plot of an actual vibration acceleration signal obtained from a circuit breaker during a close operation.
Figure 3A:
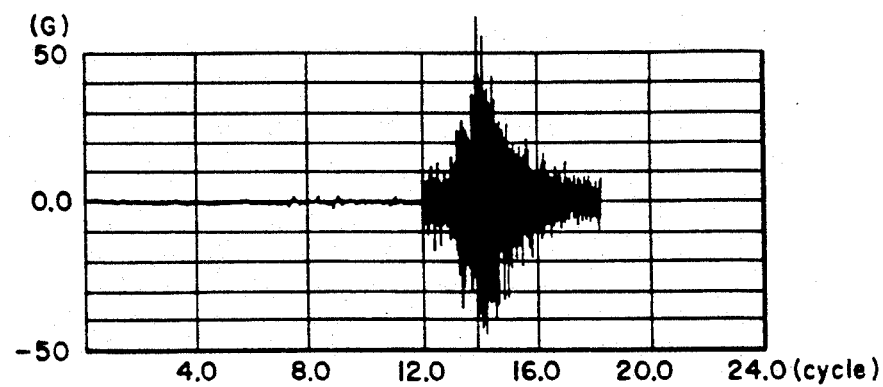
FIG. 3A is a plot of an acceleration signal from a circuit breaker obtained during a close operation when no defects are present.
Figure 3B:
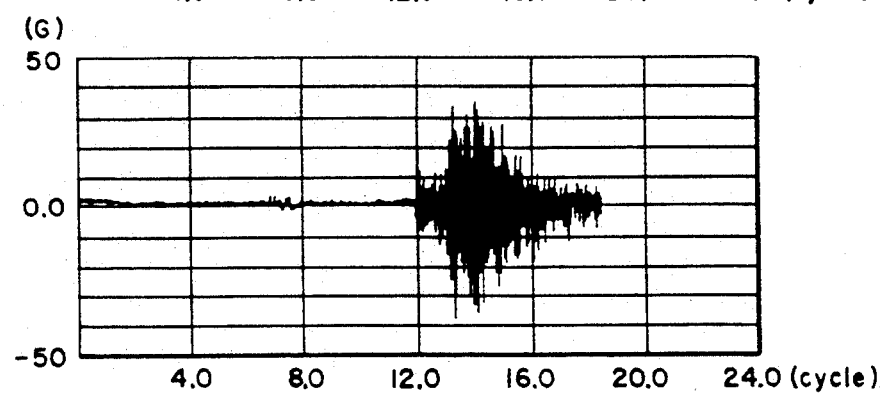
FIG. 3B is a plot of an acceleration signal from the same defect-free circuit breaker described in FIG. 3A, but obtained at a different time.
Figure 3C:
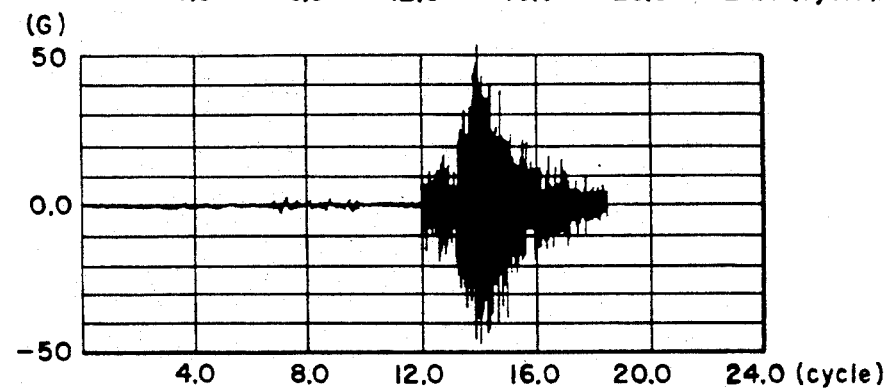
FIG. 3C is a plot of an acceleration signal from the same circuit breaker described in FIG. 3A, but with a defective pull rod.
Figure 3D:
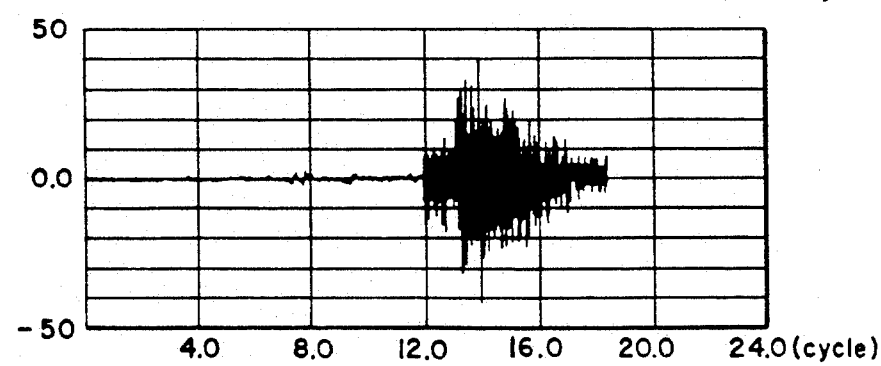
FIG. 3D is a plot of an acceleration signal from the same circuit breaker described in FIG. 3A, but with modified stationary contacts.

FIGS. 2A and 2B illustrate the first step of the method—sensing and monitoring time-domain vibrational characteristics of a machine in a reference (defect-free) condition. FIG. 2A is an actual vibration acceleration signal obtained from a circuit breaker during a trip operation. The signal was obtained using the present invention by securing accelerometers to the wall of a circuit breaker and monitoring the vibration over time. The ordinate of the plot is in units of G (where G is the acceleration of a freely falling body due to gravity, approximately equal to 32 ft./sec.$^2$ or 9.8 m./sec.$^2$ near the earth's surface), and the abscissa is in units of seconds. Reference numerals $1_T$ through $7_T$ on the plot refer to discrete events which occur as a circuit breaker opens as follows:

$1_T$—Trip signal received by circuit breaker
$2_T$—Motion of mechanical elements of breaker begins
$3_T$—Kick-off spring separates
$4_T$—Main contacts separate
$5_T$—Accelerating spring separates
$6_T$—Main moving contacts separate from resistors
$7_T$—Low frequency bouncing Similarly, FIG. 2B represents an acceleration signal obtained from a circuit breaker during a close operation. Reference numerals $1_C$–$7_C$ on the plot refer to discrete events which occur as a circuit breaker closes as follows:

$1_C$—Close signal received by circuit breaker
$2_C$—Motion of mechanical elements of breaker begins
$3_C$—Isolating contacts touch
$4_C$—Main moving contacts touch resistors
$5_C$—Accelerating spring contact
$6_C$—Main contacts touch and kick-off spring touches
$7_C$—Low frequency bouncing FIGS. 3A–3D illustrate the difficulties in diagnosing the condition of machines by analyzing vibration data in the time domain. FIGS. 3A and 3B represent acceleration signals of a defect-free circuit breaker, and FIGS. 3C and 3D represent acceleration signals of the same circuit breaker operating with defects or abnormalities. The ordinate in the figures is in units of G, while the abscissa is in units of cycles, where 1 cycle=16.67 milliseconds.

FIG. 3A is a signal obtained from a circuit breaker having no defects obtained during a close operation. The signal in FIG. 3A is said to be a first defect-free time signal. FIG. 3B is a signal obtained from the same circuit breaker having no defects, but obtained at a different time. The signal in FIG. 3B is said to be a second defect-free time signal. It can be seen from FIGS. 3A and 3B that even the vibration signature of a defect-free machine can vary over time.

FIG. 3C is a signal obtained from the same circuit breaker but with a defective pull rod, and FIG. 3D is a signal obtained from the same circuit breaker but with modified stationary contacts. Both of these defects are significant and can lead to complete machine failure if not diagnosed and corrected.

Comparison of the signals from the defective breaker in FIGS. 3C and 3D with the first and/or second defect-free signals of FIGS. 3A and 3B illustrates the difficulty a human operator encounters in attempting to detect a defect. While the operator may be capable of detecting differences in the overall amplitude of the envelope of the waveform shown in FIGS. 3D and 3A, or 3C and 3B, it is virtually impossible to detect the subtle differences between the signals of FIGS. 3A and 3C, or 3B and 3D. Moreover, the operator is further confounded by the differences in the two normal signals. Even if the operator could solve the dilemma caused by having two different defect-free signals, and even in cases where he can detect the differences between the first and second defect-free signals, it is much more accurate and cost effective to perform this analysis electronically.

Step 2—Select Quantity, Size, and Location of Windows in Time Domain Vibrational Data (Optional Step).

In a preferred embodiment, the second step in the method is to select the quantity, size, and location of windows in the time domain. This step of the method includes a processing mechanism to isolate short regions, or windows, of the time-domain acceleration signal. These windows contain information which is useful in the later comparison step of the method. Once the windows have been selected, the data within each window are processed.

Figure 4A:
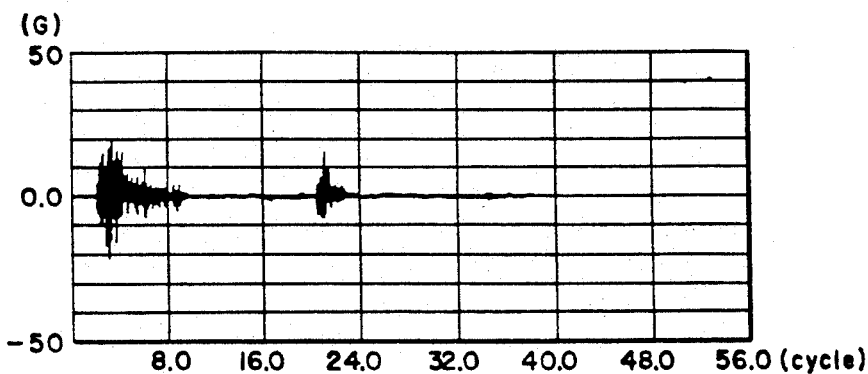
FIG. 4A shows a time-domain acceleration signal obtained from a circuit breaker during an open operation.

The present invention utilizes several methods to establish the placement of windows. Windows may be set manually based upon test data of previously tested similar machines. For example, FIG. 4A shows the acceleration signal of a particular machine. The excitation is strong between 0-8 cycles and between 20-24 cycles, whereas little activity appears between 8-20 cycles. Also, the amplitude varies with time within the excited regions. This observed information suggests that windows located at 0-8 cycles and 20-24 cycles would be appropriate for machines of similar type.

Alternatively, automatic window placement may be achieved by algorithms which locate events in the envelope obtained from the acceleration signal. Step 2 utilizes a technique based on peaks and valleys in the envelope obtained from the acceleration signal. Step 3.3 infra describes additional methods of event location that can be used in a similar manner. Referring to FIGS. 7A-7G, the automatic window placement method comprises the following steps:

Step 2.1—Signal Processing

The first step is to analyze the original acceleration signal to determine envelopes containing meaningful information. In a preferred embodiment, this is achieved by rectifying the original time-domain acceleration signal and determining localized maxima of the signal. FIG. 7A represents an original time-domain acceleration signal. FIG. 7B represents the rectified time-domain acceleration signal of FIG. 7A, where rectification is achieved by obtaining the absolute value of the original signal. The rectified time-domain signal of FIG. 7B comprises a set of discrete data points. For example, the signal may comprise 8192 data points. The localized maxima of the rectified signal is obtained by sequentially analyzing all of the data points in groups of three, determining the maximum value of the three points, saving the maximum value and its corresponding time coordinate. This process is repeated a number of times to reduce the number of data points which define the envelope while retaining the essential characteristics of the envelope and enabling application of a least-square error linear fit for the detection of peaks and valleys. For purposes of this description, a peak is defined as a significant local maximum of a waveform, whereas a valley is defined as a significant local minimum of a waveform.

In a preferred embodiment, this localized maxima determination process is repeated four times. FIG. 7C represents the resultant signal after the first localized maximum determination pass; FIG. 7D represents the resultant signal after the second localized maximum determination pass; FIG. 7E represents the resultant signal after the third localized maximum determination pass; and FIG. 7F represents the resultant signal after the fourth and final localized maximum determination pass.

Step 2.2—Peak and Valley Extraction

A number of techniques may be utilized to determine the peaks and valleys of the envelope. For example, least-square error quadratic fits or other well-known curve-fitting techniques may be used. In a preferred embodiment, a least-square error linear fit method is employed. The manner in which peaks are detected using this method is illustrated by FIG. 7G. FIG. 7G represents the signal of FIG. 7F which results from the final localized maximum determination pass, but with an expanded time abscissa. The set of points comprising the envelope is gradually reduced by eliminating a point on the envelope from one end. Before removal of each point, a well known least-square error linear fit routine is applied and the slope of the resultant line is determined. The slope of the line corresponding to each set of points is saved. The resultant set of slopes is analyzed. A peak is defined as a point about which the slope changes from increasing to decreasing, whereas a valley is defined as a point about which the slope changes from decreasing to increasing. The manner in which peaks are detected using this method is illustrated by FIG. 7G, which shows the envelope obtained after the final local maximum determination pass. Analysis of the lines labeled 1, 2, and 3 reveals the following:

| | |
|---|---|
| Line 1: | number of time-domain points = 154 |
| | corresponding time instant = 204 ms (approx.) |
| | slope of linear fit = 1.8 units |
| Line 2: | number of time-domain points = 134 |
| | corresponding time instant = 125 ms (approx.) |
| | slope of linear fit = 5.8 units |
| Line 3: | number of time-domain points = 132 |
| | corresponding time instant = 114 ms (approx.) |
| | slope of linear fit = 5.38 units |

Thus, the slope of line 3 has decreased, indicating the presence of a peak. The peak detected by this method occurs at approximately 122 ms. This peak is clearly shown in FIG. 7G. Valleys are detected in a similar manner. FIG. 7H illustrates a table of peaks and valleys obtained for the least-square error linear fit method as applied to the envelope shown in FIG. 7G.

Step 2.3—Event Extraction

The event extraction process employs a rule-based algorithm to eliminate unnecessary and insignificant peaks and valleys from among those determined in Step 2.2. An event is defined as a region of time during which significant vibrational energy is present. Events are determined by analysis of the peaks and valleys of the envelope corresponding to the acceleration signal. An intermediate step in extracting events is the removal of insignificant peaks and valleys. In a preferred embodiment, two rules are utilized to remove unwanted peaks and valleys:

Rule 1—If peaks and valleys are within 2 msec. of each other, both the peak and the valley are discarded.

Rule 2—If a peak is less than 10% in magnitude from the highest peak, the smaller peak is regarded as insignificant and is discarded.

Two further rules are utilized to extract events from the remaining peaks and valleys:

Rule 3—For each peak, the event is defined to begin and/or end at the valley adjacent to a peak if the valley is of amplitude greater than 10% of the peak.

Rule 4—If the valley is of amplitude less than 10% of the peak, the event is defined to begin and/or end at the nearest point adjacent to a peak where the envelope has a magnitude equal to or less than 10% of the peak amplitude.

Figure 8:
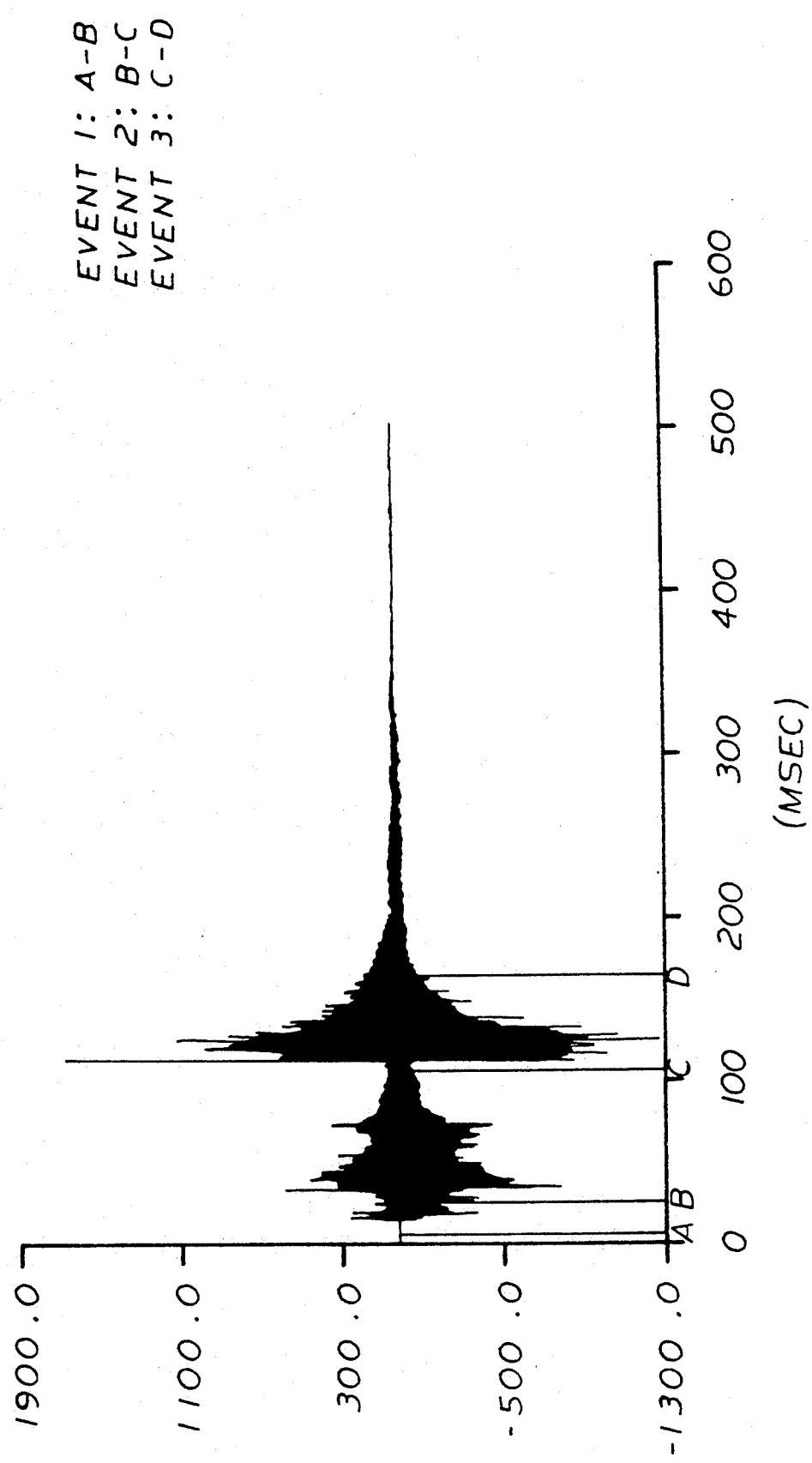
FIG. 8 shows the events located by the event extraction process for the acceleration signal of FIG. 7A.

FIG. 8 illustrates the events located by the event extraction process for the acceleration signal of FIG. 7A. The events are identified as occurring during time segments of the original signal described as follows:

| | |
|---|---|
| Event #1: | From 3.12 ms to 18.06 ms with the peak occurring at 15.96 ms (bounded by points A and B on FIG. 8). |
| Event #2: | From 18.06 ms to 101.68 ms with the peak occurring at 24.75 ms (bounded by points B and C on FIG. 8). |
| Event #3: | From 101.68 ms to 151 ms with the peak occurring at 117.97 ms (bounded by points C and D on FIG. 8). |

This time-domain window placement determination can be performed on one or more channels of data with the resultant events found on each analyzed for consistency so that the time-domain windows can be placed at similar positions on multiple channels. The final time-domain window placement is stored for later use in Steps 3 and 7.

Step 3—Process Time Domain Vibrational Data Obtained in Step 1 by a Linear or Non-linear Transformation to Create One or More Sets of Reference Signatures. If Windows Were Selected Under Step 2, Process Time Domain Vibrational Data Using Window Configuration Selected in Step 2.

The next step in the method is to process the time-domain vibrational data obtained in Step 1 by a linear or a non-linear transformation to create one or more sets of reference signatures. The transformation can be a linear transformation, such as a non-recursive transformation, (e.g., low-pass filter), or may be a non-linear transformation, such as a power spectrum transformation. The processing of the time-domain vibrational data may use any single combination of the following steps.

Step 3.1—Spectral Processing (Optional Step)

In a preferred embodiment, the time-domain acceleration signal is transformed into a frequency-domain spectrum. This conversion into the frequency domain is not absolutely necessary; the comparison process of the invention (Step 9) is capable of comparing both signals in the time domain and spectra in the frequency domain, with or without windowing. In a preferred embodiment, however, a short-time spectral processing technique is utilized to transform the time-domain signal into a frequency-domain spectrum. In short-time spectral analysis, a window is literally positioned over the sequence of data of the acceleration signal and, at each window position, the spectrum of the data inside the window is estimated.

In a preferred embodiment, a short-time power spectrum is used, which essentially comprises a series of smaller short-time spectra averaged together in a magnitude sense. The implementation of this computation uses the commercially available FTFPS routine from IMSL, (International Mathematical and Scientific Library) Inc., Houston, Texas, and a similar implementation uses the commercially available 87FFT routine from MicroWay Inc., Kingston, Mass. There exist other power spectrum estimation techniques, some of which are based on the autocorrelation function, which would yield similar results. The transformation of the autocorrelation function applied to the time-domain windowed data into the frequency domain is not necessary since the comparison process of the invention (Step 9) is capable of comparing both signals in the time domain and spectra in the frequency domain.

FIGS. 4A-4D illustrate application of short-time processing to a typical vibration signal.

Figure 4B:
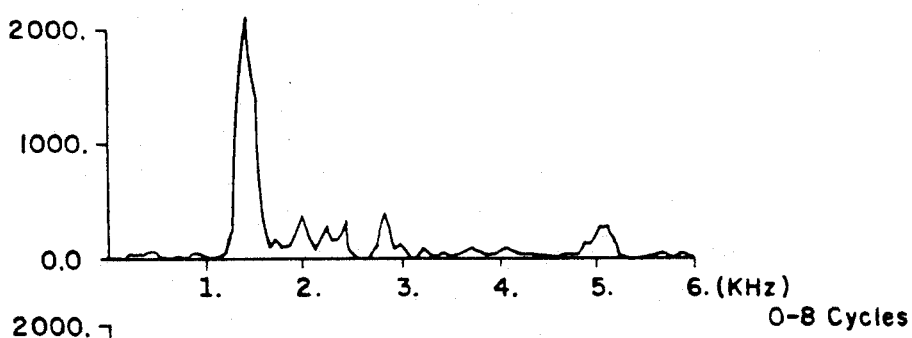
FIG. 4B shows the short-time power spectrum associated with a 0-8 cycle window of the signal shown in FIG. 4A.
Figure 4C:
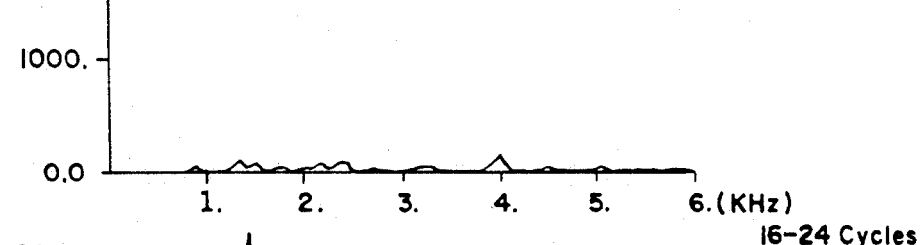
FIG. 4C shows the short-time power spectrum associated with a 16-24 cycle window of the signal shown in FIG. 4A.
Figure 4D:
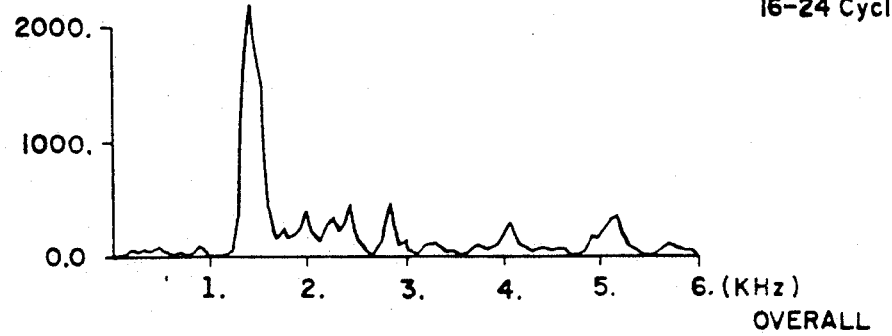
FIG. 4D shows the overall power spectrum of the signal shown in FIG. 4.

FIG. 4A shows an actual acceleration signal of a circuit breaker during an open operation. FIG. 4D shows the overall power spectrum of the signal of FIG. 4A. FIG. 4B shows the short-time power spectrum associated with a 0-8 cycle window of the signal in FIG. 4A, while FIG. 4C shows the short-time power spectrum associated with a 16-24 cycle window. It is shown that the overall power spectrum is very similar to the short-time power spectrum associated with the 0-8 cycle window, while it is considerably different from the short-time power spectrum associated with the 16-24 cycle window. This indicates that the power spectrum of a windowed segment of a signal can substantially determine the overall power spectrum. Therefore, spectral properties of some other portions of the signal (e.g., 16-24 cycle window of FIG. 4A) may be difficult, if not impossible, to ascertain by analysis of the overall power spectrum. It is obvious that the short-time power spectral analysis is capable of extracting more information than conventional power spectral analysis (without windowing). Certain events or defects which appear during certain times might otherwise go unnoticed or undetected if not for the windowing technique of short-time signal processing. This is not to say that windowing is a critical aspect of the invention. Indeed, even without windowing, the present invention detects and diagnoses defects which were previously undetectable by prior art devices. However, some defects may be incapable of detection without windowing.

In short-time spectral analysis, the size and position of the window should be chosen carefully. Windows which are too small may result in unreliable spectral estimation, and windows which are too large may produce spectra close to the overall spectrum. In a preferred embodiment, window sizes of two to four cycles are appropriate for a 16 KHz sampling rate. This is not to say that other window sizes will not work, only that these sizes have rendered satisfactory results. Once the sizes of the windows have been selected, the windows must be positioned, either manually or automatically as discussed in Step 2, supra, so that most of the events occur within them. For example, again referring to FIG. 4A, the two windows of size 8 cycles include most of the non-zero values of the signal and thus contain most of the events. In FIG. 4A, two windows were selected. In practice, the number of windows utilized varies depending upon the characteristics of the acceleration signal.

Step 3.2—Energy Processing (Optional Step)

In another preferred embodiment, the time-domain acceleration signal is transformed into its short-time energy representation. The short-time energy of a signal, e.g., E(t), for a signal, s(t), is defined by the following:

$$E_T(t) = \frac{1}{T} \int_{t-T/2}^{t+T/2} s^2(h)\, d(h)$$

where T, the window over which the averaging is performed, is a chosen constant. In a preferred embodiment, the values of T that have been tested and successfully used are 3.1 msec, 6.2 msec, and 12.4 msec, which correspond to 50, 100 and 200 data points, respectively, sampled at 16 KHz.

Step 3.3—Temporal Processing (Optional Step)

Figure 9A:
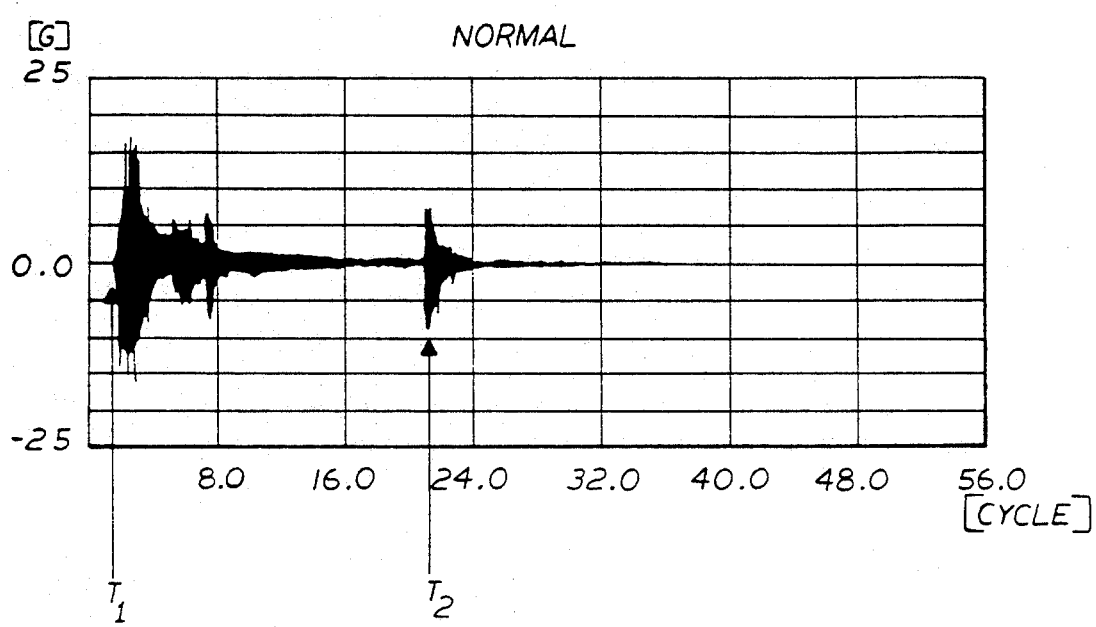
FIG. 9A shows an acceleration signal for a normal (defect-free) circuit breaker obtained during an open (trip) operation.
Figure 9B:
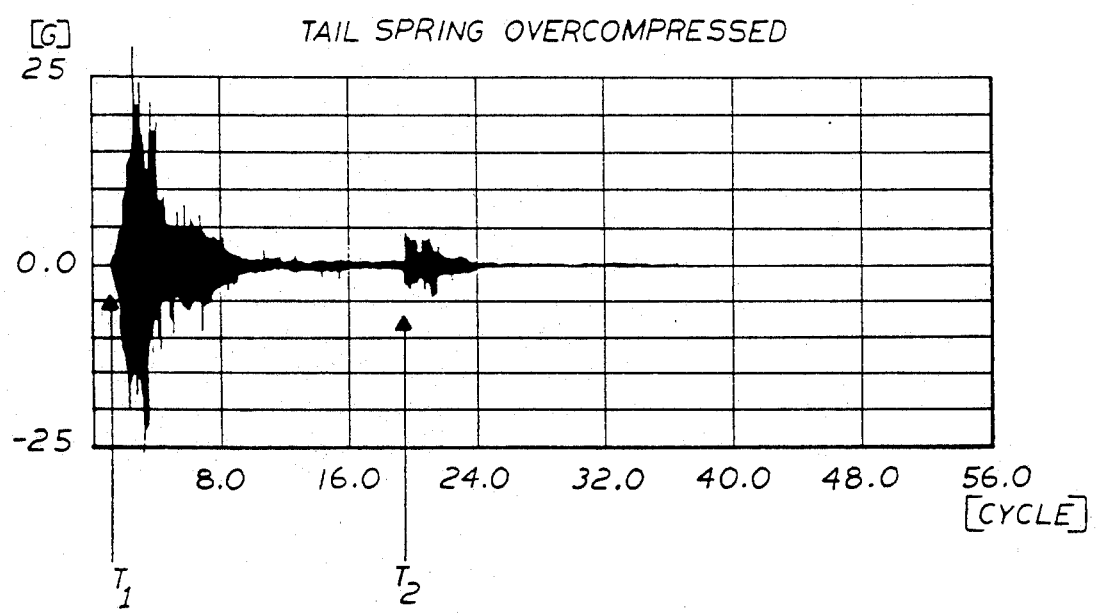
FIG. 9B shows a time-shifted acceleration signal obtained from the circuit breaker of FIG. 9A during an abnormal open (trip) operation, where the abnormality is caused by over-compression of the circuit breaker's tail spring.

In another preferred embodiment, event timing analysis in the time domain may further operate on the peaks and/or valleys as determined previously by Step 2.2, or any similar method, can provide additional information as to the condition of the machine. For example, FIG. 9A shows the data for a normal circuit breaker open (trip) operation and FIG. 9B shows the data for an abnormal circuit breaker open (trip) operation where the abnormality is the over-compressing of the breaker's tail spring. This causes a time shift in the envelope corresponding to a faster movement in its opening operation as shown in FIGS. 9A and 9B. FIG. 9C shows in a Table the timing information that was extracted from the peaks of the envelopes. These times could be further used to measure differences as, for example, between the first event and the second event, etc.

Yet another preferred embodiment computes an envelope of the vibrational signal (see FIGS. A to D and 11A to 11D) which is then optionally and selectively averaged with operations taken under similar circumstances and differentiated to form a reference time domain event signature. The process to determine the envelope may use several techniques. In a preferred embodiment, the Hilbert Transform, short-time energy and median filter have been found to produce satisfactory results.

The Hilbert Transform is used to obtain what is referred to as the analytic representation of a signal. The analytic signal, which consists of an envelope and phase, is an information preserving transformation of the original signal that brings out accurate and useful information for the diagnostic problem via appropriate digital signal processing algorithms.

It can be shown that a signal, e.g., s(t), and its Hilbert Transform, ŝ(t), can be expressed in the following form (analytic representation):

s(t) = a(t) cos [φ(t)]
ŝ(t) = a(t) sin [φ(t)]

a(t) and φ(t) are, respectively, called the envelope and phase functions for s(t). The complex signal s(t)+js(t) is called the analytic signal for s(t). a(t) contains all the original information in s(t) including the harmonics and its rapid transitions on the time axis which is the desired timing information.

An algorithm to retrieve the envelope function from recorded noisy data utilizing the Hilbert Transform has been developed (and is provided in Appendix A). The recorded noisy data is denoted as $$r(t) = s(t) + n(t) + b.$$

where n(t) is an additive noise term and b is an undesirable bias (d.c.) term that may appear in the recorded samples. The algorithm performs a Hamming-windowed bandpass filtering on r(t) to estimate s(t). This operation can be represented by the following:

$$S(w) \approx G(w)\, R(w),$$

where G(w) is the transfer function of the bandpass filter; the capital letters are used to identify the Fourier Transform of time domain signals. The Hilbert Transform of s(t) in the frequency domain is estimated via $$\hat{S}(w) \approx H(w)\, G(w)\, R(w).$$

where the Hilbert Transform transfer function is defined by $$H(w) = \begin{cases} jw, & \text{if } w < 0; \\ -jw, & \text{otherwise.} \end{cases}$$

s(t) and its Hilbert Transform are then obtained by performing inverse Fourier Transform on the signals S(w) and Ŝ(w) respectively. The envelope function is then computed using the following:

$$a(t) = \sqrt{s^2(t) - \hat{s}^2(t)}\ .$$

This estimate of the envelope function, a(t), contains high frequency fluctuations that are not critical for the timing analysis. As a result, a lowpass filter may be applied on the envelope to obtain a smoother envelope that also possesses the rapid transitions of s(t).

It should be noted that while the bandwidth of the original signal, i.e., s(t), is approximately 8 KHz; however, the bandwidth of the envelope function is significantly smaller. A study indicated that the bandwidth of a(t) is approximately between 200 Hz to 400 Hz (the user can select this bandwidth based on desired sharpness of a(t) in presence of noise). This implies that a significant reduction in the number of sampled data that are to be processed in the timing and Resolution Ratio(RR) calculations (a ratio of 1 to 40 for the 200 Hz band) may be possible. This optional downsampling is performed after the optional step of selective averaging which is described infra.

As noted above the short-time energy of a signal is also another method to compute an envelope of a signal. The short-time energy, E(t), of a signal, e.g., s(t), is defined by the following:

$$E_T(t) = \frac{1}{T} \int_{t-T/2}^{t+T/2} s^2(h)\, d(h)$$

where T, the window over which the averaging is performed, is a chosen constant. In a preferred embodiment, the values of T that have been tested and successfully used are 3.1 msec and 6.2 msec, which correspond to 50 and 100 data points, respectively, sampled at 16 KHz.

Again it should be noted that the bandwidth of the envelope function obtained after processing with the short-time energy is approximately between 200 Hz to 400 Hz. This again implies that a significant reduction in the number of sampled data that are to be processed in the timing and RR calculations (a ratio of 1 to 40 for the 200 Hz band) may be possible. This optional downsampling is performed after the optional step of selective averaging which is described infra.

Figure 10A:
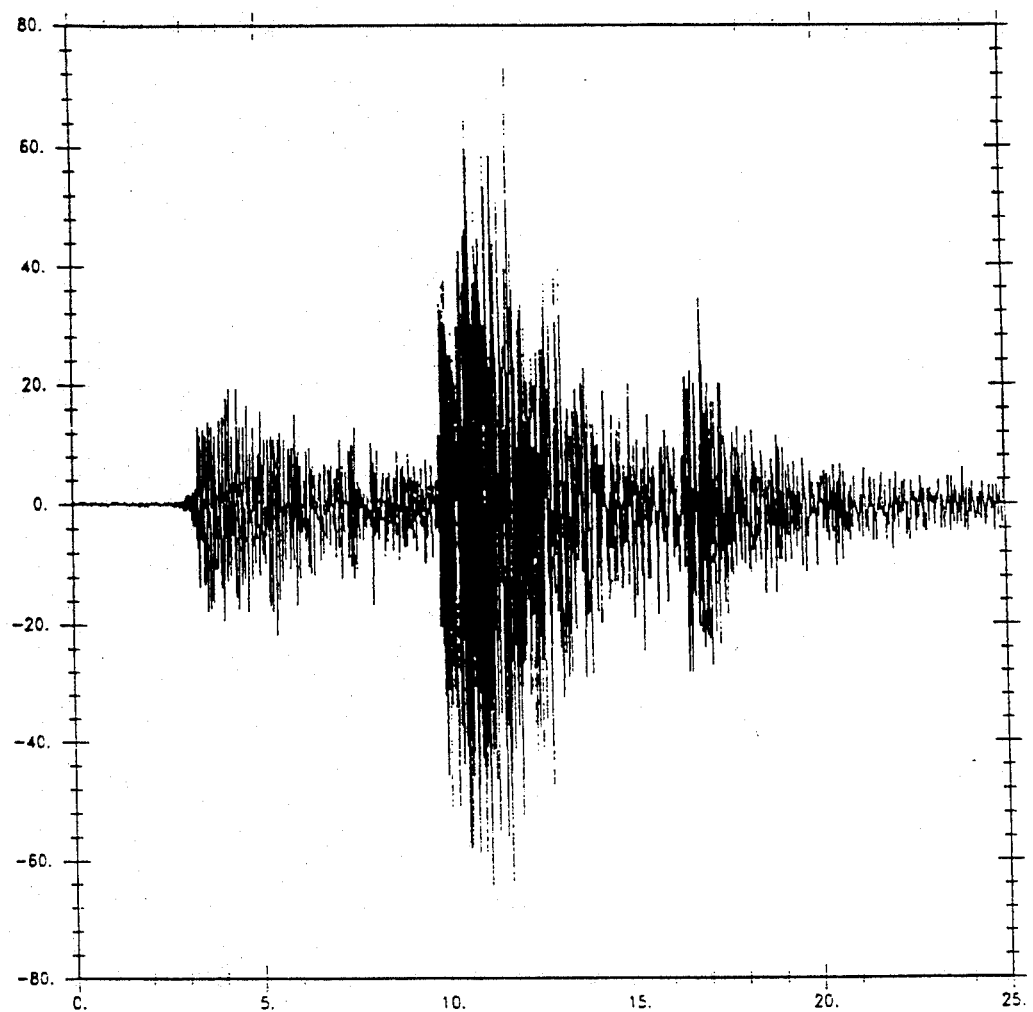
FIG. 10A is a plot of an acceleration signal from a circuit breaker obtained during a close operation when no defects are present.
Figure 10B:
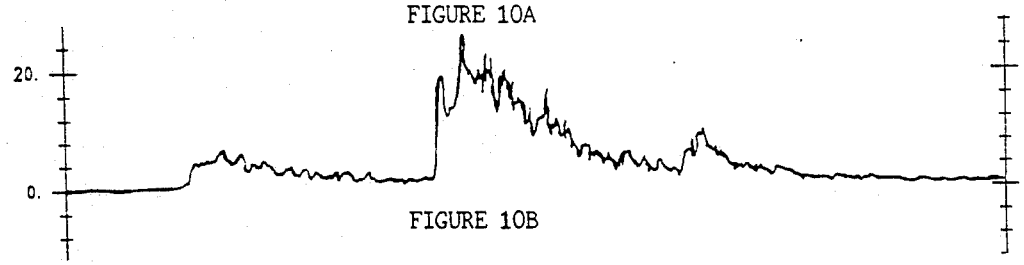
FIG. 10B is a plot of the envelope obtained from the Hilbert Transform of the acceleration signal shown in FIG. 10A.
Figure 10C:
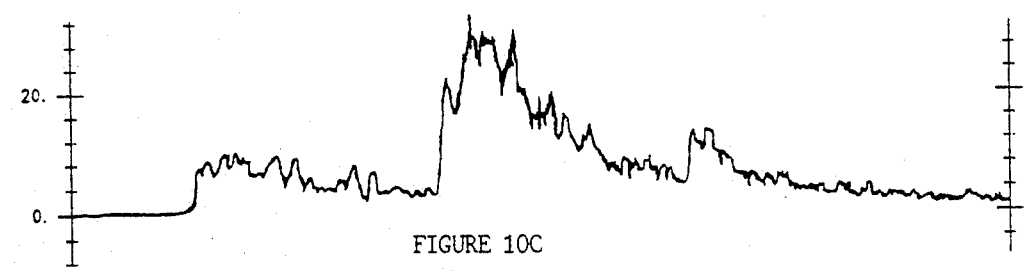
FIG. 10C is a plot of the envelope obtained from the Short Time Energy of the acceleration signal shown in FIG. 10A.
Figure 10D:
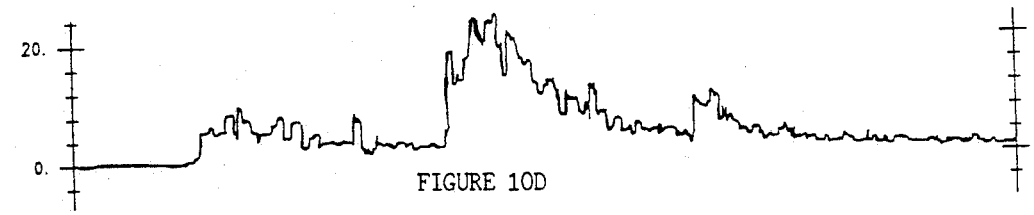
FIG. 10D is a plot of the envelope obtained from using a Median Filter on the acceleration signal shown in FIG. 10A.
Figure 11A:
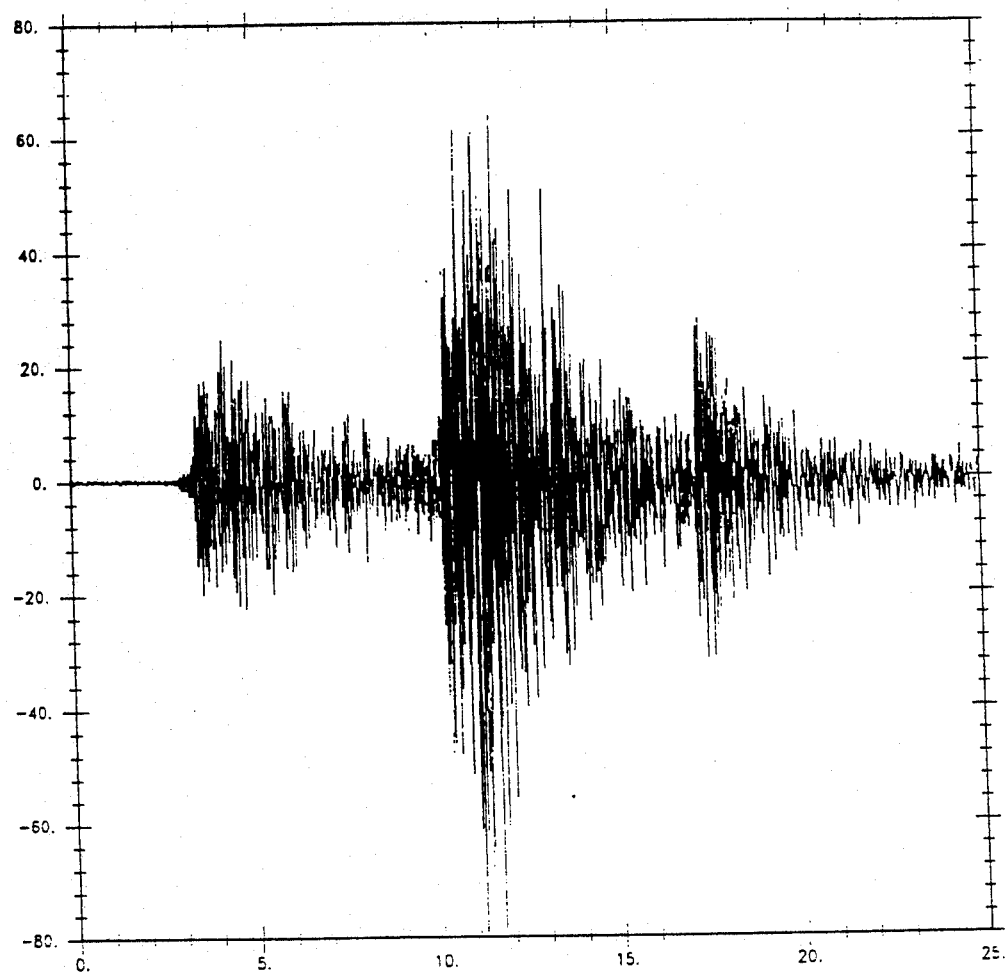
FIG. 11A is a plot of an acceleration signal from the circuit breaker whose normal signal is plotted in FIG. 10A, except taken during a close operation when the operating pressure is reduced.
Figure 11B:
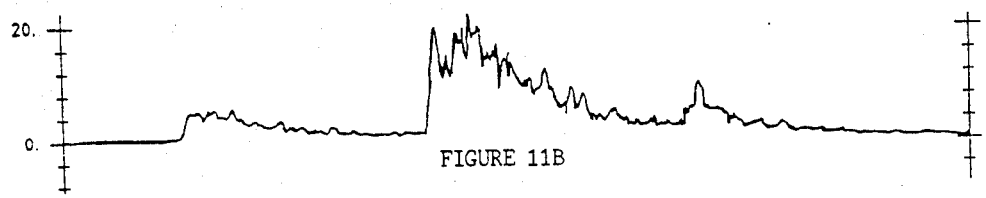
FIG. 11B is a plot of the envelope obtained from the Hilbert Transform of the acceleration signal shown in FIG. 11A.
Figure 11C:
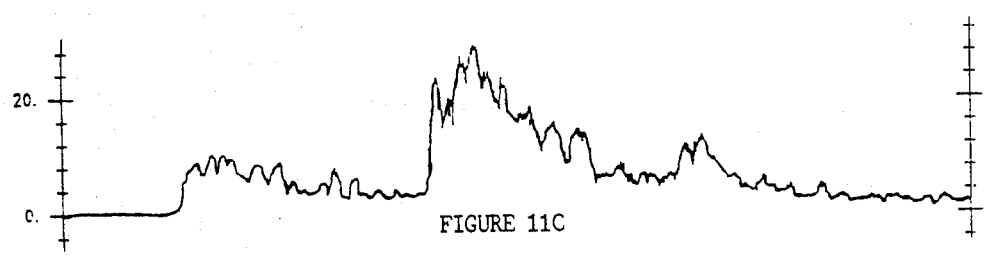
FIG. 11C is a plot of the envelope obtained from the Short Time Energy of the acceleration signal shown in FIG. 11A.
Figure 11D:
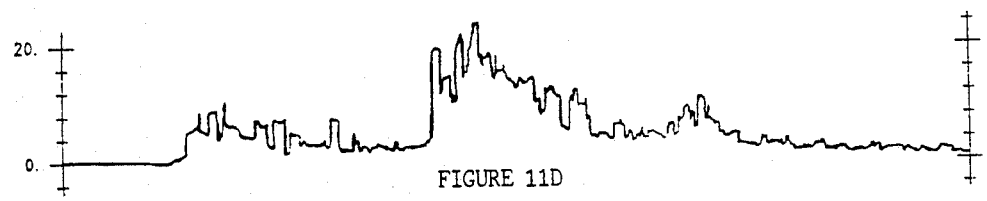
FIG. 11D is a plot of the envelope obtained from using a Median Filter on the acceleration signal shown in FIG. 11A

A median filter can also be applied to obtain an estimate of an envelope (FIG. 10D). In this method of computing an envelope, E(k), of a vibrational signal, X(k), is obtained by passing $|X(k)|$ several times through the smoother which is called a median filter. The output of the median filter is given by Output at $k = A_1(k)$, if $|A_1(k) - M(k)| \leq |A_2(k) - M(k)|$ $A(k)$, otherwise.

where
$A_1(k)$ = Average $\{X(k-N_1), \ldots, X(k-1)\}$
$A_2(k)$ = Average $\{X(k+1), \ldots, X(k+N_1)\}$
$M(K)$ = median $\{X(k-N_2), \ldots, X(k), \ldots, X(k+N_2)\}$ The median of a set is the value of the middle element after the set of elements have been ordered by value. The median filter tends to produce piecewise-constant type signals from which edges can be easily detected. In a preferred embodiment, the median filter is applied five times repeatedly to produce an adequate envelope with $N_1 = 20$ and $N_2 = 5$.

If it is found necessary or desirable to reduce the number of envelopes resulting from a multiplicity of similar operations, an averaging process may be used. In a preferred embodiment, the averaging process utilizes a selective test to determine if a potential point to be averaged is considered an outlier and thus should not be considered in the computation of the average. This method is thus specifically named selective averaging because of this process. The envelopes obtained from the Hilbert Transform and Short-Time Energy are selectively averaged when there are a multiplicity of similar operations. For each point in time, the median of the corresponding values of each of the envelopes is located and then a $+/-20\%$ range is established on either side of the median. In order for the point to be included in the average, its value must be within this range. This operation is repeated for all of the points in the envelope to produce an averaged envelope for later use.

After obtaining the envelope using any of these methods, and optionally downsampling the envelope, edges of the envelope can be obtained by differentiating the envelope. Differentiation can be performed by computing the derivative of the envelope by computing the Fourier Transform of the envelope, multiplying the transformed envelope by jw in the frequency domain and then computing the inverse Fourier Transform. Another technique for differentiating the signal is to use the difference operator which produces positive or negative going edges according to the relation, $$D(k) = \sum_{i=1}^{N_3} E(k + i) - \sum_{j=-N_3}^{-1} E(k + j).$$

In a preferred embodiment, the difference operator is applied to the envelope produced by the Median Filter with $N_3 = 2$.

After either method, the locations of positive going edges indicate the times of the physical events in the circuit breaker operation.

Some methods of envelope comparison described infra require the location of event times. Additionally, the located event times may be used to determine the placement of windows for the creation of reference signatures in a similar manner that the placement was performed in Step 2 for use in Step 3. The event extraction process would further analyze the reference event signature and create a list of likely events that correspond to physical actions occurring during the operation of the circuit breaker. Under the assumption that the physical events in circuit breaker operations will be separated in time by some predetermined interval, closely spaced positive going edges can be recognized as belonging to one physical event.

In a preferred embodiment, the event extraction for the Hilbert Transform envelope and Short-Time Energy envelope is performed by locating a predetermined number of events which represent the largest positive going edges subject to the constraint that two events may not occur within a predetermined interval. Specifically, the eight largest events are extracted such that no two events are closer than 0.6 cycles of 60 Hz in time.

In another preferred embodiment, the events are extracted for the Median Filtered envelope using the following relationship.

$$M(k) = \max\{D(k+i), i = -N_4, n_4\}$$

The use of local maximum in the above equation is to find the clearest physical event within the time interval governed by $N_4 = 30$. The events are extracted by first locating the initial event when M(k) exceeds an initial predetermined threshold value. This is needed in some situations (but potentially not all situations) since the initial event may correspond to substantially less vibration energy than following events. The other events are selected from the largest to the 7th largest M(k) since more strong physical impacts in circuit breaker operations cause larger value of M(k).

The event extraction process can also be performed on windowed sections of the reference envelope signature. Any of the event extraction methods described supra may be used with a potentially different number of events to be located in each window. Such windowing has the advantage that events associated with large amplitude vibrations as well as small amplitude vibrations during a single operation of a circuit breaker (or any other machine) may be more readily detected.

Step 3.4—Other Processing (Optional Step)

Other processing techniques, both in the time domain and frequency domain, both linear and non-linear, may also be used, such as log spectra, energy spectra, and zero crossing rate, autocorrelation, inter alia.

In addition to the processing described above, techniques can be used to pre-process the data, such as inverse-filtering. The purpose of inverse filtering is to simulate a signal that would be expected at a point closer to the true vibration source. Such a true vibration source is often relatively inaccessible. To establish the inverse filter, the signals of the desired inaccessible point and an easily accessible external point are measured during the operation of the machine and a transfer function between the inaccessible point and the externally accessible point is computed from the signals obtained. From this transfer function, the inverse transfer function between the externally accessible point and the inaccessible point is computed. This inverse transfer function is then saved. Under test conditions, this inverse transfer function is then used with the externally accessible point to recreate the signal that would have been observed at the inaccessible point if the sensor was placed at the inaccessible point. The advantage of inverse-filtering is that it permits simulation of the true vibration source which may be very difficult to access under normal test conditions.

Step 4—Isolate Preselected Segments of the Reference Signature (Optional Step).

The fourth step in the method is to isolate preselected segments of the reference signature. A segment is defined to be a region of a reference or a test signature, and may be either in the time domain or the frequency domain. These segments are preselected based upon previous test data which indicates that the segments contain information which will be useful in the later comparison step of the method. Alternatively, segments may cover the entire reference signature so as to perform a comparison across the entire signature while reducing the number of resulting distances according to the number of segments. Segments are illustrated in Tables G-J, infra at Step 10, which show segments in the frequency domain of 0-2 KHz, 2-5 KHz, 5-10 KHz, and 0-10 KHz. The segment positions are stored for later use in Steps 8 and 9, rather than creating a number of copies of portions of the reference signature.

In a preferred embodiment, segments of a reference envelope may be selected automatically as a predetermined number of points on both sides of the located and extracted event time. Since physical events in circuit breaker operations will be separated in time by some predetermined interval, the number of points on either side may correspond to the same predetermined interval which specifically is 0.6 cycles of 60 Hz in time. The segment positions for the reference envelope do not need to be stored if the reference events have been extracted in Step 3.3. Steps 8 and 9 may use the stored reference events and this predetermined interval which must be stored.

Step 5.—Store Representations of One or More Sets of Reference Signatures From Step 3 in Memory.

The fifth step in the method is to store the reference signature for later use. In a preferred embodiment, the reference signature is stored on a magnetic disk drive (either on a floppy disk or a hard disk) as a conventional file managed by the operating system of the computer. Also in a preferred embodiment, the reference signature is stored in its entirety with its corresponding segmentation (if such segments were determined in accordance with optional Step 4) stored in a separate file.

With the completion of Step 5, the reference signature of the machine to be tested has been obtained, windowed (optional), processed by a linear or non-linear transformation, segmented (optional), and stored for later use. During a subsequent inspection and testing of the machine, the procedures as described in Steps 6 through 11 determine the state of the machine.

Step 6—Sense and Monitor One or More Sets of Time Domain Vibrational Characteristics Of Machine Under Test Condition.

The sixth step in diagnosing a machine is to sense and monitor the vibrational characteristics under test condition, (i.e., not known to be operating normally). The vibrational data should be acquired under identical machine operations as the reference vibrational data was acquired in Step 1. It may be necessary, due to slight variations in machine vibration characteristics, to collect multiple sets of vibration data, followed by an averaging process, as described in Step 8, to obtain an average machine signature. In the decision-making process of a preferred embodiment, it is necessary to have multiple sets of data, as discussed infra.

Step 7—Process Time Domain Vibrational Data Obtained in Step 6 by a Linear or Non-linear Transformation to Create One or More Sets of Test Signatures. If Windows Were Selected Under Step 2, Process Time Domain Vibrational Data Using Same Window Configuration Selected in Step 2.

The seventh step in diagnosing a machine is to process the time-domain vibrational data obtained in Step 6 by a linear or non-linear transformation to create one or more sets of test signatures. The processing methods are the same as that used in Step 3 to process the reference condition data, and also using the same time-domain windowing as was determined to be necessary for the reference condition data in Step 2 (or in Step 3.3). Alternatively, new time-domain windows could be computed using the same process as described in Step 2 (or in Step 3.3), and then applied to the test data to create the test signatures. After this processing is complete, the test signature is in a similar form as the reference signature.

Step 8—Compute One or More Average Sets of Reference and Test Signatures From Sets of Reference Signatures Previously Stored in Step 5 and Sets of Test Signatures Computed in Step 7 (Optional Step).

In a preferred embodiment, the multiple sets of reference and test signatures are averaged prior to use in the comparison step (Step 9). Referring once again to FIGS. 3A and 3B, FIGS. 3A and 3B represent acceleration signals of a defect-free machine, obtained at different times. It can be seen from FIGS. 3A and 3B that even the vibration signature of a defect-free machine can vary over time. The vibration signatures can also vary from operation to operation, as in sequential operations of a momentarily operating machine, such as a circuit breaker. The averaging procedure of the invention is utilized to smooth out these minor differences of signatures obtained under the same condition, (i.e., either both reference or both test condition).

In a preferred embodiment, four sets of reference signatures, ($R_1$, $R_2$, $R_3$, $R_4$), are obtained. Five reference averages are computed according to the following formulae:

$RAVG_{overall}$ = average of ($R_1$, $R_2$, $R_3$, $R_4$)

$RAVG_1$ = average of ($R_1$, $R_2$, $R_3$)

$RAVG_2$ = average of ($R_1$, $R_2$, $R_4$)

$RAVG_3$ = average of ($R_1$, $R_3$, $R_4$)

$RAVG_4$ = average of ($R_2$, $R_3$, $R_4$)

Four sets of test signatures, $(T_1, T_2, T_3, T_4)$, are then obtained. Four test averages are computed according to the following formulae:

$TAVG_1$ = average of $(T_1, T_2, T_3)$ $TAVG_2$ = average of $(T_1, T_2, T_4)$ $TAVG_3$ = average of $(T_1, T_3, T_4)$ $TAVG_4$ = average of $(T_2, T_3, T_4)$ It is to be noted that the average is an arithmetic average calculated between corresponding points of the reference and test signatures.

If the decision rendered in Step 11 indicates the machine is defect-free, the test signatures could then be utilized to update the reference signature averages. In a preferred embodiment, the first test signature averages $(TAVG_1, TAVG_2, TAVG_3, TAVG_4)$ obtained after the reference is created replace the original reference signature averages $(RAVG_1, RAVG_2, RAVG_3, RAVG_4)$. The overall reference average $(RAVG_{overall})$ is not affected by this process.

For example, vibrational data may be collected from a defect-free momentarily operating machine, such as a circuit breaker, during four consecutive operations. This set of four reference signatures may be averaged to form a first average reference. At a later time, this same defect-free machine is tested again during four consecutive operations, and this set of four signatures may be averaged to form a second average reference.

In another preferred embodiment, the averaging process applied to envelope signatures utilizes a selective test to determine if a potential point to be averaged is considered an outlier and thus should not be considered in the computation of the average. This method is thus specifically named selective averaging because of this process. The envelopes are selectively averaged when there are a multiplicity of similar operations. For each point in time, the median of the corresponding values of each of the envelopes is located and then a $+/-20\%$ range is established on either side of the median. In order for the point to be included in the average, its value must be within this range. This operation is repeated for all of the points in the envelope to produce an averaged envelope for later use. Selective averaging may also be useful for averaging other types of signatures.

In another preferred embodiment, a method of determining a set of clustered events for a circuit breaker from multiple sets of events obtained under similar operating conditions is used. This clustering method is applied to events that have been located in Step 3.3 using any of the methods described supra. Clustering will locate the similar events from each of the multiple sets of events to determine a set of clustered events for the machine. The clustering method is based on the minimization of the distances between each timing event.

The clustering operation begins by determining groupings of events from the multiple sets of events using various orderings of the sets of events. An arbitrary ordering for the grouping operation may be performed and the resulting group will be the clustered events. All permutations of the ordering for a series of grouping operations may be performed. It is possible that each different ordering may yield a different grouping, particularly when events ma be closely spaced. The resulting set of clustered events is then determined from the most common groupings of events.

For any given ordering of the multiple sets of events obtained in Step 3.3, the grouping of events is accomplished by a series of operations which will utilize the events found in each of the sets of events. The first operation is to select the first set from the multiple sets of events and assign each individual event within the set to be a first element of an associated group set, and define the point in time at which each individual event occurs to be a group center within its associated group set. The group set will be grown by each of the following operations until all the other sets of events have been processed. The group center associated with a group set refers to the average of all the elements assigned to the group set and is recalculated after each new element is added to the group set. Other functions for the computation of a group center may also be used such as the median function.

The next operation is repeated until all of the remaining sets of events extracted from different envelopes have been processed. For each associated group set and its group center, select as its next element an individual event from a next set of the plurality of sets such that the individual event occurs closest in time to the group center with respect to all other events from the next set. After each element is assigned to a group set, a new group center is recomputed as an average of all the elements in each group set.

As an example, the clustering algorithm (found in Appendix A) was applied to eight events found in four successive operations of the circuit breaker that have been located by one of the techniques described in Step 3.3. The eight timing events obtained from $n^{th}$ operation are denoted by $X_1(n), X_2(n), \ldots, X_8(n)$ as shown below:

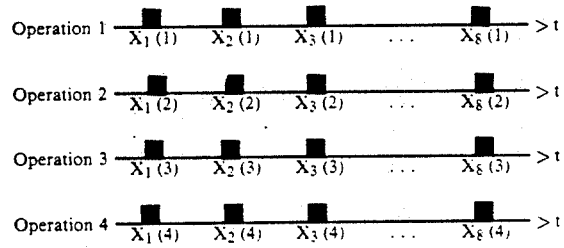

The clustering process would function as follows:

First choose eight initial group centers $Z_1(1), Z_2(1), \ldots, Z_8(1)$. These are arbitrary and are usually selected from the eight timing events in Operation 1.

Next, for the kth iteration, distribute new timing events, $\{X_i(k+1), l=1,2,\ldots,8\}$, using the relation:

$X_1(k+1) \epsilon S_j(k)$ if
$|X_i(k+1) - Z_j(k)| \leq |X_i(k+1) - Z_i(k)|$ for all $i=1,2,\ldots,8$, $i \neq j$, where $S_j(k)$ is the group set of the timing events whose group center is $Z_j(k)$.

After the assignment of new timing events to each of the group sets, compute the new group centers, $Z_j(k+1), j=1,2,\ldots,8$, such that the sum of the squared distances from all points in $S_j(k)$ to the new group center is minimized. The value which minimizes the sum of the squared distances is simply the sample mean (or average) of all points in set $S_j(k)$. Therefore, the new group center is given by:

$$Z_j(k+1) = \frac{1}{N_{j x \epsilon s_j(k)}} \Sigma X, \quad j = 1, \ldots, 8$$

where $N_j$ is the number of points in $S_j(k)$.

The additional iterations occur until all 4 sets of events have been processed.

After all the sets have been processed, it is possible that some group sets may have fewer events than other sets. This arises when nearby events may be closer to different groups sets. This situation poses no problem as it can either be ignored where the eight group sets may have different numbers of elements in them, or a minimum number such as three may be required in order for the group set to be considered as a likely event, or the group set must contain four elements if the highest reliability is necessary. The data given in the tables below shows how the eight events have been clustered into 2 group sets for a circuit breaker in normal condition and abnormal condition (low operating pressure) respectively using the tightest requirements for the clustering operation.

TABLE A

Normal Operating Condition
° Type of Circuit breaker: BZO-145
° Type of operations: CLOSE

* Median Filter Extracted Timing Information *

| Oper 1: | 2.93 | 4.32 | 7.43 | 9.91 | 10.50 | 11.56 | 13.72 | 16.49 |
|---|---|---|---|---|---|---|---|---|
| Height: | 0.37 | 6.23 | 5.65 | 14.00 | 11.92 | 7.22 | 4.83 | 5.57 |
| Oper 2: | 2.92 | 3.35 | 9.93 | 10.55 | 10.98 | 11.52 | 12.73 | 16.44 |
| Height: | 0.25 | 4.66 | 13.19 | 4.99 | 4.81 | 7.50 | 6.13 | 8.16 |
| Oper 3: | 2.71 | 3.31 | 4.31 | 7.40 | 9.83 | 10.18 | 10.41 | 10.92 |
| Height: | 0.13 | 4.53 | 4.13 | 4.73 | 14.79 | 5.27 | 5.12 | 4.58 |
| Oper 4: | 2.41 | 4.36 | 9.93 | 10.52 | 10.93 | 11.18 | 11.58 | 16.54 |
| Height: | 0.34 | 4.44 | 12.60 | 4.53 | 4.07 | 5.83 | 5.06 | 5.69 |

* Clustered Timing Information *

° Event 1:
EMean: 9.90
ESDV: 0.04
EClustered time: 9.91 9.93 9.83 9.93
° Event 2:
EMean: 10.49
ESDV: 0.05
EClustered time: 10.50 10.55 10.41 10.52

TABLE B

Abnormal Operating Condition (Operating Pressure = 2700 psi)
° Type of Circuit breaker: BZO-145
° Type of operations: CLOSE

* Median Filter Extracted Timing Information *

| Oper 1: | 2.99 | 3.42 | 4.43 | 5.84 | 7.46 | 10.27 | 11.29 | 17.29 |
|---|---|---|---|---|---|---|---|---|
| Height: | 0.18 | 4.62 | 5.75 | 5.04 | 4.73 | 15.63 | 4.95 | 4.18 |
| Oper 2: | 2.72 | 4.35 | 5.76 | 6.23 | 7.38 | 10.21 | 14.00 | 17.52 |
| Height: | 0.15 | 4.77 | 5.25 | 3.72 | 5.52 | 13.21 | 4.58 | 5.25 |
| Oper 3: | 3.02 | 7.42 | 10.25 | 10.58 | 10.84 | 11.25 | 13.97 | 17.57 |
| Height: | 0.33 | 4.07 | 13.29 | 4.54 | 8.04 | 4.53 | 5.11 | 5.26 |
| Oper 4: | 2.87 | 3.32 | 4.31 | 10.24 | 10.91 | 11.23 | 13.31 | 21.91 |
| Height: | 0.39 | 4.68 | 6.40 | 12.81 | 10.98 | 4.27 | 4.73 | 4.58 |

* Clustered Timing Information *

° Event 1:
EMean: 2.90
ESDV: 0.12
EClustered time: 2.99 2.72 3.02 2.87
° Event 2:
EMean: 10.24
ESDV: 0.02
EClustered time: 10.27 10.21 10.25 10.24

An additional optional measure that may be computed for the clustered events is the computation of the standard deviations of all elements in each set $S_j(k)$. This may be used to further select the clusters by requiring the standard deviations to be less than $\tau$, wherein $\tau$ is a predetermined value. The standard deviation may also be used as part of the comparison process for event timings as described infra.

Step 9—Compare Test and Reference Signatures. If Averaging Was Performed in Step 8, Compare Test and Reference Signature Averages. If Segments Were Selected in Step 4, Process Comparison on Data Corresponding to the Selected Segments.

The ninth step of the method is to compare the test signature (or average test signature) with the previously stored reference signature (or average reference signature). The comparison is performed between similarly processed signatures, or in segments if segments were determined in Step 4, containing one or more points.

In a preferred embodiment, the comparison is performed by computing:

$$d_{A,B} = g\left(m, \sum_{n=1}^{m} f(\text{signature } A(\text{point } n), \text{signature } B(\text{point } n))\right)$$

where f( ) is any linear or non-linear function that computes a measure of the distance between signature A, point n, and signature B, point n, where point n refers to a value of the amplitude of the signature at a given point in time. Thus, the distance measurement is accomplished by measuring between corresponding points of different signatures. The summation is over the set of all points in the segment, 1 to m, (as determined in Step 4) being compared. The function g( ) is any linear or non-linear function applied to the number of points in the segment and the resulting sum.

In a preferred embodiment, the distance measurement uses the Euclidean distance which is defined as:

$$d_{A,B} = \sqrt{\sum_{n=1}^{m} (\text{signature } A(\text{point } n) - \text{signature } B(\text{point } n))^2}$$

where, $d_{A,B}$ is the Euclidean distance between corresponding points of signatures A and B. Corresponding points are those which occur at the same abscissa.

In another preferred embodiment, the distance measurement uses a crosscorrelation which is defined as:

$$P_{A,B}(t_i, \tau) = \exp\left[\left[\frac{\int_{t_i - T_0}^{t_i + T_0} A(t) B(t - \tau) dt}{\int_{t_i - T_0}^{t_i - T_0} A^2(t) dt} - 1\right]\right]$$

Specifically this crosscorrelation distance measurement is applied to the envelope obtained from Step 3.3 over the segments selected in Step 4. $t_i$ is the time of the reference event extracted in Step 3.3. $T_0$ is the amount of the segment on either side of the reference event as determined in Step 4. A(t) is the reference envelope as a function of time and B(t) is the test envelope as a function of time. $\tau$ takes on various values corresponding to the range of permitted shifts in the event physically occur. $P_{A,B}(t_i,\tau)$ is evaluated for each of the eight reference events ($t_i$), for $\tau$ ranging from $-8$ to $+8$ which corresponds to a maximum expected shift under normal conditions of 0.6 cycles of 60 Hz in time. The test envelope is said to be similar to the reference envelope around the event $t_i$ provided that the measure $P_A$ the Hilbert Transform to compute the envelope is given in Table C below.

TABLE C

Normal Operating Condition
∘ Type of Circuit breaker: BZO-145
∘ Type of operations: CLOSE

* Hilbert Transform Extracted Timing Information (400 Hz Lowpass) *

Reference Events

| 9.8877 | 10.5469 | 11.5723 | 16.7725 | 3.3691 | 12.5244 | 14.7950 | 15.7471 |

Test Events

| 9.8145 | 11.6455 | 10.5469 | 12.7442 | 16.7725 | 3.2959 | 13.8428 | 3.9551 |

Crosscorrelations For Each Reference Event

| Shift | Event 1 | Event 2 | Event 3 | Event 4 | Event 5 | Event 6 | Event 7 | Event 8 |
|---|---|---|---|---|---|---|---|---|
| −8 | 2.2082 | 1.3255 | 3.8613 | 2.3560 | 2.0106 | 2.2743 | 2.2141 | 1.4901 |
| −7 | 1.9290 | 1.0977 | 2.2438 | 2.1769 | 1.6961 | 2.3711 | 2.2725 | 1.4109 |
| −6 | 1.7539 | 1.6757 | 2.6818 | 1.8923 | 1.4331 | 1.2002 | 2.6242 | 1.5008 |
| −5 | 1.7128 | 2.2473 | 3.0605 | 1.6105 | 1.2298 | 1.4351 | 2.0829 | 1.9259 |
| −4 | 1.6657 | 2.6926 | 3.3013 | 1.4540 | 1.0564 | 1.2201 | 2.4199 | 2.0765 |
| −3 | 1.5049 | 2.5807 | 2.6599 | 1.2692 | 1.0742 | 1.0790 | 3.0772 | 2.2334 |
| −2 | 1.2807 | 2.1359 | 2.5434 | 1.0539 | 1.1629 | 1.7313 | 2.1411 | 2.3978 |
| −1 | 1.1296 | 1.7043 | 1.4103 | 1.0609 | 1.2433 | 2.2730 | 2.1132 | 2.1266 |
| 0 | 1.1499 | 1.1995 | 1.1061 | 1.0068 | 1.2389 | 1.9530 | 2.4688 | 2.0459 |
| 1 | 1.2664 | 1.3608 | 1.3964 | 1.3369 | 1.1548 | 1.6408 | 2.4726 | 2.4530 |
| 2 | 1.4443 | 2.0751 | 1.0418 | 1.9049 | 1.0248 | 1.9464 | 2.5710 | 3.4703 |
| 3 | 1.6351 | 2.1545 | 1.7080 | 2.3692 | 1.1301 | 1.6744 | 2.8472 | 4.5040 |
| 4 | 1.7011 | 1.9389 | 1.0744 | 2.6818 | 1.3775 | 1.8337 | 2.4841 | 5.8353 |
| 5 | 1.7145 | 2.5816 | 1.2602 | 2.9084 | 1.7550 | 2.2078 | 2.1150 | 7.1442 |
| 6 | 1.9024 | 2.7826 | 1.0673 | 3.6682 | 2.1706 | 2.2156 | 2.2102 | 9.6455 |
| 7 | 2.0135 | 1.9307 | 1.1867 | 4.7090 | 2.5134 | 2.5849 | 2.4784 | 19.2082 |
| 8 | 1.8784 | 1.8543 | 1.2157 | 5.1982 | 2.7382 | 2.7826 | 2.6325 | 23.6425 |

$B(t_i, \tau)$ attains a value around one for any $\tau \epsilon [-T_0, T_0]$. The two compared envelope functions are said to be dissimilar if the similarity measure is greater than a predetermined value in the above-mentioned range.

The extracted event times and crosscorrelation results from an abnormally operating circuit breaker using the Hilbert Transform to compute the envelope is given in Table D below.

TABLE D

Abnormal Operating Condition (Trip Voltage = 70 volts)
∘ Type of Circuit breaker: BZO-145
∘ Type of operations: CLOSE

* Hilbert Transform Extracted Timing Information (400 Hz Lowpass) *

Reference Events

| 9.8877 | 10.5469 | 11.5723 | 16.7725 | 3.3691 | 12.5244 | 14.7950 | 15.7471 |

Test Events

| 11.8653 | 12.5244 | 13.7696 | 5.4199 | 14.9414 | 16.0401 | 17.7979 | 7.8369 |

Crosscorrelations For Each Reference Event

| Shift | Event 1 | Event 2 | Event 3 | Event 4 | Event 5 | Event 6 | Event 7 | Event 8 |
|---|---|---|---|---|---|---|---|---|
| −8 | 2.7265 | 2.7235 | 2.6751 | 3.3761 | 2.7214 | 6.5107 | 6.6774 | 1.7043 |
| −7 | 2.6975 | 2.7638 | 2.7218 | 3.0667 | 2.7278 | 15.0642 | 6.3670 | 1.3681 |
| −6 | 2.7055 | 2.7885 | 2.7809 | 2.8938 | 2.7256 | 27.3743 | 3.4998 | 1.0375 |
| −5 | 2.7195 | 2.8838 | 2.8302 | 2.8174 | 2.7261 | 33.5289 | 1.4396 | 1.4451 |
| −4 | 2.7306 | 2.9149 | 2.7829 | 2.9833 | 2.7217 | 29.9039 | 1.3562 | 1.6705 |
| −3 | 2.7517 | 2.9293 | 4.2497 | 3.2407 | 2.7264 | 8.6916 | 1.0202 | 1.5947 |
| −2 | 2.7649 | 2.9138 | 5.6570 | 3.3647 | 2.7164 | 3.8295 | 1.0501 | 1.4167 |
| −1 | 2.7661 | 2.8296 | 7.8297 | 3.5086 | 2.7088 | 2.5537 | 1.2777 | 1.1538 |
| 0 | 2.7704 | 2.7348 | 12.4699 | 3.2091 | 2.7064 | 3.2259 | 2.5227 | 1.7834 |
| 1 | 2.7994 | 2.6239 | 13.2564 | 3.0514 | 2.7041 | 8.8541 | 2.4082 | 1.9972 |
| 2 | 2.8082 | 2.6026 | 11.3281 | 3.0287 | 2.6955 | 11.6563 | 1.9461 | 1.9163 |
| 3 | 2.8282 | 2.6110 | 8.1079 | 2.9627 | 2.6946 | 8.1525 | 1.8437 | 1.4886 |
| 4 | 2.8229 | 2.6950 | 7.9372 | 2.9894 | 2.6926 | 7.1774 | 2.0338 | 1.4024 |
| 5 | 2.8253 | 2.7099 | 10.0523 | 2.8135 | 2.6933 | 4.0974 | 2.8962 | 1.7376 |
| 6 | 2.8213 | 2.7108 | 21.9975 | 2.6917 | 2.7006 | 2.6144 | 3.9972 | 1.7469 |
| 7 | 2.8052 | 2.7097 | 32.8800 | 2.8890 | 2.7092 | 2.5717 | 3.0931 | 2.1734 |
| 8 | 2.7657 | 2.7293 | 22.5213 | 2.8791 | 2.7068 | 1.9177 | 1.8312 | 2.2518 |

The extracted event times and crosscorrelation results from a normally operating circuit breaker using Short-Time Energy to compute the envelope is given in Table E below.

TABLE E

Normal Operating Condition
◦ Type of Circuit breaker: BZO-145
◦ Type of operations: CLOSE

**\*\*\* Short-time Engery Extracted Timing Information (50 Point Window) \*\*\***

Reference Events

| 9.8145 | 16.4063 | 10.5469 | 3.2959 | 7.9102 | 11.6455 | 13.0371 | 12.3780 |

Test Events

| 9.8145 | 10.5469 | 16.4795 | 3.2959 | 11.5723 | 12.6709 | 4.3213 | 13.8428 |

Crosscorrelations For Each Reference Event

| Shift | Event 1 | Event 2 | Event 3 | Event 4 | Event 5 | Event 6 | Event 7 | Event 8 |
|---|---|---|---|---|---|---|---|---|
| −8 | 2.3777 | 3.0703 | 1.6202 | 2.3424 | 2.6168 | 3.0349 | 1.6154 | 1.5413 |
| −7 | 2.0412 | 2.6099 | 1.3985 | 2.1096 | 2.5151 | 2.8039 | 1.6154 | 1.4540 |
| −6 | 1.7734 | 2.4178 | 1.1571 | 1.8217 | 2.8878 | 2.2272 | 1.4186 | 1.0819 |
| −5 | 1.5873 | 2.1110 | 1.0732 | 1.5322 | 3.3538 | 2.0342 | 1.4104 | 1.1530 |
| −4 | 1.4665 | 1.9516 | 1.3137 | 1.2681 | 3.7670 | 1.7483 | 1.6765 | 1.3736 |
| −3 | 1.3396 | 1.8045 | 1.4866 | 1.0836 | 3.2292 | 1.5280 | 1.9135 | 1.3796 |
| −2 | 1.1683 | 1.6152 | 1.4586 | 1.0722 | 2.1482 | 1.4126 | 1.7619 | 1.1863 |
| −1 | 1.0265 | 1.3255 | 1.2955 | 1.1744 | 1.3606 | 1.1884 | 1.4451 | 1.0808 |
| 0 | 1.0099 | 1.0423 | 1.1997 | 1.2059 | 1.2783 | 1.1517 | 1.3685 | 1.2044 |
| 1 | 1.0797 | 1.1486 | 1.2075 | 1.1313 | 1.9270 | 1.2063 | 1.5175 | 1.4400 |
| 2 | 1.2381 | 1.4258 | 1.3205 | 1.0163 | 3.2287 | 1.2638 | 1.6115 | 1.6145 |
| 3 | 1.3451 | 1.6738 | 1.3700 | 1.1215 | 3.8941 | 1.3327 | 1.6542 | 1.5739 |
| 4 | 1.4095 | 1.9224 | 1.5317 | 1.3001 | 3.6653 | 1.2140 | 1.5476 | 1.5379 |
| 5 | 1.4771 | 2.0969 | 1.8459 | 1.5740 | 2.6611 | 1.1677 | 1.5682 | 1.7304 |
| 6 | 1.5377 | 2.4945 | 2.3383 | 1.8768 | 1.9494 | 1.1691 | 1.7162 | 1.8205 |
| 7 | 1.6130 | 3.0461 | 2.7711 | 2.1863 | 1.6719 | 1.2126 | 1.9663 | 1.8678 |
| 8 | 1.6433 | 3.7828 | 2.9429 | 2.4253 | 1.9898 | 1.2807 | 2.2489 | 1.8739 |

The extracted event times and crosscorrelation results from an abnormally operating circuit breaker using Short-Time Energy to compute the envelope is given in Table F below.

TABLE F

Abnormal Operating Condition (Operating Pressure = 2700 psi)
◦ Type of Circuit breaker: BZO-145
◦ Type of operations: CLOSE

**\*\*\* Short-time Engery Extracted Timing Information (50 Point Window) \*\*\***

Reference Events

| 9.8145 | 16.4063 | 10.5469 | 3.2959 | 7.9102 | 11.6455 | 13.0371 | 12.3780 |

Test Events

| 10.1807 | 10.9131 | 3.2959 | 17.0655 | 13.9893 | 13.3301 | 7.9834 | 4.0283 |

Crosscorrelations For Each Reference Event

| Shift | Event 1 | Event 2 | Event 3 | Event 4 | Event 5 | Event 6 | Event 7 | Event 8 |
|---|---|---|---|---|---|---|---|---|
| −8 | 2.7660 | 2.7589 | 1.0131 | 2.4291 | 2.5777 | 5.0864 | 1.5923 | 1.4769 |
| −7 | 2.7625 | 2.6959 | 1.1878 | 2.2373 | 2.2476 | 4.6098 | 1.5940 | 1.2367 |
| −6 | 2.7491 | 2.6767 | 1.4833 | 1.9761 | 2.5951 | 3.7407 | 1.5568 | 1.1869 |
| −5 | 2.7299 | 2.7743 | 1.7559 | 1.7051 | 3.2146 | 2.9174 | 1.5323 | 1.2264 |
| −4 | 2.6371 | 2.7353 | 1.8231 | 1.4409 | 3.7319 | 2.4026 | 1.3838 | 1.4266 |
| −3 | 2.3501 | 2.6964 | 1.6128 | 1.2437 | 3.6380 | 2.1655 | 1.4317 | 1.5458 |
| −2 | 2.0260 | 2.7340 | 1.3429 | 1.0815 | 2.4788 | 1.9366 | 1.7525 | 1.6448 |
| −1 | 1.7269 | 2.7426 | 1.0698 | 1.0259 | 1.5182 | 1.9634 | 1.9528 | 1.6803 |
| 0 | 1.5223 | 2.7191 | 1.1958 | 1.0808 | 1.1842 | 1.9113 | 1.9764 | 1.5863 |
| 1 | 1.3849 | 2.4725 | 1.5245 | 1.0474 | 1.5995 | 1.6043 | 2.0671 | 1.6451 |
| 2 | 1.2594 | 2.2294 | 1.6987 | 1.0373 | 2.6577 | 1.4308 | 2.0620 | 1.6614 |
| 3 | 1.0944 | 1.9038 | 1.6608 | 1.1427 | 3.4983 | 1.3409 | 1.8789 | 1.5872 |
| 4 | 1.0219 | 1.7805 | 1.4203 | 1.2573 | 3.5778 | 1.2725 | 1.8826 | 1.5110 |
| 5 | 1.0299 | 1.7760 | 1.3088 | 1.4489 | 3.0384 | 1.2107 | 1.9393 | 1.4591 |
| 6 | 1.0786 | 1.6911 | 1.3652 | 1.6586 | 2.3874 | 1.3239 | 2.0358 | 1.8246 |
| 7 | 1.2423 | 1.5558 | 1.5212 | 1.8752 | 2.0676 | 1.3688 | 2.2988 | 2.1986 |
| 8 | 1.3834 | 1.3516 | 1.6764 | 2.1041 | 2.0414 | 1.5148 | 2.5057 | 2.2354 |

Other distance measurement formulae, such as an absolute distance measure formula; formulae that use higher order powers and roots; or formulae that transform the data points using a linear or non-linear transformation, such as a log or power, either before or after the difference between the signature points is computed, are examples of the many variations of distance measurement techniques which are intended to be within the scope of the claimed invention.

In a preferred embodiment, a set of reference distances are computed from the individual or average reference signatures to the overall average reference signature. The elements of this set are identified as follows:

$D_R = \{d_{RAVG1.RAVGoverall}, d_{RAVG2.RAVGoverall}, d_{RAVG3.RAVGoverall}, d_{RAVG4.RAVGoverall}\}$ if average signatures are used, or, $D_R = \{d_{R1.RAVGoverall}, d_{R2.RAVGoverall}, d_{R3.RAVGoverall}, d_{R4.RAVGoverall}\}$ if individual signatures are used.

Similarly, a set of test distances are computed from the individual or average test signatures to the overall average reference signature. The elements of this set are identified as follows:

$D_T = \{d_{TAVG1.RAVGoverall}, d_{TAVG2.RAVGoverall}, d_{TAVG3.RAVGoverall}, d_{TAVG4.RAVGoverall}\}$ if average signatures are used, or, $D_T = \{d_{T1,RAVGoverall}, d_{T2,RAVGoverall}, d_{T3,RAVGoverall}, d_{T4,RAVGoverall}\}$ if individual signatures are used.

The extracted event timings may also be directly compared. This comparison process would expect that the test event time(s) occur within an expected region of the reference event time(s). This expected region can be either predetermined such as 0.6 cycles of 60 Hz in time or may be automatically set using the standard deviations in the variability of the observed extracted times for either the reference events or the test events or both sets of events. A common range could thus be based on three standard deviations of the observed reference event times. Another rang could be established by using the t-distribution described infra.

As an example of this comparison process, the first event extracted using the Hilbert Transform for the reference and normal tests are at 9.8877 cycles and 9.8145 cycles respectively. This is considered normal since the times are less than 0.6 cycles apart. When the event times for reference and abnormal tests are considered, the values 9.8877 cycles and 11.8653 cycles are significantly greater than 0.6 cycles apart and would thus be indicated as a potentially defective machine. Note, it is necessary to find the closest two event times with similar amplitudes from the list of the extracted events for the reference and test times. As presented in the tables, these values are listed according to their corresponding event amplitude not in increasing order of event time.

Step 10—Render Decision Based Upon Comparison in Step 9 as to Mechanical Condition of Machine, (Normal, Abnormal, etc.).

In a preferred embodiment, the decision-making process compares the calculated test distance against an automatically computed threshold value and classifies the test distance as being normal or abnormal based on this comparison. In a preferred embodiment, the threshold is a function of the mean reference distance (MRD) and the reference and test standard deviations (RSD and TSD, respectively). The general form for the computation of the threshold is as follows:

$$\text{Threshold} = f(MRD, RSD, TSD)$$

where,
MRD = mean of elements in reference distance set $D_R$
RSD = standard deviation of elements in reference distance set $D_R$
MTD = mean of elements in test distance set $D_T$
TSD = standard deviation of elements in test distance set $D_T$ The specific method used to compute the threshold is as follows:

$$\text{Threshold} = \text{Max}[T_1, T_2]$$

where,
$T_1 = MRD + (t_{b/2})(s_p)(1/m_1 + 1/m_2)^{\frac{1}{2}}$
$T_2 = MRD + (3)(RSD)$ and,
$t_{b/2}$ is the value of the t-distribution obtained from a reference table, with $(m_1 + m_2 - 2)$ degrees of freedom, leaving an area of b/2 to the right, and $$s_p = \frac{(m_1 - 1)(RSD)^2 + (m_2 - 1)(TSD)^2}{m_1 + m_2 - 2}$$

and $m_1$ and $m_2$ are the number of operations used in determining the standard deviations for the reference and test signatures, respectively. Both $m_1$ and $m_2$ are equal to 4 in a preferred embodiment of the invention. The value of b/2 determines the probability of a false alarm. In a preferred embodiment, b/2 = 0.025 or 2.5%. For this value of b/2, and the values of $m_1$ and $m_2$ which give the degrees of freedom equal to 6, the value of $t_{b/2}$ is found to be 2.447 from a t-distribution table.

Conventionally, the threshold, T, is computed to be equal to $T_1$. Experimental tests, however, indicate that more reliable and consistent results are achieved by computing the threshold according to the formulae described above. The equation for $T_2$ provides a lower bound on the probability of false alarm. Satisfactory results have also been obtained using $T_2 = (2)(MRD)$.

Once the threshold is computed, the signature is classified as normal if the mean test distance (MTD) is less than or equal to the threshold and is abnormal if it is greater than the threshold. After classifying all the mean test distances in all the segments, if a minimum number of the tests indicate abnormality, the circuit breaker is classified as abnormal. In a preferred embodiment, this minimum number is one, so that if at least one mean test distance is greater than its corresponding threshold, machine abnormality would be declared.

For the time-domain vibration signals of FIG. 3A-3D, the short-time power spectra in the 12-16 cycle time-domain window is calculated and shown in FIG. 5A-5D respectively. As was noted previously, the two normal signatures in FIGS. 3A and 3B, as well as the two corresponding short-time power spectra shown in FIGS. 5A and 5B respectively, are visually different. Also, the abnormal signatures and spectra are virtually indistinguishable from the normal spectra. The results from the comparison and decision-making processes for the defective signatures of FIGS. 3C and 3D are shown in Tables G and H, respectively.

Figure 5A:
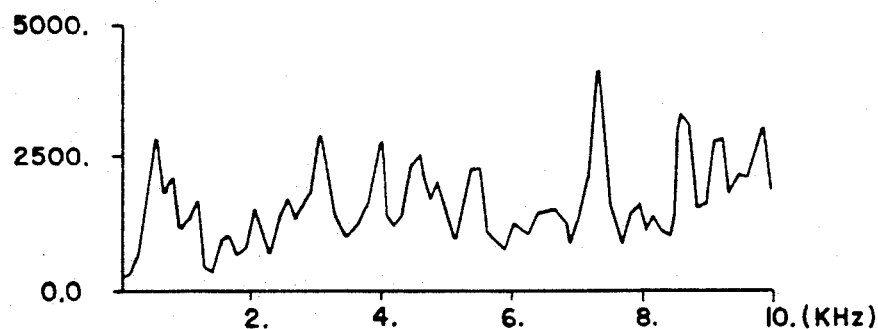
FIG. 5A shows the short-time power spectrum associated with a 12-16 cycle window of the signal shown in FIG. 3A.
Figure 5B:
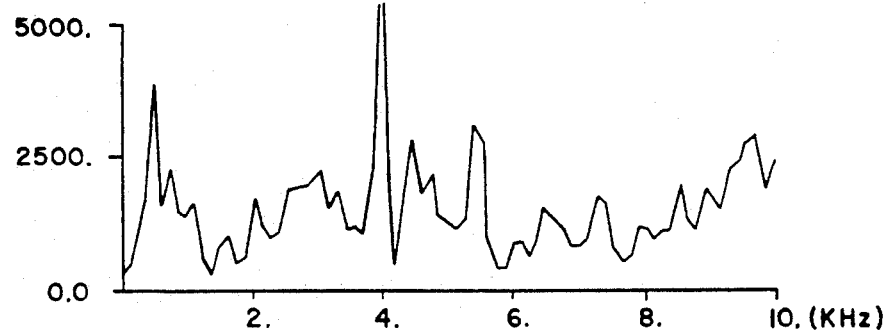
FIG. 5B shows the short-time power spectrum associated with a 12-16 cycle window of the signal shown in FIG. 3B.
Figure 5C:
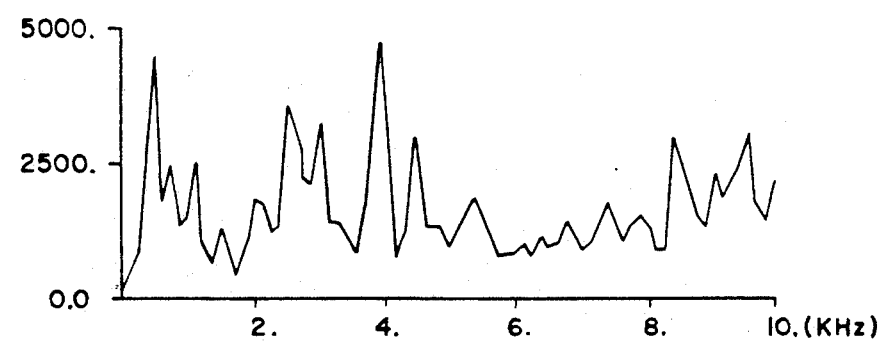
FIG. 5C shows the short-time power spectrum associated with a 12-16 cycle window of the signal shown in FIG. 3C.

Table G shows the results of the distance measurement and decision-making process using the short-time power spectra of FIGS. 5A and 5B as the reference signatures and the short-time power spectra of FIG. 5C as the test signature.

TABLE G

| | Segments | | | |
|---|---|---|---|---|
| | 0-2 KHz | 2-5 KHz | 5-10 KHz | 0-10 KHz |
| Mean Reference Distance (MRD) | 1385.78 | 4527.67 | 5349.46 | 7182.26 |
| Reference Standard Deviation (RSD) | 280.66 | 1202.58 | 177.88 | 800.77 |
| Mean Test Distance (MTD) | 2297.65 | 4513.47 | 5218.78 | 7284.07 |
| Test Standard Deviation (TSD) | 363.35 | 956.63 | 111.68 | 636.80 |
| Threshold (T) | 2227.76 | 8135.41 | 5883.10 | 9584.57 |
| Resolution Ratio (RR) | 1.66 | 1.00 | 0.98 | 1.01 |
| Decision | Abnormal | Normal | Normal | Normal |
| Voter | | ABNORMAL | | |

TABLE G-continued

| | Segments | | | |
|---|---|---|---|---|
| | 0-2 KHz | 2-5 KHz | 5-10 KHz | 0-10 KHz |
| Decision | | | | |

Figure 5D:
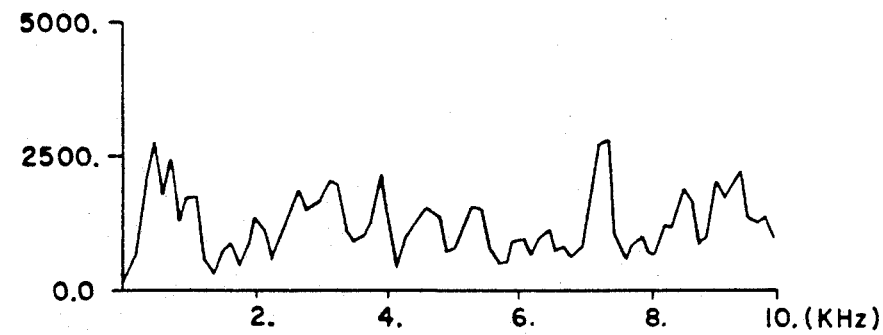
FIG. 5D shows the short-time power spectrum associated with a 12-16 cycle window of the signal shown in FIG. 3D.

Table H shows the results of the distance measurement and decision-making process using the short-time power spectra of FIGS. 5A and 5B as the reference signatures and the short-time power spectra of FIG. 5D as the test signature.

TABLE H

| | Segments | | | |
|---|---|---|---|---|
| | 0-2 KHz | 2-5 KHz | 5-10 KHz | 0-10 KHz |
| Mean Reference Distance (MRD) | 1385.78 | 4527.67 | 5349.46 | 7182.26 |
| Reference Standard Deviation (RSD) | 280.66 | 1202.58 | 177.88 | 800.77 |
| Mean Test Distance (MTD) | 1092.69 | 3000.42 | 5167.97 | 6047.98 |
| Test Standard Deviation (TSD) | 257.98 | 522.19 | 492.06 | 682.33 |
| Threshold (T) | 2227.76 | 8135.41 | 5989.52 | 9584.57 |
| Resolution Ratio (RR) | 0.79 | 0.66 | 0.97 | 0.84 |
| Decision | Normal | Normal | Normal | Normal |
| Voter Decision | | NORMAL | | |

It is seen that the defects cannot be easily detected in the overall frequency ranges and the frequency-domain segmenting can not considerably increase the difference between the test distance and reference distance measures. The defects seem too subtle to be detected from the short-time power spectra associated with the four cycle window.

Reducing the time-domain window to a one cycle window located between 12-13 cycles produces the short-time power spectra shown in FIGS. 6A-6D for the signals of FIGS. 3A-3D, respectively. The normal power spectra, shown in FIGS. 3A and 3B, are now quite similar and both abnormal power spectra, shown in FIGS. 3C and 3D, are different from the normal power spectra. The results of the comparison and decision-making processes is given in Tables I and J for the defective signatures of FIGS. 3C and 3D, respectively.

Figure 6A:
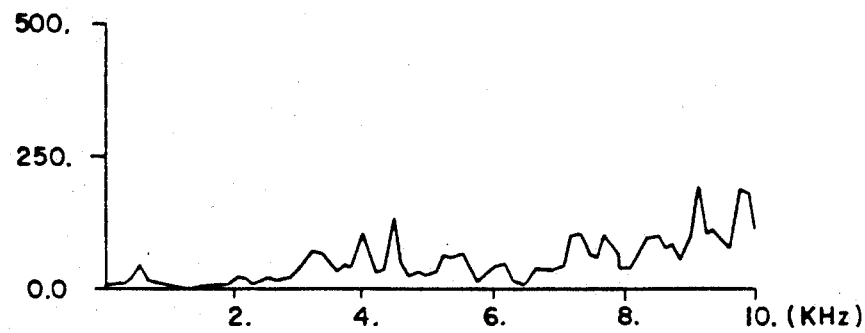
FIG. 6A shows the short-time power spectrum associated with a 12-13 cycle window of the signal shown in FIG. 3A.
Figure 6B:
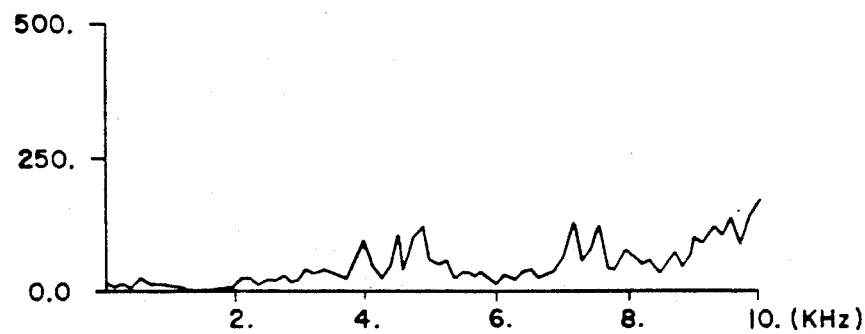
FIG. 6B shows the short-time power spectrum associated with a 12-13 cycle window of the signal shown in FIG. 3B.
Figure 6C:
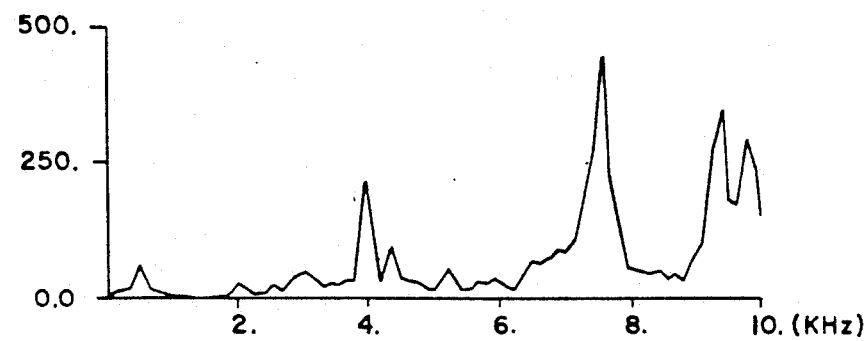
FIG. 6C shows the short-time power spectrum associated with a 12-13 cycle window of the signal shown in FIG. 3C.

Table I shows the results of the distance measurement and decision-making process using the short-time power spectra of FIGS. 6A and 6B as the reference signatures and the short-time power spectra of FIG. 6C as the test signature.

TABLE I

| | Segments | | | |
|---|---|---|---|---|
| | 0-2 KHz | 2-5 KHz | 5-10 KHz | 0-10 KHz |
| Mean Reference Distance (MRD) | 45.07 | 169.66 | 289.43 | 337.90 |
| Reference Standard Deviation (RSD) | 4.52 | 20.46 | 31.39 | 34.22 |
| Mean Test Distance (MTD) | 11.06 | 235.40 | 671.58 | 711.60 |
| Test Standard Deviation (TSD) | 2.28 | 12.75 | 59.37 | 59.12 |
| Threshold (T) | 58.63 | 231.04 | 383.60 | 440.56 |
| Resolution Ratio (RR) | 0.25 | 1.39 | 2.32 | 2.11 |
| Decision | Normal | Abnormal | Abnormal | Abnormal |

TABLE I-continued

| | Segments | | | |
|---|---|---|---|---|
| | 0-2 KHz | 2-5 KHz | 5-10 KHz | 0-10 KHz |
| Voter Decision | | ABNORMAL | | |

Figure 6D:
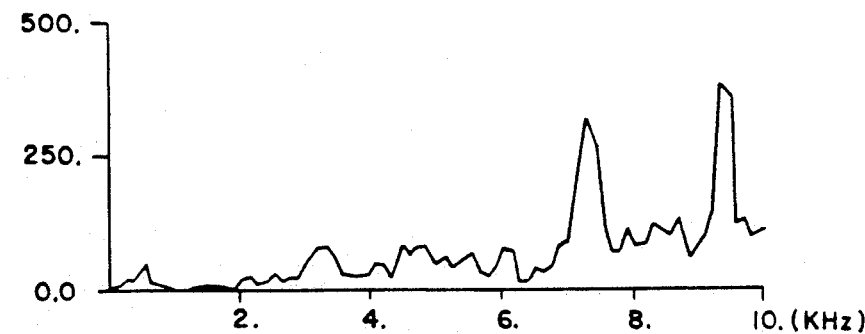
FIG. 6D shows the short-time power spectrum associated with a 12-13 cycle window of the signal shown in FIG. 3D.

Table J shows the results of the distance measurement and decision-making process using the short-time power spectra of FIGS. 6A and 6B as the reference signatures and the short-time power spectra of FIG. 6D as the test signature.

TABLE J

| | Segments | | | |
|---|---|---|---|---|
| | 0-2 KHz | 2-5 KHz | 5-10 KHz | 0-10 KHz |
| Mean Reference Distance (MRD) | 45.07 | 169.66 | 289.43 | 337.90 |
| Reference Standard Deviation (RSD) | 4.52 | 20.46 | 31.39 | 34.22 |
| Mean Test Distance (MTD) | 22.59 | 163.16 | 582.43 | 605.55 |
| Test Standard Deviation (TSD) | 1.53 | 19.97 | 35.53 | 29.26 |
| Threshold (T) | 58.63 | 231.04 | 383.60 | 440.56 |
| Resolution Ratio (RR) | 0.50 | 0.96 | 2.01 | 1.79 |
| Decision | Normal | Normal | Abnormal | Abnormal |
| Voter Decision | | ABNORMAL | | |

It is noted that the decision associated with the overall frequency ranges can correctly detect the defects and that the difference between the test distance and reference distance measures increases in a segment of the spectra (5-10 KHz). This indicates that the defective mechanism causes some changes in high frequency components.

Referring to Tables G-J above, a measure of the effectiveness of the decision obtained is the ratio of the Mean Test Distance (MTD) to the Mean Reference Distance (MRD), which is designated as the Resolution Ratio (RR). Under normal machine operating conditions, the expected value of the resolution ratio is approximately 1. Under abnormal machine conditions, the resolution ratio should be typically greater than 1. As the resolution ratio increases, so too do the observable differences between the signatures.

Another use of the resolution ratio is to determine if the testing procedure is effective since under most circumstances, this ratio should not be much less than 1. If it is, it may imply that the reference signature(s) may be improper and that the diagnosis of a particular machine cannot be achieved with that signature. For example, Table H shows that a defect could not be detected and the resolution ratios were much less than 1. Refining the test procedure to use a 1 cycle window produces the resolution ratios of greater than 1 as shown in Table J. Thus, one should be confident that the decisions summarized in Table J are valid.

Another useful decision-making technique would simply use a predetermined threshold and the Resolution Ratio (RR) defined as the ratio of the Mean Test Distance (MTD) to the Mean Reference Distance (MRD). If the Resolution Ratio (RR) is greater than this threshold for any segment, then the machine is considered to be defective (or potentially defective). This technique has been specifically used with the energy processing methods described in Step 3.2 where the short-time energy of the entire vibrational signal is computed and compared in multiple segments across the entire time span. The significant advantage of this technique is that it is a quickly calculated discriminating measure that would indicate if additional processing is necessary if the machine is potentially defective. Once the machine is recognized as being potentially defective, some of the other processing techniques described supra may be applied to further identify the defect or the machine may be considered defective and be physically inspected for the defect.

The decision-making process for the extracted event times has already been suggested in the discussion for the comparison step (Step 9). An optional refinement to the decision making is that a predetermined number of event comparisons may need to be classified as defective or abnormal before the actual abnormal indication is presented to the operator. This may be necessary particularly for events that are smaller in amplitude or possibly less repeatable. Thus the decision-making process for the extracted events may need to consider the amplitude of the events and the repeatability of the events between normal operations and test operations.

For the crosscorrelation envelope comparisons performed in Step 9, the test envelope is said to be similar to the reference envelope around the event $t_i$ provided that the measure $P_{A\ B(t_i,\tau)}$ attains a value around one for any $\tau \epsilon [-T_0, T_0]$. The two envelope functions are said to be dissimilar if the similarity measure is greater than a predetermined value in the above-mentioned range. In a preferred embodiment, this predetermined value would be around 1.2 for envelopes processed by the Hilbert Transform and 1.3 for envelopes processed by Short-Time Energy. With these values, all of the normal condition times given in the tables would be considered as valid, except for Events 7 and 8 which do not appear to be repeatable. Appropriate values for the two abnormal conditions would be greater than these thresholds which would indicate the presence of an abnormality. Abnormality would be clearly indicated for the lower trip voltage. For the lower operating pressure, the indication is less obvious. The main reason for this is that this lower operating pressure is considered by the manufacturer to be the lowest "normal" operating pressure. The possibility of an abnormality would be indicated by a single event (Event 2) that exceeds the threshold for all values in the range. As a further refinement, the decision-making process may need to consider the amplitude of the events and the repeatability of the events between normal operations and test operations.

Step 11—Indicate Decision (Condition of Machine).

The results of the decision-making process may be indicated in any number of ways. For example, the decision may be used to sound an alarm, or the condition of the machine can be displayed on a CRT, etc.

Database Driven Diagnostic System

The implementation of the diagnostic procedures of the invention in a portable instrument requires the identification and development of a substantial support environment. The environment provided by the system must, (1) be user friendly, (2) fully automate all of the processing, (3) possess artificial intelligence capabilities to minimize operator interaction, and, (4) be a flexible and useful system.

The following is a description of a preferred embodiment of the database driven diagnostic system of the invention. This description is illustrative of a preferred embodiment only, and is not intended to restrict or limit the scope of the claimed invention. For example, reference is made to a specific machine, (e.g., circuit breaker), and a particular non-linear transformation, (e.g., power spectrum). The claimed invention is not limited to this particular machine or non-linear transformation.

The present invention provides a flexible method to fully automate the sequencing of the method steps of the invention. The traditional prior art method of using a single custom program with the various processing steps directly coded into the program fails to meet the flexibility needs. This need arises from the fact that each machine type will need similar but different processing steps. The differences are in size, location, and number of time-domain windows and/or frequency-domain segments as well as in the specific types of processing to be used in each region.

This special need for flexibility is satisfied by the database driven support system of the invention. All the processing steps are implemented as independent modules. A control program is used to sequence the processing through steps specified by the information in the database. The control program also controls the data flow using uniquely named files between the processing steps that are linked together.

The support system is organized into 6 independent processing modules. The control module, CBD, sequences the processing, by invoking the processing modules, as specified by the information in the database. The control module also automatically sequences the data flow between the processing modules. The control module also invokes the data acquisition module.

The data acquisition module, ACQUIRE, controls the hardware elements of the invention and senses the vibrational characteristics of the machine. It monitors the functions of the hardware elements and detects signal problems by observing the overload detection circuit to detect out of range signals, and also monitors the accelerometers to detect signal continuity in the accelerometers and cables. If a fault is detected, it can be indicated to the operator. For an out of range signal, the data acquisition software automatically reduces the programmable gain setting of the hardware and asks for the data to be re-taken. For a faulty accelerometer or cable, ACQUIRE can wait for the problem to be corrected by the operator prior to acquisition of the vibrational characteristics of the machine.

The window power spectrum module, WPS, is responsible for computing the power spectrum of the vibrational data within a specific time-domain window. The module reads the input data from a specified vibrational data file, computes the power spectra of the specified time-domain window, and outputs a data file that contains the power spectra.

The averaging module, AVG, obtains the average of the specified plurality of power spectra data files and writes the result to an output data file.

The distance measurement module, DIST, uses the test signature data files, (or average test signature data files), and the reference signature data files, (or average reference signature data files), and creates an output file that contains the distance measurements. This module may also use the segmentation control to segment the signatures.

The decision-making module, VOTER, determines the threshold and analyzes the test distances to determine and indicate the state of the machine, (normal or abnormal). This module uses the test and reference distance files created by the distance measurement module to evaluate the condition of the machine and render a decision.

The event detection module, EVDET, is used to perform the event extraction process as discussed previously. This module uses the vibrational data files and determines the event locations so that windows may be placed to encompass the events. This module writes the window specification database that is utilized by the control module, CBD, for sequencing the processing.

The database for the diagnostic system is represented by a set of files. The diagnostic system gets all the information it needs to run effectively from these files. The most important of these files are the ones that contain the execution control language since they specify the sequencing of the processing steps and also specify the data flow between the modules implementing the processing steps. The definition of this language is closely related with formulation of command lines for each program module representing a specific processing step. A unique file naming convention also functions to facilitate the proper storage of incoming data and to facilitate the flow of data from one processing step to the next. Other files which are part of the database indicate the time-domain windows to be used for the signal processing, control the settings of the data acquisition system, and maintain a history of testing activity and results of a particular machine. Using an implementation based upon databases, it is very easy for the programs, such as the event location program, to modify the data and affect the remaining functions and/or later processing performed by the control module via the individual processing modules. Thus the diagnostic system can configure itself (i.e., artificial intelligence) for a particular machine to be tested.

The database driven diagnostic system of the invention is described in more detail herebelow:

File names

Each program module typically has to operate on one or more input files and generate an output file. Therefore the command line for a module will typically specify the type of processing, the options to control the processing, one or more input file names and an output file name.

There are basically two types of files handled by the system: one that contains the raw data and another that contains processed information such as the power spectrum. Raw data files are created by the data acquisition module. Each of these files contain a channel of time-domain information. The factors considered in selecting a naming convention for these files are as follows:

1. Each file has a particular channel of data.
2. Each file corresponds to a particular operation number.
3. The files were created on a particular day.
4. They belong to a specific test set conducted on that particular day.

These considerations are incorporated by requiring that a root name of a file be specified and that the remaining characters being automatically generated. The root name is used to link the data file from one processing step to the next and finally to the decision-making step. The most commonly used root names are "tst" to represent test data, "spn" to represent files containing the normal power spectrum, "spt" to represent files containing test power spectrum and "ref" to represent files containing reference power spectrum. The automatically generated characters will represent the year, month, day and test set number on the day of processing, the operation number and the channel being processed. Each is represented by a single character. The format for a raw data file name is as follows:

---

XXXXTYMD.RC

XXXX - root name
T - test set number on that particular day
Y - year
M - month
D - day
R - operation number
C - channel number

---

The naming convention for a file that contains the power spectrum is similar to that specified above with one addition. The window number is also included in the file extension. This is because a power spectrum is usually obtained for specific time-domain window of the raw data.

Execution Control Language

As mentioned previously, the command line for a module typically specifies the type of processing, the options to control the processing, one or more input file names and an output file name. Also, the same type of processing may be applied to different channels, stored in different files and also for different windows stored in the same file. An execution control language specifies these processing steps.

Language definition

The format of the execution control database language is as follows:

--- operation number(s): channel number(s): window number(s)
  program-name window-specification command-line-arguments
  input-file-specification output-file-specification.

---

The operation number is recursively defined as follows:

operation number $\longrightarrow$ a digit followed by num $\longrightarrow$ a digit followed by a "-" followed by operation number $\longrightarrow$ empty set num $\longrightarrow$ a digit followed by num $\longrightarrow$ empty set A circuit breaker open operation is identified by an odd number and a close operation identified by an even number. Therefore, when a range is specified as beginning with an even number and ending with an even number, only even number operations will be processed by that step. Thus 2-6 represents operations 2,4,6. A similar processing is used for the odd ranges.

The data channel number and window number is specified in a similar manner except that the above special distinctions are not needed for indicating ranges of channels and windows. The specification for the channel number is shown below:

channel number $\longrightarrow$ a digit followed by num

→ a digit followed by a "-" followed by channel number

→ a digit followed by a "," followed by channel number

→ empty set

The window specification is identical to that of the channel specification.

The program-name and command-line-arguments are used simply to specify the type of processing and the options to control the processing. Interpretations of these fields are not required by the control program.

The window-specification is optional. The presence of a %W indicates that the window specification(s) for the associated command line(s) are obtained from a window specification file to be described later.

The input and output-file-specifications follow the same conventions. These fields provide for both substitution of the appropriate input file names and automatically generate unique file names for each operation and channel number as necessary. The specifications are as follows:

%D represents the raw data file name
%I represents an input file name
%O represents an output file name
%R represents an input file name list for all operations that line is to be executed on.

These specifications are generally prefixed with appropriate characters to generate the full command line. For example, "i%Ifilename" will generate the filename prefixed with "−i" i.e., "−ifilename". Note the command "−i" is a command to the program being run, and is not part of the language specification. This is further explained with examples in the next section.

The filename can be specified in one of the following ways:

1. XXXX—where XXXX represents the root name of the file. This kind of specification is expanded with the year, month, date and test number along with the appropriate extension. This is typically used to specify raw data and power spectrum file names. Note that the power spectrum file names have an additional character of extension that specifies the number of the window over which the power spectrum was obtained.

2. XXXX.—In this case the "." implies that the information pertaining to the date and test number are not added and only an extension is added in order to complete the file name. Again, the type of extension depends on whether the file is a raw data or a power spectrum file. This type of specification is typically used to represent the name of the file that contains the averaged power spectrum of a normal operation. Since this averaged power spectrum is to be used in computing the distances in a test operation, which could be done on another day, the information pertaining to the date must be omitted in order to maintain consistency.

3. XXXX.ext—In this case the full file name is specified and there is no expansion. This is typically used to specify the name of the file that contains the results of the distance measurements, i.e., the mean and standard deviation values.

4. XXXX..ext—This is also typically used to specify the name of the file that contains the results of the distance measurements, except that the presence of ".." indicates that the information pertaining to the date and test number, namely "Y", "M", "D" and "T", be inserted. This gives an indication of the date on which the distance measurements were done.

Illustrative examples

1. A typical execution control database (ECD) line for WPS (the windowed Power Spectrum program) is as follows:

2:3:1wps %W -i%Ddat -o%Ospn

This may be expanded as follows:

wps -s8000 -n2048 -idat10C5.23 -ospn10C5.231

The window specification -s8000 -n2048 is assumed to have been obtained from a "window specification file". The file names have been automatically named for a particular date, operation number and window number.

2. A typical ECD line for DIST (the distance measurement program) is as follows:

2-8:3:1:dist -s16 -c6 -r%Iref. -i%Rspn -o%Oref .. dis

This will be expanded as follows:

dist -s16 -c6 -rref.231 -ispn10C5.231 -ispn10C5.431
-ispn10C5.631 -ispn10C5.831 -oref0C5.dis Data Base File Specifications The main control program obtains information pertaining to a breaker from a set of files. These files contain information about the type of breaker, information about data acquisition and about the various processing to be performed on the breaker.

These files can be categorized as global files and local files. The global files contain information common to all breakers and the local files contain information unique to the breaker under consideration. Many of these files are in simple ASCII and can be manipulated by either other programs or directly by the operator via a text editor.

Local Files

Circuit breaker information file (.CBI extension)

This file is the root of all the information pertaining to a breaker. The names of various other files containing the information required by the control program are present in this file. The file specification is as follows:

line 1: location of breaker
line 2: name of manufacturer
line 3: rating of breaker
line 4: breaker model #
line 5: breaker serial #
line 6: raw data file rootname
line 7: window specification file name
line 8: sensor ID file name
line 9: history file name
line 10: data acquisition initialization file name
line 11: number of operations
line 12-17: ECD file names
line 13-end of file: Information pertaining to the location of sensors. This information is for display purposes.

Window specification file (.WIN extension)

This file contains information about the location of events in the raw data. This file is created either manually or by a program that determines the occurrence of events in the time domain. The format for this file is as follows:

channel number: -sstarting point -nnumber of points

For example, "1: -s8000 -n2048", represents a window of size 2048 points in channel 1 starting at the 8000th point.

As mentioned previously, if a %W is specified in an execution control data base line, then the window specification information is obtained from this file. The information is extracted by channel number, then by the window number. In this window specification file, window number, n, for a given channel corresponds to the nth line specifying a window for the particular channel number.

Execution control database files (.ECD extension)

These files contain the execution control sequences for the diagnostic system. These file consist of lines written in the execution control language. A typical ECD file is shown below:

```
2-8:1-4:1:avg -i%Rspn -o%Orn1
2-2:1-4:1:copy %1rn1 %Orefer.
```

Circuit breaker test history file (.HIS extension)

This file contains the history of the tests conducted on the breaker. This file is created when the diagnostic system is first run. For all subsequent runs, the relevant information is appended to the file. The format for this file is as follows:
- line 1: date on which test was conducted
- line 2: type of maintenance
- line 3: number of operations
- line 4: number of channels
- line 5: sampling frequency
- line 6: number of pretrigger samples
- line 7: raw data file name
- line 8: test number The test number for a particular test may be obtained from this file. The date on which the file was last modified is obtained. If this corresponds to the current date, then the test number of the previous test is obtained from this file and is incremented by one to give the current test number. Otherwise, it is determined that the test is the first test of the day on the particular breaker and thus the test number is one. This process is used to obtain the test number for building the file names.

Data acquisition control file (.DAQ extension)

This file contains necessary information to initialize and control the data acquisition hardware. The format of this file is as follows:
- line 1: sampling frequency in KHz
- line 2: number of channels
- line 3: number of pretrigger samples
- line 4: excitation current value
- line 5: current enable mask
- line 6: cut-off frequency:gain:ac/dc (for channel 1)
- line 7: cut-off frequency:gain:ac/dc (for channel 2)
- line 13: cut-off frequency:gain:ac/dc (for channel 8)
- line 14: trigger select information for first operation
- line 17: trigger select information for fourth operation The trigger select information is as follows:

A/B/E/channel # (1-16) : TP : TT : Thresh : AMP

If A is specified in the first field, then the external trigger is due to the signal voltage $V_A$. If B is specified, then the trigger is due to the signal voltage $V_B$. If a channel number is specified, then the trigger is internal and is obtained from the specified channel.

TP - Trigger polarity ( pos/neg )
TT - Trigger type  a - always
                   s - slope
                   l - level
                   t - threshold
Thresh - unscaled integer
AMP - completes the control word of the trigger attribute latch
       if A specified then absolute mode else window mode
       if M specified then missing pulse detector is enabled
       if P is specified polarity is inverted Global Files
Sensor calibration file (sensor.cal)
The format of the file is as follows:

sensor ID : gain factor
sensor ID : gain factor where sensor ID is a 1−n character alphanumeric ID of the sensor and gain factor is a floating point calibration factor to convert from counts in the A/D to g's.

In a preferred embodiment, the database driven diagnostic system of the invention is implemented by computer software. A listing of the source program (in C language and also in 8088 assembly language) is provided in the microfiche appendix. An index to the appendix appears herebelow:

Index to Microfiche Appendix

The microfiche appendix includes seven software modules, CBD, ACQUIRE, WPS, DIST and AVG, VOTER, and EVDET, arranged in 94 frames. The microfiche contains seven (7) rows and fourteen (14) vertical columns and should be read in a downward fashion beginning with the leftmost column (column 1), reading down the seven rows of column 1 and then reading down the rows of column 2, etc. Frame locations are designated "Frame Start" and "Frame End" which indicates the frame locations where an individual software module begins and ends, respectively. Locations are designated by a set of two integers (a, b) where a=column number and b=row number. For example, module CBD ends at frame (6,3) which means that this software listing ends in the frame located at column 6, row 3 of the microfiche. The modules, their associated files, and frame locations are as follows:

| MODULE NAME: | CBD |
|---|---|
| ASSOCIATED FILES | CBD1. DATE. FMENU1. FILOP. FOCHK. TSENS. SEARCH D. GET_FILE. LD_WS. GET_TSTN. DISPLAY |
| 'C' SOURCE: | |
| 'ASM'. SOURCE: | POSCUR. MODE. GETCON. WRTATT. WRTCHR |
| HEADER FILES: | ACQ.H, CBD.H |
| FRAME START: | (1, 1) |
| FRAME END: | (6,3) |
| MODULE NAME: | ACQUIRE |

| | |
|---|---|
| ASSOCIATED FILES 'C' SOURCE: | ACQUIRED, ACQINIT2, ACQSORT5, GET_TSTN, DISPLAY, DATE, FOCHK, FILOP, ODD |
| 'ASM' SOURCE: | GETCON, POSCUR, MODE |
| HEADER FILES: | ACQ.H |
| FRAME START: | (6, 3) |
| FRAME END: | (9, 6) |
| MODULE NAME: | WPS |
| ASSOCIATED FILES 'C' SOURCE: | WPS, FFT1, INPUT1, OUTPUT1, REM_DC |
| 'ASM' SOURCE: | WRAPPER1 |
| FRAME START: | (9, 6) |
| FRAME END: | (10, 7) |
| MODULE NAMES: | DIST and AVG |
| ASSOCIATED FILES 'C' SOURCE: | DIST1, FOCHK, SQUARE, OUTPUT1, AVG FOCHK |
| FRAME START: | (10, 7) |
| FRAME END: | (12, 1) |
| MODULE NAME: | VOTER |
| ASSOCIATED FILES 'C' SOURCE: | VOTER1, FOCHK, SQUARE |
| 'ASM' SOURCE: | POSCUR, MODE, GETCON |
| FRAME START: | (12, 1) |
| FRAME END: | (12, 6) |
| MODULE NAME: | EVDET |
| ASSOCIATED FILES 'C' SOURCE: | EVDET2, WINPUT, RECTFY, ENV, REM_DC |
| 'ASM' SOURCE: | WRAPPER1 |
| FRAME START: | (12, 6) |
| FRAME END: | (14, 3) |

Although a preferred embodiment of the invention has been shown and described, it will be apparent to those skilled in the art that various changes and modifications may be made therein without departing from the spirit of the invention or from the scope of the appended claims.

APPENDIX A

```
c       *****************************************************
c       * Hilbert Envelope Extractor                        *
c       *****************************************************
        real xin(4,8),xout(8,4),xmean(8),xdev(8),fout(8)
        real xamp(4,8),famp(8),sig(30,15291),temp(15291)
        real temp1(15291)
        character fn*10,fn1(30)*10, option*1,btype*1,name(5)*10
        integer i,j,start,nout,inn,nshot
c
c       open(unit=3,file='env.dat',status='new')
        type *,' '
888     type *,'Enter Sampling freq (l(Low)--16K, h(High) --32K)'
        read '(A1)',btype
        if (btype .eq. 'h') then
        ratio=2.0
                else if (btype .eq. 'l') then
                ratio=1.0
                else
                        go to 888
        end if
c       nout= number of events in each shot
        nout=8
        type *,'Enter option for the starting point (a,m)'
        type *,'       ***********************************!'
        type *,'       * a -- automatic thresholding     *!'
        type *,'       * m -- manual thresholding        *!'
        type *,'       ***********************************!'
        read '(A1)',option
        if (option .eq. 'm') then
        type *,'Type threshold value for the starting point (e.g. 1)'
        accept *,thresh_st
        end if
        type *,'Enter # of samples in each file (ex. 5000)'
        read *, inn type *,'Enter # of shots(ex. 4)'
        accept *,nshot
        type *,'Enter starting sample'
        accept *,start
        do 1 i=1,nshot
        write (5,2),i
        read '(A10)',fn1(i)
1       continue
2       format(1x,'Enter data file names #',I2)
c
c       * Read signals from files to signal arrays *
c       * and get envelope *
        do  i=1,nshot
            call sub1bon(temp,fn1(i))
c
```

```fortran
c            ** Hibert envelope **
             call envelope(start-1,inn,temp,250.0,4000.0,400.0,temp1)
c
c            ** Copy envelop of ith signal to sig array *
             do j=start,start+inn
                 sig(i,j) = temp1(j)
             enddo
          enddo
c      * End of reading and envelope *
c
          call signal_domain_filter(sig,temp,nshot,start,inn)
c      ** save envelope in file env5.dat **
          name(5)='env5.dat'
          call save(temp,start,inn,name(5))
          name(1)='env1.dat'
          name(2)='env2.dat'
          name(3)='env3.dat'
          name(4)='env4.dat'
          do j=1,4
          do i=start,start+inn
                 temp1(i) = sig(j,i)
          enddo
          call save(temp1,start,inn,name(j))
          enddo
          type *,'Envelope is done'
          stop
          end
c
c      ********************************************
c      * Subroutine that saves a signal in a file *
c      ********************************************
          subroutine save(sig,start,NOfSamples,filename)
          real sig(15291)
          integer start,NOfSamples
          character filename*10
c
          real x(15291),dx
          dx = 1.0/273.066
          open(4,file=filename,status='new')
          do i=start,start+NOfSamples
                 x(i) = dx*float(i)
c            ** save for grafit format
                 write(4,*) x(i),sig(i)
          enddo
c      Save for plotrout format
c      write(4,*) (sig(i),i=1,7700)
          close(4)
          return
          end
c      ****************************
c
c
c      ***********************************************
c      **** Try signal domain filter on n shots ****
c      ***********************************************
          subroutine signal_domain_filter(in_sig,out_sig,nshot,start,NOfSamples)
          real in_sig(30,15291),out_sig(15291)
          integer nshot,start,NOfSamples
c
          integer i,j,ic
c      * Dimension of next two arrays should be nshot *
          real unsorted(30),sorted(30),sum,tolerance,d1,d2,d,median
c
          do i=start,start+NOfSamples-21
             do j=1,nshot
                unsorted(j) = in_sig(j,i)
             enddo
             call order(nshot,unsorted,sorted)
c            ** If nshot is even **
             if ((nshot/2) .eq. (nshot+1)/2) then
```

```
          d1 = (sorted(nshot/2)-sorted(nshot/2-1))**2
          d2 = (sorted(nshot/2+1)-sorted(nshot/2+2))**2
          if (d1 .lt. d2) then
              median = sorted(nshot/2)
          else
              median = sorted(nshot/2+1)
          endif
c     ** else nshot is odd **
      else
          median = sorted(nshot/2+1)
      endif
c
      tolerance = 0.2*median
      ic = 0
      sum = 0.0
      do j=1,nshot
          d = abs(sorted(j) -median)
          if (d .le. tolerance) then
              ic = ic+1
              sum = sum+sorted(j)
          endif
      enddo
      if (ic .eq. 0) type *,i
      sum = sum/float(ic)
      out_sig(i) = sum
      enddo
      return
      end
c     *************************
      subroutine sublbon(ax,fn)
c     ****************************************************
c     * SUBROUTINE                                       *
c     * to convert Integer format to real format         *
c     ****************************************************
c
      BYTE BBPE,BFORM,BFUNC,BAUXF,BIBF,BVRL
      INTEGER*2 INO_OF_ELE,IEXP,IRECS,I12,I13,I14,IBPR,I16
     1 I17
      REAL*4 XMIN,XINC,SCA,ax(15291)
      CHARACTER TEXT*60,FN*10
      OPEN(UNIT=10,FILE=FN,FORM='UNFORMATTED',STATUS='OLD')
      READ(10)BBPE,BFORM,INO_OF_ELE,IEXP,BFUNC,BAUXF,XMIN,
     1 XINC,SCA,IRECS,BIBF,BVRL,I12,I13,I14,IBPR,
     1 TEXT
      RMULT=SCA/2.**(15-IEXP)
      TYPE *,' '
      TYPE *,'Header:   ',TEXT
      nom=ibpr+1
      TYPE *,'No. of elements:',INO_OF_ELE,'   Rec size(# of bytes):',
     1 IRECS
      close(10)

call contbn(rmult,ino_of_ele,nom,fn,ax)
      return
      end
c
      subroutine contbn(rm,km,kn,fnn,axx)
      integer*2 int(60,256),km
      real axx(15291),temp(15291)
      character fnn*10
      open(2,file=fnn,form='unformatted',status='old',access='direct')
      do 10 i=2,kn
      read(2,REC=i) (int(i,j),j=1,256)
10    continue
      do 20 i=2,kn
      do 20 j=1,256
      ii=(i-2)*256+j
      temp(ii)=int(i,j)*rm
      if(ii .eq. km) go to 30
20    continue
30    do 40 i=1,km
      axx(i)=temp(i)
```

```
40      continue
        bias=0.0
        do 50 i=1,150
        bias=bias+axx(i)/150.
50      continue
        type *,'Bias =   ',bias
        do 60 i=1,km
        axx(i)=axx(i)-bias
60      continue
        close(2)
        return
        end
c
        subroutine envelope(ns,n,a,bl,bh,fl,b)
        integer ns,n
        real a(15291), bl,bh,fl,b(15291)
        complex z1(8000),z(8000)
        real s(8000),f(8000),x(8000),w(8000),ev(8000)
        common/wfft/wfftc(32000)
c
        real dt,dx,df,pi,s1
        integer mst,mwd,ns1,ns2,i,n3,nhs
c
        pi = 4.0*atan(1.0)
        call fftci(n,wfftc)
        dt=1./16000.
        dx=60./16000.
        df=1./(float(n)*dt)
        do i=1,n
         z1(i)=cmplx(a(ns+i),0.)
        f(i)=df*float(i-1-n/2)
        x(i)=dx*(i+ns-1)
        enddo call fft1d(z1,-1,n)

mst=bl/df
        mwd=(bh-bl)/df
         ns1=n/2-(mst+mwd)
         ns2=n/2+mst
        do i=1,mwd
         z1(i+ns1)=z1(i+ns1)*(0.54-0.46*cos(2*pi*(i-1)/mwd))
         z1(i+ns2)=z1(i+ns2)*(0.54-0.46*cos(2*pi*(i-1)/mwd))
        enddo do i=1,n
         if(abs(f(i)).lt.bl.or.abs(f(i)).gt.bh)z1(i)=(0.,0.)
c       * Hilbert transform *
         s1=1.
        if(f(i).gt.0.)s1=-1.
        z(i)=s1*(0.,1.)*z1(i)
        enddo
        call fft1d(z,1,n)
        call fft1d(z1,1,n)
        do i=1,n
        z(i)=cmplx(sqrt(real(z(i))**2+real(z1(i))**2),0.)
        enddo do i=1,n
        ev(i)=cabs(z(i))
        enddo
        call fft1d(z,-1,n)

n3=fl/df
        do i=1,n3*2
        nhs=n/2-n3-1
        z(i+nhs)=z(i+nhs)*(0.54-0.46*cos(2*pi*(i-1)/(2*n3-1)))
        enddo
```

```
       do i=1,n
       if(abs(f(i)).gt.fl)z(i)=(0.,0.)
       enddo call fft1d(z,1,n)

do i=1,n
       b(i)=cabs(z(i))
c      type *,b(i)
       enddo
       return
       end
       SUBROUTINE FFT1D(S,iS,n)
       COMPLEX S(*),XX(8000)
       DO 10 I=1,N/2
10     XX(I)=S(I)
       DO 20 I=N/2+1,N
20     S(I-N/2)=S(I)
       DO 30 I=1,N/2
30     S(N/2+I)=XX(I)
       CALL FFT(S,is,n)
       DO 60 I=1,N/2
60     XX(I)=S(I)
       DO 70 I=N/2+1,N
70     S(I-N/2)=S(I)
       DO 80 I=1,N/2
80     S(N/2+I)=XX(I)
       RETURN
       END
c
       SUBROUTINE FFT1(S,iS,n)
       COMPLEX S(*),XX(8000)
       CALL FFT(S,is,n)
       DO 60 I=1,N/2
60     XX(I)=S(I)
       DO 70 I=N/2+1,N
70     S(I-N/2)=S(I)
       DO 80 I=1,N/2
80     S(N/2+I)=XX(I)
       RETURN
       END
c
       SUBROUTINE FFT2D(is,n)
       COMPLEX A,X(64)
       COMMON/BLKA/A(64,64)
       DO 40 J=1,N DO 20 K=1,N
20     X(K)=A(J,K)
       CALL FFT1D(X,is,n)
       DO 30 K=1,N
30     A(J,K)=X(K)
40     CONTINUE
c
       DO 90 K=1,N
       DO 70 J=1,N
70     X(J)=A(J,K)
       CALL FFT1D(X,is,n)
       DO 80 J=1,N
80     A(J,K)=X(J)
90     CONTINUE
       RETURN
       END
c
       SUBROUTINE FFT(S,is,n)
       COMPLEX S(*)
       common/wfft/wfftc(40000)
       dimension cpy(20000)
       IF(is.LT.0)GO TO 1
       DO 1000 I=1,N
1000   S(I)=CONJG(S(I))
```

```
1       CONTINUE
        call f2tcf(n,s,s,wfftc,cpy)
        IF(iS.LT.0)RETURN
        DO 2 I=1,N
2       S(I)=CONJG(S(I))/N
        RETURN
        END
c       ********************************************************
c       * Short-Time Energy Envelope Extractor                 *
c       ********************************************************
        real xin(4,8),xout(8,4),xmean(8),xdev(8),fout(8)
        real xamp(4,8),famp(8),sig(30,15291),temp(15291)
        real temp1(15291)
        character fn*10,fn1(30)*10, option*1,btype*1,name(5)*10
        integer i,j,start,nout,inn,nshot
c
c       open(unit=3,file='env.dat',status='new')
        type *,' '
888     type *,'Enter Sampling freq (l(Low)--16K, h(High) --32K)'
        read '(A1)',btype
        if (btype .eq. 'h') then
        ratio=2.0
                else if (btype .eq. 'l') then
                ratio=1.0
                else
                        go to 888
        end if
c       nout= number of events in each shot
        nout=8
        type *,'Enter option for the starting point (a,m)'
        type *,'     *********************************'
        type *,'     * a -- automatic thresholding    *'
        type *,'     * m -- manual thresholding       *'
        type *,'     *********************************'
        read '(A1)',option
        if (option .eq. 'm') then
        type *,'Type threshold value for the starting point (e.g. 1)'
        accept *,thresh_st
        end if
        type *,'Enter # of samples in each file (ex. 5000)'
        read *, inn
        type *,'Enter # of shots(ex. 4)'
        accept *,nshot
        type *,'Enter starting sample'
        accept *,start
        do 1 i=1,nshot
        write (5,2),i
        read '(A10)',fn1(i)
1       continue
2       format(1x,'Enter data file names #',I2)
c
c       * Read signals from files to signal arrays *
c       * and get envelope *
        do  i=1,nshot
            call sublbon(temp,fn1(i))
c
c           ** STE envelope **
            call stenergy(temp,temp1,start,inn)
c
c           ** Copy envelop of ith signal to sig array *
            do j=start,start+inn
                sig(i,j) = temp1(j)
            enddo
        enddo
c       * End of reading and envelope *
c
        call signal_domain_filter(sig,temp,nshot,start,inn)
c       ** save envelope in file env5.dat **
        name(5)='env5.dat'
        call save(temp,start,inn,name(5))
```

```fortran
            name(1)='env1.dat'
            name(2)='env2.dat'
            name(3)='env3.dat'
            name(4)='env4.dat'
            do j=1,4
            do i=start,start+inn
                   temp1(i) = sig(j,i)
            enddo
            call save(temp1,start,inn,name(j))
            enddo
            type *,'Envelope is done'
            stop
            end
c
c      ***********************************************
c      * Subroutine that saves a signal in a file *
c      ***********************************************
            subroutine save(sig,start,NOfSamples,filename)
            real sig(15291)
            integer start,NOfSamples
            character filename*10
c
            real x(15291),dx
            dx = 1.0/273.066
            open(4,file=filename,status='new')
            do i=start,start+NOfSamples
                   x(i) = dx*float(i)
c      ** save for grafit format
                   write(4,*) x(i),sig(i)
            enddo
c      Save for plotrout format
c           write(4,*) (sig(i),i=1,7700)
            close(4)
            return
            end
c      *****************************草****************
c
c
c      ***********************************************
c      **** Try signal domain filter on n shots ****
c      ***********************************************
            subroutine signal_domain_filter(in_sig,out_sig,nshot,start,NOfSamples)
            real in_sig(30,15291),out_sig(15291)
            integer nshot,start,NOfSamples
c
            integer i,j,ic
c      * Dimension of next two arrays should be nshot *
            real unsorted(30),sorted(30),sum,tolerance,d1,d2,d,median
c
            do i=start,start+NOfSamples-21
               do j=1,nshot
                  unsorted(j) = in_sig(j,i)
               enddo
               call order(nshot,unsorted,sorted)
c      ** If nshot is even **
               if ((nshot/2) .eq. (nshot+1)/2) then
                  d1 = (sorted(nshot/2)-sorted(nshot/2-1))**2
                  d2 = (sorted(nshot/2+1)-sorted(nshot/2+2))**2
                  if (d1 .lt. d2) then
                      median = sorted(nshot/2)
                  else
                      median = sorted(nshot/2+1)
                  endif
c      ** else nshot is odd **
               else
                  median = sorted(nshot/2+1)
               endif
c
               tolerance = 0.2*median
               ic = 0
               sum = 0.0
               do j=1,nshot
                   d = abs(sorted(j) -median)
```

```
              if (d .le. tolerance) then
                  ic = ic+1
                  sum = sum+sorted(j)
              endif
          enddo
          if (ic .eq. 0) type *,i
          sum = sum/float(ic)
          out_sig(i) = sum
       enddo
       return
       end
c      *************************
       subroutine sublbon(ax,fn)
c      ****************************************************
c      * SUBROUTINE                                       *
c      * to convert Integer format to real format         *
c      ****************************************************
c
       BYTE BBPE,BFORM,BFUNC,BAUXF,BIBF,BVRL
       INTEGER*2 INO_OF_ELE,IEXP,IRECS,I12,I13,I14,IBPR,I16
     1 I17
       REAL*4 XMIN,XINC,SCA,ax(15291)
       CHARACTER TEXT*60,FN*10
       OPEN(UNIT=10,FILE=FN,FORM='UNFORMATTED',STATUS='OLD')
       READ(10)BBPE,BFORM,INO_OF_ELE,IEXP,BFUNC,BAUXF,XMIN,
     1 XINC,SCA,IRECS,BIBF,BVRL,I12,I13,I14,IBPR,
     1 TEXT
       RMULT=SCA/2.**(15-IEXP)
       TYPE *,' '
       TYPE *,'Header:   ',TEXT
       nom=ibpr+1
       TYPE *,'No. of elements:',INO_OF_ELE,'   Rec size(# of bytes):',
     1 IRECS
       close(10)
       call contbn(rmult,ino_of_ele,nom,fn,ax)
       return
       end
c
       subroutine contbn(rm,km,kn,fnn,axx)
       integer*2 int(60,256),km
       real axx(15291),temp(15291)
       character fnn*10
       open(2,file=fnn,form='unformatted',status='old',access='direct')
       do 10 i=2,kn
       read(2,REC=i) (int(i,j),j=1,256)
10     continue
       do 20 i=2,kn
       do 20 j=1,256
       ii=(i-2)*256+j
       temp(ii)=int(i,j)*rm
       if(ii .eq. km) go to 30
20     continue
30     do 40 i=1,km
       axx(i)=temp(i)
40     continue
       bias=0.0
       do 50 i=1,150
       bias=bias+axx(i)/150.
50     continue
       type *,'Bias =   ',bias
       do 60 i=1,km
       axx(i)=axx(i)-bias
60     continue
       close(2)
       return
       end
c
       subroutine stenergy(ax,temp,start,n)
```

```fortran
        real ax(15291),temp(15291)
        integer start,n
c
        real xint,xbeg,xaft
        integer jj,bwi,cwi,ewi,window
c
        window = 50
        xint=0.0
        do 12 jj=start,start+window
        xint=xint+ax(jj)**2
12      continue
        temp(start+window/2)=xint/float(window+1)
        BWI = start
10      BWI = BWI + 1
        CWI = BWI + window/2
        EWI = BWI + window
        xbeg=ax(bwi)**2
        xaft=ax(ewi)**2
        temp(cwi)=(temp(cwi-1)*float(window+1)-xbeg+xaft)/float(window+1)
        IF (EWI.LT.start+n) GO TO 10
        DO 30 I = start,start+n
        temp(I) = sqrt(TEMP(I))
30      CONTINUE
c
c
        return
        end
c       ********************************************************
c       * Median Filter Envelope Extractor and                 *
c       * Automatic Clustering Algorithm                       *
c       ********************************************************
        real xin(4,8),xout(8,4),xmean(8),xdev(8),fout(8)
        real xamp(4,8),famp(8),sig(30,15291),temp(15291)
        real temp1(15291)
        character fn*10,fn1(30)*10, option*1,btype*1,name(5)*10
        integer i,j,start,nout,inn,nshot
c
        type *,'Enter output file name for clustered timing events'
        read '(A10)',fn
        open(unit=1,file=fn,status='new')
c       open(unit=3,file='env.dat',status='new')
        type *,' '
888     type *,'Enter Sampling freq (l(Low)--16K, h(High) --32K)'
        read '(A1)',btype
        if (btype .eq. 'h') then
        ratio=2.0
             else if (btype .eq. 'l') then
             ratio=1.0
             else
                  go to 888
        end if
c       nout= number of events in each shot
        nout=8
        type *,'Enter option for the starting point (a,m)'
        type *,'     *********************************** '
        type *,'     * a -- automatic thresholding     * '
        type *,'     * m -- manual thresholding        * '
        type *,'     *********************************** '
        read '(A1)',option
        if (option .eq. 'm') then
        type *,'Type threshold value for the starting point (e.g. 1)'
        accept *,thresh_st
        end if
        type *,'Enter # of samples in each file (ex. 5000)'
        read *, inn
        type *,'Enter # of shots(ex. 4)'
        accept *,nshot
        type *,'Enter starting sample'
        accept *,start
        do 1 i=1,nshot
        write (5,2),i
        read '(A10)',fn1(i)
```

```
1          continue
2          format(1x,'Enter data file names #',I2)
c
c          * Read signals from files to signal arrays *
c          * and get envelope *
           do  i=1,nshot
               call sub1bon(temp,fn1(i))
c
c              ** Median envelope **
               call rectify(temp,temp1,start,inn)
               call smooth_signal(temp1,temp,start,inn)
c
c              ** Copy envelop of ith signal to sig array *
               do j=start,start+inn
                   sig(i,j) = temp1(j)
               enddo
           enddo
c          * End of reading and envelope *
c
c          ** save envelope in file env5.dat **
           name(5)='env5.dat'
           call save(temp,start,inn,name(5))
           name(1)='env1.dat'
           name(2)='env2.dat'
           name(3)='env3.dat'
           name(4)='env4.dat'
           do j=1,4
           do i=start,start+inn
                   temp1(i) = sig(j,i)
           enddo
           call save(temp1,start,inn,name(j))
           enddo
           type *,'Envelope is done'
           accept *,i
c
c          *******************************************
c          Automatic Timing Infomation Exrtractor
c          *******************************************
           do 3 i=1,nshot
c              do j=start,start+inn
c                  temp(j) = sig(i,j)
c              enddo
           call tedge(fout,temp,ratio,nout,start,inn,famp,option,thresh_st)
           do 4 j=1,8
           xin(i,j)=fout(j)
           xamp(i,j)=famp(j)
4          continue
3          continue
           type *,' '
           type *,'Timing events'
           write (1,400)
           do 10 kk=1,nshot
           write(5,200),kk,(xin(kk,i),i=1,nout)
           write(5,301)(xamp(kk,i),i=1,nout)
           write(1,200),kk,(xin(kk,i),i=1,nout)
           write(1,301)(xamp(kk,i),i=1,nout)
10         continue
c
c          *******************************************
c          Automatic Clustering Algorithm
c          *******************************************
c
           call cluster(xin,xout,xmean,xdev)
           write (1,209)
           write (1,401)
           ntot=0
           do 25 kk=1,nout
           if (xdev(kk) .lt. 0.15) then
           ntot=ntot+1
           write (1,205),ntot
```

```
              write(1,206),xmean(kk)
              write(1,207),xdev(kk)
              write(1,208)(xout(kk,j),j=1,4)
              end if
25            continue
200           format(1x,'Shot ',I1,':',8(F5.2,2x))
205           format(1x,'o Event ',I1,':')
206           format(1x,'    Mean :',F5.2)
207           format(1x,'    SDV  :',F5.2)
208           format(1x,'    Clustered time:',4(F5.2,2x))
209           format(1x,'_____
     +_____')
300           format(1x,'Time:  ',8(F5.2,2x))
301           format(1x,'Height:',8(F5.2,2x))
400           format(1x,
     +  /' o Type of Circuit breaker:'
     +  /' o Type of operations:'
     +  /'_____'
     +  /' '
     +  /' *** Extracted Timing Information ***'
     +  /' ')
401           format (1x,
     +  /' '
     +  /' *** Clustered Timing Information ***')
              stop
              end
c
c             ********************************************
c             * Subroutine that saves a signal in a file *
c             ********************************************
              subroutine save(sig,start,NOfSamples,filename)
              real sig(15291)
              integer start,NOfSamples
              character filename*10
c
              real x(15291),dx
              dx = 1.0/273.066
              open(4,file=filename,status='new')
              do i=start,start+NOfSamples
                    x(i) = dx*float(i)
c             ** save for grafit format
                    write(4,*) x(i),sig(i)
              enddo
c             Save for plotrout format
c             write(4,*) (sig(i),i=1,7700)
              close(4)
              return
              end
c             ****************************************************************
c             SUBROUTINE for
c             the extraction of timing events
c             1) Change integer data to real data -- by subroutine 'sublbon'
c             2) SMOOTHER -- by subroutine 'sedge'
c             3) Find edges by using differencING operator
c             4) Ordering edges based on amplitude of edge and slect from largest
c                     to 8  largest one
c             5) Ordering 8 selected events from smallest to largest
c             OUTPUT: fout -- Timing
c                     famp -- Amplitude
c             ****************************************************************
c
c
              subroutine tedge(fout,ex,ratio,nout,start,inn,famp,option,thresh_st)
c
              real fout(8),ex(15291),ratio,famp(8),ax(15291),amp(300)
              integer nout,start,inn
              real thresh_st,wd(120),xamp(150),time(300),xtime(150)
              real aold1(150),told1(7),fout1(2,7),fout2(2,8)
              real xin(4,8),xout(8,4),xmean(8),xdev(8)
              integer bwi,cwi,ewi,bxi,exi,kmax,window
              character fn*10,option*1
c
```

```
c       **************************
c       * Differencing operator *
c       **************************
        call differentiate(ex,ax,start,inn)
        fn = 'a.dat'
        call save(ax,start,inn,fn)
c       **********************
c       * Find Local Maximum *
c       ********************** c       ***********************************************
c       Find maximum value in a window. If sampling
c       rate is 16K window = 60 samples. If 32K it
c       is 120 samples (0.2 cycles for both cases)
c       ***********************************************
c
        if (ratio .eq. 1.0) then
          window = 60
        else
          window = 120
        end if
        icon1 = 0
        bxi = start-window
200     bxi = bxi+window
        exi = bxi+window-1
        do 30 win = bxi,exi
        jj = win-bxi+1
        wd(jj) = ax(win)
30      continue
        call find(wd,kmax,window)
        if(ax(bxi+kmax-1) .gt. 0.0) then
        icon1 = icon1+1
        amp(icon1)=ax(bxi+kmax-1)
        time(icon1)=(bxi+kmax-1)
        end if
        if (exi .lt. start+inn) go to 200
c
c
c       ******************
c       * Thresholding *
c       ******************
c       Find threshold value for the startind point
c
        if (option .eq. 'a') then
c       Find auto threshold by average
                aveloc=0.0
                do 222 ij=2,icon1
                aveloc=aveloc+amp(ij)/real(icon1-1)
222             continue
                thresh=aveloc*0.5
        else
                thresh=thresh_st
        end if
c
                ij=1
777             if (amp(ij) .ge. thresh) then
                xamp(1)=amp(ij)
                xtime(1)=time(ij)
                go to 223
                else
                amp(ij)=0.0
                time(ij)=0.0
                ij=ij+1
                end if
                if (ij .lt. 300) go to 777 c       Compare starting point which is picked by threshold value
c       with neighboring event
c       If distance is less than 0.02 cycle then select timing with larger amp.
223     if (time(ij+1)-time(ij) .lt. 6.*ratio) then
```

```fortran
                  if (amp(ij+1) .gt. amp(ij)) then
                        time(ij)=0.0
                        amp(ij)=0.0
                  else
                        time(ij+1)=0.0
                        amp(ij+1)=0.0
                  end if
            end if
c     Check whether two neighboring edges are apart more than 0.2 cycle
            do 40 kk=ij+1,299
            if (time(kk+1)-time(kk) .lt. 60.*ratio) then
                  if (amp(kk+1) .gt. amp(kk)) then
                        time(kk)=0.0
                        amp(kk)=0.0
                  else
                        time(kk+1)=0.0
                        amp(kk+1)=0.0
                  end if
            end if
40          continue
c
c     Delete zero timing
c
            icheck=0
            do 50 i=1,300
            if( time(i) . gt. 0.0) then
            icheck=icheck+1
            xtime(icheck)=time(i)
            xamp(icheck)=ax(time(i))
            end if
50          continue
c
c     ****************
c     * Ordering     *
c     ****************
c
c     Find timing from largest to 7 th largest based on amplitude of edges
c     Starting time is included in any case
            do 401 ii=1,nout-1
            do 400 i=1,149
            aold1(i)=xamp(i+1)
400         continue
            call find(aold1,max,150)
            fout1(1,ii)=xtime(max+1)
            fout1(2,ii)=xamp(max+1)
            xamp(max+1)=-10.
401         continue
c
c     Ordering edge from smallest to largest based on timing
            do 402 ii=1,nout-1
            do 403 i=1,7
            told1(i)=fout1(1,i)
403         continue
            call find2(told1,min,7)
            fout2(1,ii+1)=fout1(1,min)
            fout2(2,ii+1)=fout1(2,min)
            fout1(1,min)=999999.
402         continue
            fout2(1,1)=xtime(1)
            fout2(2,1)=xamp(1)
c
c     Calculate timing in cycle
c
            do 500 i=1,nout
            fout(i)=fout2(1,i)/(273.066*ratio)
            famp(i)=fout2(2,i)
500         continue
            return
            end
```

```fortran
c
c       *********************
c       Subroutine of ordering
c       *********************
c
        subroutine order(k,old,anew)
        real old(k),anew(k)
        do 10 i=1,k
        call find2(old,n,k)
        anew(i)=old(n)
        old(n)=9999.
10      continue
        return
        end
c       **************************
c       Find largest value
c       **************************
        subroutine find(set,lmax,k)
        real set(k)
        integer lmax,k lmax=1
        xmax=set(1)
        do 10 i=2,k
        if (set(i) .gt. xmax) then
        xmax=set(i)
        lmax=i
        end if
10      continue
        return
        end
c       ************************
c       Find smallest value
c       ************************
        subroutine find2(set,lmin,k)
        real set(k)
        lmin=1
        xmin=set(1)
        do 10 i=2,k
        if (set(i) .lt. xmin) then
        xmin=set(i)
        lmin=i
        end if
10      continue
        return
        end
c
c
        subroutine sublbon(ax,fn)
c       ***************************************************
c       * SUBROUTINE                                      *
c       * to convert Integer format to real format        *
c       ***************************************************
c
        BYTE BBPE,BFORM,BFUNC,BAUXF,BIBF,BVRL
        INTEGER*2 INO_OF_ELE,IEXP,IRECS,I12,I13,I14,IBPR,I16
     1  I17
        REAL*4 XMIN,XINC,SCA,ax(15291)
        CHARACTER TEXT*60,FN*10
        OPEN(UNIT=10,FILE=FN,FORM='UNFORMATTED',STATUS='OLD')
        READ(10)BBPE,BFORM,INO_OF_ELE,IEXP,BFUNC,BAUXF,XMIN,
     1  XINC,SCA,IRECS,BIBF,BVRL,I12,I13,I14,IBPR,
     1  TEXT
        RMULT=SCA/2.**(15-IEXP)
        TYPE *,' '
        TYPE *,'Header:   ',TEXT
        nom=ibpr+1
        TYPE *,'No. of elements:',INO_OF_ELE,'   Rec size(# of bytes):',
     1  IRECS
        close(10)
        call contbn(rmult,ino_of_ele,nom,fn,ax)
        return
        end
```

```fortran
c
      subroutine contbn(rm,km,kn,fnn,axx)
      integer*2 int(60,256),km
      real axx(15291),temp(15291)
      character fnn*10
      open(2,file=fnn,form='unformatted',status='old',access='direct')
      do 10 i=2,kn
      read(2,REC=i) (int(i,j),j=1,256)
10    continue
      do 20 i=2,kn
      do 20 j=1,256
      ii=(i-2)*256+j
      temp(ii)=int(i,j)*rm
      if(ii .eq. km) go to 30
20    continue
30    do 40 i=1,km
      axx(i)=temp(i)
40    continue
      bias=0.0
      do 50 i=1,150
      bias=bias+axx(i)/150.
50    continue
      type *,'Bias = ',bias
      do 60 i=1,km
      axx(i)=axx(i)-bias
60    continue
      close(2)
      return
      end
c     ********************
c     * SMOOTHER         *
c     ********************
      subroutine smooth_signal(ax,cx,start,inn)
      real ax(15291),cx(15291),wd(19),anew(19)
      integer bwi,cwi,ewi,med_wind,half_wind
c
c     ** Pass signal 5 times through the filter **
      ismooth = 5
c     ** Median filter window is med_wind **
      med_wind = 11
      half_wind = med_wind/2
c
      do 100 ism=1,ismooth
      bwi=start-1
60    bwi=bwi+1
      cwi=bwi+20
      ewi=bwi+40
      do iwn=cwi-half_wind,cwi+half_wind
         jjj=iwn-cwi+half_wind+1
         wd(jjj)=ax(iwn)
      enddo
c     Find median from center window
      call order(med_wind,wd,anew)
      xmed=anew(half_wind+1)
      sum1=0.
      sum2=0.
c     Find average from two large windows
      do 40 ii=1,20
      sum1=sum1+ax(bwi-1+ii)/20.
      sum2=sum2+ax(cwi+ii)/20.
40    continue
c     Output is seleted from the average which is closest to median
      if(abs(sum1-xmed) .le. abs(sum2-xmed)) then
      cx(cwi)=sum1
      else
      cx(cwi)=sum2
      end if
      do 45 iii=start,start+19
      cx(iii)=cx(start+20)
45    continue
```

```fortran
           if (ewi .lt. start+inn) go to 60
           do 50 ii=start,start+inn-1
           ax(ii)=cx(ii)
50         continue
100        continue
           return
           end c      ***************************
c      * Rectify input signal    *
c      * N = # of samples        *
c      ***************************
c
           subroutine rectify(in_sig,out_sig,start,N)
           real in_sig(15291),out_sig(15291)
           integer start,N
c
           integer i
           do i = start,start+N-1
              out_sig(i) = abs(in_sig(i))
           enddo
           return
           end c      ******************************
c      * Apply difference operator  *
c      * to the input signal        *
c      * in_sig = input signal      *
c      * out_sig = output signal    *
c      * N = # of samples           *
c      ******************************
c
           subroutine differentiate(in_sig,out_sig,start,N)
           real in_sig(15291),out_sig(15291)
           integer start,N
           integer bwi,cwi,ewi
           real sum
c
           bwi = start-1
100        bwi = bwi+1
           cwi = bwi+2
           ewi = bwi+4
           sum = 0.0
           do i = bwi,cwi-1
              sum = sum+in_sig(3+i)-in_sig(i)
           enddo
           out_sig(cwi) = sum/2.0
           if (ewi .lt. start+N) go to 100
           return
           end
c c      *******************************************
c      * Normalize differentiated signal by      *
c      * dividing each point with the local      *
c      * (original) signal power estimated       *
c      * in a window of N samples.               *
c      *******************************************
c
           subroutine normalize(dif_sig,or_sig,N,Num_of_samples)
           real dif_sig(15291),or_sig(15291)
           integer N
c
           integer i
           real bias,bias_sum,var,power,max
c
           max = 0.0
           bias_sum = 0.0
           var = 0.0
           do i=1,N
```

```
              bias_sum = bias_sum +or_sig(i)
          enddo
          bias = bias_sum/N
          do i=1,N
              var = var + (or_sig(i)-bias)**2
          enddo
          power = SQRT(var/N)
c
c         * Begin main loop with sample N+1 *
c
          do i = N+1,Num_of_samples-1
              dif_sig(i) = dif_sig(i)/(0.1+power)
              bias_sum = bias_sum-or_sig(i-N)+or_sig(i)
c             * Remove the variance of sample i-N (use old bias) *
              var = var-(or_sig(i-N)-bias)**2
c             * Update bias *
              bias = bias_sum/N
c             * Add variance of this sample *
              var = var+(or_sig(i)-bias)**2
              power = SQRT(abs(var/N))
              if (power .gt.max) max = power
          enddo
          type *,max
          return
          end
c
c
c         **************
c         * CLUSTERING *
c         **************
c
          subroutine cluster(xin,xout,z1,z2)
          real xin(4,8),xout(8,4),z1(8),wd(8),z2(8)
          real ich2(8),ich3(8),ich4(8)
c         Initialize the first center of clusters with the times in the first
c         shot
          do 10 i=1,8
          z1(i)=xin(1,i)
          xout(i,1)=z1(i)
10        continue
c         Find distances between times in the next shot and the centers of
c         cluster
          do 11 j=1,8
          do 12 i=1,8
          wd(i)=ABS(z1(i)-xin(2,j))
12        continue
          call submin(8,wd,min)
          if (ich2(min) .eq. 0) then
                  xout(min,2)=xin(2,j)
                  ich2(min)=1
          else
                  if (ABS(z1(min)-xout(min,2)) .gt. ABS(z1(min)-xin(2,j))) then
                              xout(min,2)=xin(2,j)
                  end if
          end if
11        continue
c         Update center of cluster with sample mean
          do 13 i=1,8
          xmean=0.0
          do 14 j=1,2
                  if (xout(i,j) .eq. 0.0) then
c If there is a empty clustering then make that event with big value
                  xmean=9999.
                  else
          xmean=xmean+xout(i,j)/2.
                  end if
14        continue
          z1(i)=xmean
13        continue
c         Find distances between times in the third shot and the
c         centers of updated times
          do 15 j=1,8
```

```
          do 16 i=1,8
          wd(i)=ABS(z1(i)-xin(3,j))
16        continue
          call submin(8,wd,min)
          if (ich3(min) .eq. 0) then
                  xout(min,3)=xin(3,j)
                  ich3(min)=1
          else
                  if (ABS(z1(min)-xout(min,3)) .gt. ABS(z1(min)-xin(3,j))) then
                              xout(min,3)=xin(3,j)
                  end if
          end if
15        continue
c     Update center of cluster with sample mean
          do 17 i=1,8
          xmean=0.0
          do 18 j=1,3
                  if (xout(i,j) .eq. 0.0) then
                  xmean=9999
                  else
          xmean=xmean+xout(i,j)/3.
                  end if
18        continue
          z1(i)=xmean
17        continue
c     Find distances between times in the fourth shot and the
c     centers of updated times
          do 20 j=1,8
          do 19 i=1,8
          wd(i)=ABS(z1(i)-xin(4,j))
19        continue
          call submin(8,wd,min)
          if (ich4(min) .eq. 0) then
                  xout(min,4)=xin(4,j)
                  ich4(min)=1
          else
                  if (ABS(z1(min)-xout(min,4)) .gt. ABS(z1(min)-xin(4,j))) then
                              xout(min,4)=xin(4,j)
                  end if
          end if
20        continue
c     Find final mean anad standard deviations
          do 21 i=1,8
          xmean=0.
          do 22 j=1,4
                  if (xout(i,j) .eq. 0.0) then
                  xmean=9999
                  else
          xmean=xmean+xout(i,j)/4.
                  end if
22        continue
          z1(i)=xmean
          dev=0.0
          do 23 j=1,4
          dev=dev+(z1(i)-xout(i,j))**2
23        continue
          z2(i)=sqrt(dev/4.)
21        continue
          return
          end
c     **********************************
c     subroutine to find minimum distance
c     **********************************
          subroutine submin(kk,xx,loc)
          real xx(kk)
          small=xx(1)
          loc=1
          do 10 i=2,8
```

```fortran
            if (xx(i) .lt. small) then
            small=xx(i)
            loc=i
            end if
10          continue
            return
            end
c       ****************************************************
c       * Envelope Correlator                              *
c       ****************************************************
        dimension r(10000),g(512),h(512),b(512),d(512),l2(100),w(512)
        dimension c(100),l(100),c1(100),l1(100),a(100),t(100),f(512)
        real cyn(10),cyt(10)
        complex s(512),p(512)

common/wfft/wfftc(10000)
        character   fil*128,fn*16,fn1*16
        type *,'output filename'
        read '(a16)',fn
        open(7,file=fn,status='new')
51      format(a128)
        pi=4.*atan(1.)
        pi2=2.*pi
        type *,'n,nk,k1'
c         accept *,n,nk,k1
        n=256
        nk=20
        k1=40
          nn=7000
        dt=float(nk)/16384.
        df=1./(dt*float(n))
        f0=df*float(n/2)
        do i=1,n
        f(i)=df*float(i-1-n/2)
        w(i)=.54+.46*cos(pi*(f(i)/f0))
        enddo
        do i=1,8000
        r(i)=0.
        enddo
        call fftci(n,wfftc)
c
        type *,'normal filename'
        read(5,51)fil
        open(1,file=fil,status='old')
        read(1,*)(r(i),i=1,nn)
        close(1)
        do i=1,n
        g(i)=r(i*nk)
        s(i)=cmplx(g(i),0.)
        enddo
c
        call fft1d(s,-1,n)
        do i=1,n
        s(i)=(0.,1.)*pi2*f(i)*s(i)*w(i)
        enddo
        call fft1d(s,1,n)
        do i=1,n
        h(i)=real(s(i))
        enddo
c
        do i=1,k1
        c(i)=h(1)
        l(i)=1
        enddo
        do i=2,n
          do j=1,k1
          if(h(i).gt.c(j))then
            do jj=k1,j+1,-1
            c(jj)=c(jj-1)
            l(jj)=l(jj-1)
```

```
                  enddo
                  c(j)=h(i)
                  l(j)=i
                  goto 511
               endif
            enddo
511      continue
         enddo
c
         do i=1,k1
c           type *,i,c(i),l(i)
         enddo
c        call plt(g,g,g,n,50)
cc
         type *,'spacing of event'
         accept *,km k=1
         l1(1)=l(1)
         do 11 i=2,k1
            if(k.eq.8)goto 11
               if(l(i).gt.124*(40/nk).or.l(i).lt.5*(40/nk))goto 11
            do j=1,k
            if(iabs(l(i)-l1(j)).le.km)goto 11
            enddo
            k=k+1
            l1(k)=l(i)
11       continue
c
         do i=1,k
         l(i)=l1(i)
         type *,i,l(i)
c        accept *,l(i)
         enddo
c
         type *,'test filename'
1110     read(5,51)fil
         open(2,file=fil,status='old')
         read(2,*)(r(i),i=1,nn)
         close(2)
         do i=1,n
         h(i)=r(i*nk)
         s(i)=cmplx(h(i),0.)
         enddo
c
         call fft1d(s,-1,n)
         do i=1,n
         s(i)=(0.,1.)*pi2*f(i)*s(i)*w(i)
         enddo
         call fft1d(s,1,n)
         do i=1,n
         d(i)=real(s(i))
         enddo
c
         do i=1,k1
         c1(i)=d(1)
         l1(i)=1
         enddo
         do i=2,n
            do j=1,k1
            if(d(i).gt.c1(j))then
               do jj=k1,j+1,-1
               c1(jj)=c1(jj-1)
               l1(jj)=l1(jj-1)
               enddo
               c1(j)=d(i)
               l1(j)=i
               goto 512
            endif
            enddo
512      continue
         enddo
c
```

```
      do i=1,k1
c     type *,i,c1(i),l1(i)
      enddo
c
      kk=1
      l2(1)=l1(1)
      do 111 i=2,k1
         if(kk.eq.8)goto 111
         if(l1(i).gt.124*(40/nk).or.l1(i).lt.5*(40/nk))goto 111
         do j=1,kk
         if(iabs(l1(i)-l2(j)).le.km)goto 111
         enddo
         kk=kk+1
         l2(kk)=l1(i)
111   continue
c
      do i=1,kk
      type *,i,l2(i)
      enddo
c
c     call plt(g,h,h,n,50)
c
c     accept *,m,mm,id
      m=km
      mm=km
      id=0
      write(7,50) k,(float(l(kk)),kk=1,k)
      write(7,*) ' ' do i=1,k
         cyn(i)=nk*l(i)/273.066
         cyt(i)=nk*l2(i)/273.066
      enddo
      write(7,50) k,(cyn(i),i=1,k)
      write(7,*) ' '
      write(7,50) k,(cyt(i),i=1,k)
      write(7,*) ' '
      do jj=-m,m
c
      do kk=1,k
      er=0.
      es=0.
      ers=0.
      dr=0.
      ds=0.
      ic=0
      do ii=-mm,mm
      i=l(kk)+ii
      j=l(kk)+jj+ii
      if(i.lt.1.or.i.gt.n)goto 123
      if(j.lt.1.or.j.gt.n)goto 123
      ic=ic+1
      if(id.ne.1)then
      ers=ers+g(i)*h(j)
      else
      ers=ers+(g(i)-h(j))**2
      endif
      er=er+g(i)**2
      es=es+h(j)**2
      dr=dr+g(i)
      ds=ds+h(j)
123   continue
      enddo
      if(id.ne.1)then
      ers=ers-(dr*ds)/float(ic)
      er=er-dr**2/float(ic)
      es=es-ds**2/float(ic)
```

```
              if(id.eq.0)then
                c(kk)=ers/er
              else
                c(kk)=ers/sqrt(er*es)
              endif
            else
            c(kk)=10.*alog10(ers/er)
            endif
            enddo
c
            do i=1,k
              c(i)=exp(abs(c(i)-1))
            enddo
            write(7,50) jj,(c(kk),kk=1,k)
            enddo
50          format(1x,i3,1x,9(f8.4,1x))

end

SUBROUTINE FFT1D(S,iS,n)
            COMPLEX S(*),XX(8000)
            DO 10 I=1,N/2
10          XX(I)=S(I)
            DO 20 I=N/2+1,N
20          S(I-N/2)=S(I)
            DO 30 I=1,N/2
30          S(N/2+I)=XX(I)
            CALL FFT(S,is,n)
            DO 60 I=1,N/2
60          XX(I)=S(I)
            DO 70 I=N/2+1,N
70          S(I-N/2)=S(I)
            DO 80 I=1,N/2
80          S(N/2+I)=XX(I)
            RETURN
            END
c
            SUBROUTINE FFT1(S,iS,n)
            COMPLEX S(*),XX(8000)
            CALL FFT(S,is,n)
            DO 60 I=1,N/2
60          XX(I)=S(I)
            DO 70 I=N/2+1,N
70          S(I-N/2)=S(I)
            DO 80 I=1,N/2
80          S(N/2+I)=XX(I)
            RETURN
            END
c
            SUBROUTINE FFT2D(is,n)
            COMPLEX A,X(64)
            COMMON/BLKA/A(64,64)
            DO 40 J=1,N
            DO 20 K=1,N
20          X(K)=A(J,K)
            CALL FFT1D(X,is,n)
            DO 30 K=1,N
30          A(J,K)=X(K)
40          CONTINUE
c
            DO 90 K=1,N
            DO 70 J=1,N
70          X(J)=A(J,K)
            CALL FFT1D(X,is,n)
            DO 80 J=1,N
80          A(J,K)=X(J)
90          CONTINUE
            RETURN
```

```
           END
C
           SUBROUTINE FFT(S,is,n)
           COMPLEX S(*)
           common/wfft/wfftc(40000)
           dimension cpy(20000)
           IF(iS.LT.0)GO TO 1
           DO 1000 I=1,N
1000       S(I)=CONJG(S(I))
1          CONTINUE
           call f2tcf(n,s,s,wfftc,cpy)
           IF(iS.LT.0)RETURN
           DO 2 I=1,N
2          S(I)=CONJG(S(I))/N
           RETURN
           END
```

What is claimed is:

1. A method of extracting a set of events from a vibration signal of a machine wherein a subset of said events corresponds to a physical action of said machine, comprising:

sensing a vibrational signal of said machine;

creating a time domain signature from said vibrational signals;

processing said signature to obtain a set of clustered events from a plurality of sets of possible events including in said set of clustered events a subset which corresponds to the physical action of said machine: and comparing said subset with a reference subset to determine the mechanical condition of said machine.

2. A method as recited in claim 1 wherein said time domain signature is created from said vibrational signal by:

computing an envelope of said vibrational signal; and, differentiating said envelope to create said signature.

3. A method as recited in claim 1 wherein said processing step comprises the step of an envelope of said vibrational signal which computing step comprises:

computing a Hilbert Transform of said vibrational signal to obtain a transformed signal;

taking the square root of the sum of the square of the transformed signal and the square of the vibrational signal.

4. A method as recited in claim 1 wherein said vibrational signal comprises a plurality of signals and said processing step comprises the step of computing of an envelope of said vibrational signal which further comprises:

computing an envelope of each of said plurality of signals comprising said vibrational signal thereby providing a plurality of envelopes; and performing a selective averaging process to form a single envelope which is representative of said plurality of envelopes.

5. A method as recited in claim 1 wherein said processing step comprises the step of computing of an envelope of said vibrational signal which computing step further comprises computing a short-time energy of said vibrational signal to obtain said envelope.

6. A method as recited in claim 1 wherein said processing step comprises the step of computing of an envelope of said vibrational signal which computing step further comprises:

computing an absolute value of said vibrational signal to produce a rectified form of said vibrational signal; and passing said rectified vibrational signal through a median filter to obtain said envelope.

7. A method as recited in claim 1 wherein said step of processing of said signature to comprises selecting windows within said signature and selecting a predetermined number of times corresponding to a series of largest amplitudes within each of said windows.

8. A method as recited in claim 1 wherein the processing of said signature to obtain a set of possible events wherein a subset of said set corresponds to a physical action of said machine comprises selecting windows within said signature and selecting a predetermined number of times corresponding to a series of largest amplitudes within each of said window.

9. A method as recited in claim 3 wherein said vibrational signal is passed through a bandpass filter prior to computation of said Hilbert Transform.

10. A method as recited in claim 3 wherein said step of computing of an envelope of said vibrational signal further comprises:

obtaining an unfiltered envelope as a result of said step of taking the square root and the square; and passing said unfiltered envelope through a low pass filter to obtain said envelope.

11. A method of diagnosing a mechanical condition of a machine, comprising:

sensing a reference vibrational signal of said machine;

creating a reference set of events form said reference vibrational signal of said machine by first creating a reference envelope from said reference vibrational signal and then extracting a set of reference times from said reference envelope;

saving said reference set of times;

sensing a test vibrational signal of said machine;

creating a test set of events from said test vibrational signal of said machine by creating a test envelope from said test vibrational signal and extracting a set of times from said test envelope; and comparing said test set of times with said reference set of times to determine the mechanical condition of said machine.

12. A method as recited in claim 11 wherein said reference set of events is created by sensing a vibrational signal from said machine when said machine is operating normally and creating a time domain signature from said vibrational signal and processing said signal to obtain a first set of clustered events from a first plurality of sets of possible events including in said first set of clustered events a first subset which corresponds to a physical action of said machine and wherein said test set of events is created by subsequently sensing a test vibrational signal from said machine and creating a time domain signature from said test vibrational signal and processing said signature to obtain a second set of clustered events a second plurality of sets of possible events including in said second set of clustered events a second subset which corresponds to a physical action of said machine.

13. A method as recited in claim 11 wherein said comparing of said test set of times with said reference set of times to determine the mechanical condition of said machine comprises determining if a specific test event time occurs within a predetermined time period on either side of a time at which its corresponding reference event occurs.

14. A method of diagnosing a mechanical condition of a machine as recited in claim 11 wherein said test set of events comprises a first clustered set of events from a plurality of machine operations and said reference set of events comprises a second clustered set of events from a plurality of machine operations.

15. A method of determining a set of clustered events for a machine from a plurality of sets of events, wherein each of said sets has a number of events therein, from said machine comprising:
acquiring a set of vibrational signals where each vibrational signal comprises a plurality of events of said machine;
processing each vibrational signal to obtain a set of events for each vibrational signal and a plurality of sets of events for said machine; and,
clustering similar events from each of said plurality of sets to determine a set of clustered events for said machine.

16. A method of determining a set of clustered events for a machine from a plurality of sets of events from said machine as recited in claim 15 wherein said clustering of similar events from each of said plurality of sets to determine a set of clustered events for said machine comprises:
determining groupings of events from said plurality of sets of events using various possible orderings of the plurality of sets of events; and,
determining a set of clustered events from the most common groupings of events.

17. A method of determining a set of clustered events for a machine as recited in claim 16 wherein the determining of groupings of events is accomplished by;
a) selecting a first set from said plurality of sets and assigning each individual event within said set to be a first element of an associated group set, and defining the point in time at which each individual event occurs to be a group center within its associated group set;
b) for each associated group set and its group center, select as its next element an individual event from a next set of said plurality of sets such that said individual event occurs closest in time to said group center with respect to all other events from said next set;
c) determining new group centers for each of said group sets based upon a function of all elements in each group set; and,
d) repeating steps b) and c) above for all remaining sets of said plurality of sets.

18. A method of diagnosing a mechanical condition of a machine, comprising:
sensing a single reference vibrational signal of said machine;
creating a reference set of events and a reference envelope from said single reference vibrational signal of said machine;
saving said reference set of events and said reference envelope;
sensing a single test vibrational signal of said machine;
creating a test envelope from said test vibrational signal of said machine; and,
comparing said test envelope with said reference envelope to determine the mechanical condition of said machine.

19. A method of diagnosing a mechanical condition of a machine as recited in claim 18 wherein said comparing is accomplished by:
computing a cross-correlation over a fixed-size region between said test envelope and said reference envelope at each discrete point in time in a predetermined interval about said reference events; and,
recognizing an event in the test envelope corresponding to each of the reference events when the cross-correlation is below a predetermined value at some discrete time in the predetermined interval, wherein said machine is considered to be operating abnormally when at least a predetermined number of said events is not so recognized.

20. A method of diagnosing a mechanical condition of a machine, comprising:
sensing a reference vibrational signal of said machine;
creating a reference envelope from said reference vibrational signal of said machine;
saving said reference envelope;
sensing a test vibrational signal of said machine;
creating a test envelope from said test vibrational signal of said machine; and,
comparing said test envelope with said reference envelope to determine the mechanical condition of said machine wherein said comparing comprises determining if at least a predetermined number of resolution ratios computed from said test envelope and said reference envelope exceed a predetermined threshold.

21. An apparatus for extracting a set of events from a vibrational signal of a machine wherein a subset of said events corresponds to a physical action of said machine, comprising:
means for sensing a vibrational signal of said machine;
means for creating a time domain signature from said vibrational signal;
means for processing said signature to obtain a set of clustered events from a plurality of sets of possible events including in said set of clustered events a subset which corresponds to a physical action of said machine; and
means for obtaining from said subset information representing the mechanical condition of said machine.

22. An apparatus for diagnosing a mechanical condition of a machine, comprising:
means for sensing a reference vibrational signal of said machine;
means for creating a reference set of events from said reference vibrational signal of said machine including means for creating a reference envelope from said reference vibrational signal, and means for extracting a set of reference times from said reference envelope;
means for saving said reference set of times;
means for sensing a test vibrational signal of said machine;
means for creating a test set of events from said test vibrational signal of said machine including means for creating a test envelope from said test vibrational signal, and means for extracting a set of reference times from said test envelope; and means for comparing said test set of times with said reference set of times to determine the mechanical condition of said machine.

23. An apparatus for determining a set of clustered events for a machine from a plurality of sets of events, wherein each of said sets has a number of events therein, from said machine comprising:

means for acquiring a set of vibrational signal where each vibrational signal comprises a plurality of events of said machine;

means for processing each vibrational signal to obtain a set of events for each vibrational signal and a plurality of sets of events for said machine; and, means for clustering similar events from each of said plurality of sets to determine a set of clustered events for said machine.

24. An apparatus for diagnosing a mechanical condition of a machine, comprising:

means for sensing a single reference vibrational signal of said machine;

means for creating a single reference set of events and a reference envelope from said reference vibrational signal of said machine;

means for saving said reference set of events and said reference envelope;

means for sensing a single test vibrational signal of said machine;

means for creating a test envelope from said test vibrational signal of said machine; and, means for comparing said test envelope with said reference envelope to determine the mechanical condition of said machine.

25. An apparatus for diagnosing a mechanical condition of a machine, comprising:

means for sensing a reference vibrational signal of said machine;

means for creating a reference envelope from said reference vibrational signal of said machine;

means for saving said reference envelope;

means for sensing a test vibrational signal of said machine;

means for creating a test envelope from said test vibrational signal of said machine; and, means for comparing said test envelope with said reference envelope to determine the mechanical condition of said machine wherein said comparing comprises determining if at least a predetermined number of resolution ratios computed from said test envelope and said reference envelope exceed a predetermined threshold.

* * * * *